US009734667B2

(12) United States Patent
Walker et al.

(10) Patent No.: US 9,734,667 B2
(45) **Date of Patent: *Aug. 15, 2017**

(54) GAMEPLAY-ALTERING PORTABLE WAGERING MEDIA

(71) Applicant: IGT, Las Vegas, NV (US)

(72) Inventors: Jay S. Walker, Ridgefield, CT (US); Robert C. Tedesco, Trumbull, CT (US); Daniel E. Tedesco, Huntington, CT (US); Stephen C. Tulley, Fairfield, CT (US); Gregory J. Scribner, Southbury, CT (US); James A. Jorasch, New York, NY (US); Carson C. K. Fincham, Ridgefield, CT (US); Zachary T. Smith, Norwalk, CT (US); Russell P. Sammon, San Francisco, CA (US); Jeffrey Y. Hayashida, San Francisco, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,746

(22) Filed: Aug. 11, 2016

(65) Prior Publication Data

US 2016/0351015 A1 Dec. 1, 2016

Related U.S. Application Data

(63) Continuation of application No. 14/749,284, filed on Jun. 24, 2015, now Pat. No. 9,424,713, which is a continuation of application No. 14/625,426, filed on Feb. 18, 2015, now Pat. No. 9,098,975, which is a continuation of application No. 14/056,618, filed on Oct. 17, 2013, now Pat. No. 9,196,121, which is a continuation of application No. 12/297,665, filed as application No. PCT/US2008/057821 on Mar. 21, 2008, now Pat. No. 8,562,424.

(Continued)

(51) Int. Cl.

| | |
|---|---|
| ***A63F 13/10*** | (2006.01) |
| ***G07F 17/32*** | (2006.01) |
| ***G07F 17/34*** | (2006.01) |

(52) U.S. Cl.

CPC .......... *G07F 17/3248* (2013.01); *G07F 17/32* (2013.01); *G07F 17/322* (2013.01); *G07F 17/323* (2013.01); *G07F 17/3227* (2013.01); *G07F 17/3244* (2013.01); *G07F 17/3251* (2013.01); *G07F 17/34* (2013.01)

(58) Field of Classification Search

USPC .......................................... 463/25, 2, 16, 32

See application file for complete search history.

(56) References Cited

U.S. PATENT DOCUMENTS

| | | | |
|---|---|---|---|
| 3,441,280 | A | 4/1969 | Eggermont |
| 3,906,460 | A | 9/1975 | Halpern |

(Continued)

FOREIGN PATENT DOCUMENTS

| | | |
|---|---|---|
| EP | 0057602 | 8/1982 |
| WO | WO9603712 | 2/1996 |

(Continued)

*Primary Examiner* — Pierre E Elisca

(74) *Attorney, Agent, or Firm* — Neal, Gerber & Eisenberg LLP

(57) ABSTRACT

Portable wagering media may be utilized to alter play of wagering games.

28 Claims, 13 Drawing Sheets

Related U.S. Application Data

(60) Provisional application No. 60/896,096, filed on Mar. 21, 2007.

(56) References Cited

U.S. PATENT DOCUMENTS

| | | | |
|---|---|---|---|
| 4,185,730 | A | 1/1980 | Roes et al. |
| 4,319,674 | A | 3/1982 | Riggs et al. |
| 4,323,240 | A | 4/1982 | Stewart et al. |
| 4,674,618 | A | 6/1987 | Eglise et al. |
| 4,725,924 | A | 2/1988 | Juan |
| 4,755,941 | A | 7/1988 | Bacchi |
| 4,758,689 | A | 7/1988 | Nakao et al. |
| 4,764,666 | A | 8/1988 | Bergeron |
| 4,778,182 | A | 10/1988 | Brignole |
| 4,814,589 | A | 3/1989 | Storch et al. |
| 4,827,640 | A | 5/1989 | Jones |
| 4,882,473 | A | 11/1989 | Bergeron et al. |
| 4,926,996 | A | 5/1990 | Eglise et al. |
| 4,943,090 | A | 7/1990 | Feinberg |
| 4,968,873 | A | 11/1990 | Dethloff et al. |
| 4,969,549 | A | 11/1990 | Eglise |
| 4,983,820 | A | 1/1991 | Dias |
| 4,999,742 | A | 3/1991 | Stampfli |
| 5,007,641 | A | 4/1991 | Seidman |
| 5,056,141 | A | 10/1991 | Dyke |
| 5,103,081 | A | 4/1992 | Fisher et al. |
| 5,128,752 | A | 7/1992 | Von Kohorn |
| 5,166,502 | A | 11/1992 | Rendleman et al. |
| 5,216,234 | A | 6/1993 | Bell |
| 5,276,312 | A | 1/1994 | McCarthy |
| 5,277,424 | A | 1/1994 | Wilms |
| 5,326,104 | A | 7/1994 | Pease et al. |
| 5,361,885 | A | 11/1994 | Modler |
| 5,373,440 | A | 12/1994 | Cohen et al. |
| 5,399,847 | A | 3/1995 | Druz |
| 5,406,264 | A | 4/1995 | Plonsky et al. |
| 5,450,938 | A | 9/1995 | Rademacher |
| 5,498,859 | A | 3/1996 | Farmont |
| 5,505,449 | A | 4/1996 | Eberhardt et al. |
| 5,569,082 | A | 10/1996 | Kaye |
| 5,588,649 | A | 12/1996 | Blumberg et al. |
| 5,607,156 | A | 3/1997 | Samarasinghe |
| 5,619,066 | A | 4/1997 | Curry et al. |
| 5,627,356 | A | 5/1997 | Takemoto et al. |
| 5,651,548 | A | 7/1997 | French et al. |
| 5,655,961 | A | 8/1997 | Acres et al. |
| 5,667,218 | A | 9/1997 | Kumabe et al. |
| 5,676,376 | A | 10/1997 | Valley |
| 5,700,009 | A | 12/1997 | Meoni |
| 5,706,925 | A | 1/1998 | Orus et al. |
| 5,709,603 | A | 1/1998 | Kaye |
| 5,735,742 | A | 4/1998 | French |
| 5,764,789 | A | 6/1998 | Pare, Jr. et al. |
| 5,768,143 | A | 6/1998 | Fujimoto |
| 5,770,533 | A | 6/1998 | Franchi |
| 5,778,067 | A | 7/1998 | Jones et al. |
| 5,781,647 | A | 7/1998 | Fishbine et al. |
| 5,839,956 | A | 11/1998 | Takemoto |
| 5,855,515 | A | 1/1999 | Pease et al. |
| 5,892,210 | A | 4/1999 | Levasseur |
| 5,895,321 | A | 4/1999 | Gassies et al. |
| 5,902,983 | A | 5/1999 | Crevelt et al. |
| 5,910,048 | A | 6/1999 | Feinberg |
| 5,919,090 | A | 7/1999 | Mothwurf |
| 5,967,516 | A | 10/1999 | Phillips |
| 5,969,633 | A | 10/1999 | Roster |
| 6,003,651 | A | 12/1999 | Waller et al. |
| 6,012,832 | A | 1/2000 | Saunders et al. |
| 6,021,949 | A | 2/2000 | Boiron |
| 6,032,955 | A | 3/2000 | Luciano et al. |
| 6,048,269 | A | 4/2000 | Burns et al. |
| 6,050,487 | A | 4/2000 | Bonifas et al. |
| 6,050,895 | A | 4/2000 | Luciano, Jr. et al. |
| 6,062,981 | A | 5/2000 | Luciano, Jr. |
| 6,099,408 | A | 8/2000 | Schneier et al. |
| 6,109,530 | A | 8/2000 | Larson et al. |
| 6,110,042 | A | 8/2000 | Walker et al. |
| 6,138,106 | A | 10/2000 | Walker et al. |
| 6,148,094 | A | 11/2000 | Kinsella |
| 6,186,895 | B1 | 2/2001 | Oliver |
| 6,193,153 | B1 | 2/2001 | Lambert |
| 6,200,218 | B1 | 3/2001 | Lindsay |
| 6,213,874 | B1 | 4/2001 | Heflin |
| 6,227,972 | B1 | 5/2001 | Walker et al. |
| 6,257,979 | B1 | 7/2001 | Walker et al. |
| 6,264,109 | B1 | 7/2001 | Chapet et al. |
| 6,270,410 | B1 | 8/2001 | DeMar et al. |
| 6,296,190 | B1 | 10/2001 | Rendleman |
| 6,330,162 | B2 | 12/2001 | Sakamoto et al. |
| 6,347,999 | B1 * | 2/2002 | Yuan ....................... A63F 13/08 463/3 |
| 6,357,746 | B1 | 3/2002 | Sadowski |
| 6,358,149 | B1 | 3/2002 | Schneider et al. |
| 6,405,174 | B1 | 6/2002 | Walker et al. |
| 6,454,651 | B1 | 9/2002 | Yoseloff |
| 6,464,583 | B1 | 10/2002 | Kidron |
| 6,500,067 | B1 | 12/2002 | Luciano et al. |
| 6,575,832 | B1 | 6/2003 | Manfredi et al. |
| 6,616,535 | B1 | 9/2003 | Nishizaki et al. |
| 6,629,591 | B1 | 10/2003 | Griswold et al. |
| 6,641,035 | B1 | 11/2003 | Predescu et al. |
| 6,675,152 | B1 | 1/2004 | Prasad et al. |
| 6,688,976 | B1 | 2/2004 | Tulley et al. |
| 6,846,238 | B2 | 1/2005 | Wells |
| 6,866,585 | B2 * | 3/2005 | Muir ..................... A63F 13/005 463/31 |
| 7,267,614 | B1 | 9/2007 | Jorasch et al. |
| 7,549,920 | B2 | 6/2009 | Jorasch et al. |
| 7,719,424 | B2 | 5/2010 | Steil |
| 7,753,779 | B2 | 7/2010 | Shayesteh |
| 7,753,781 | B2 | 7/2010 | Storch |
| 7,753,797 | B2 | 7/2010 | Walker et al. |
| 7,762,887 | B1 | 7/2010 | House et al. |
| 7,771,272 | B2 | 8/2010 | Soltys et al. |
| 7,822,641 | B2 | 10/2010 | Abbott et al. |
| 7,852,223 | B2 | 12/2010 | Hecht et al. |
| 7,878,896 | B2 | 2/2011 | Jorasch et al. |
| 7,883,408 | B2 | 2/2011 | Gelinotte |
| 7,914,372 | B2 | 3/2011 | Tessmer et al. |
| 7,918,455 | B2 | 4/2011 | Chapet et al. |
| 2001/0006195 | A1 | 7/2001 | Sukeda et al. |
| 2004/0102244 | A1 * | 5/2004 | Kryuchkov ............. G07F 17/32 463/32 |
| 2004/0229671 | A1 | 11/2004 | Stronach et al. |
| 2004/0229682 | A1 | 11/2004 | Gelinotte |
| 2004/0254006 | A1 | 12/2004 | Lam et al. |
| 2005/0026674 | A1 | 2/2005 | Wolf et al. |
| 2005/0059482 | A1 | 3/2005 | Hedrick et al. |
| 2005/0251447 | A1 | 11/2005 | Lane |
| 2005/0282627 | A1 | 12/2005 | Hedrick et al. |
| 2006/0063587 | A1 | 3/2006 | Manzo |
| 2006/0073883 | A1 | 4/2006 | Franks, Jr. |
| 2006/0094498 | A1 | 5/2006 | Jorasch et al. |
| 2006/0121984 | A1 | 6/2006 | Jorasch et al. |
| 2006/0128462 | A1 | 6/2006 | Jorasch et al. |
| 2006/0217186 | A1 | 9/2006 | Jorasch et al. |
| 2007/0105613 | A1 | 5/2007 | Adams et al. |
| 2007/0293309 | A1 | 12/2007 | Jorasch et al. |
| 2008/0076546 | A1 * | 3/2008 | Moyle ..................... G07F 17/32 463/29 |
| 2008/0176642 | A1 | 7/2008 | Phillips et al. |
| 2009/0176559 | A1 | 7/2009 | Buchholz et al. |
| 2009/0197673 | A1 | 8/2009 | Bone et al. |
| 2010/0285869 | A1 | 11/2010 | Walker et al. |

FOREIGN PATENT DOCUMENTS

| | | |
|---|---|---|
| WO | WO9617329 | 6/1996 |
| WO | WO9835309 | 8/1998 |

* cited by examiner

GAMEPLAY-ALTERING PORTABLE WAGERING MEDIA

PRIORITY CLAIM

This application is a continuation of, claims priority to and the benefit of U.S. patent application Ser. No. 14/749,284, filed on Jun. 24, 2015, which is a continuation of, claims priority to and the benefit of U.S. patent application Ser. No. 14/625,426, filed on Feb. 18, 2015, now U.S. Pat. No. 9,098,975, which is a continuation of, claims priority to and the benefit of U.S. patent application Ser. No. 14/056,618, filed on Oct. 17, 2013, now U.S. Pat. No. 9,196,121, which is a continuation of, claims priority to and the benefit of U.S. patent application Ser. No. 12/297,665, filed on Apr. 22, 2010, now U.S. Pat. No. 8,562,424, which is a national stage application of PCT/US08/57821 filed on Mar. 21, 2008, which claims priority to and the benefit of U.S. Provisional Patent Application Ser. No. 60/896,096, filed on Mar. 21, 2007, the entire contents of which are each incorporated by reference herein.

RELATED APPLICATIONS

This application is related to commonly owned International Patent Application Serial No. PCT/US0779518 entitled "SYSTEMS AND METHODS FOR PORTABLE WAGERING MEDIUMS" filed on Sep. 26, 2007, which itself claims benefit and priority to U.S. Provisional Patent Application Ser. No. 60/826,977 entitled "GAMING CHIP WITH DISPLAY" filed Sep. 26, 2006, the entirety of each of which is hereby incorporated by reference herein. The present application is also related to (i) U.S. patent application Ser. No. 11/838,551 entitled "GAMING TOKEN HAVING A VARIABLE VALUE" filed on Aug. 14, 2007, which is a continuation application that claims benefit and priority to U.S. patent application Ser. No. 09/597,801 entitled "GAMING TOKEN HAVING A VARIABLE VALUE" filed on Jun. 20, 2000, which issued as U.S. Pat. No. 7,267,614 on Sep. 11, 2007, and (ii)(a) U.S. patent application Ser. No. 11/321,793 entitled "GAMING TOKEN HAVING A VARIABLE VALUE" filed on Dec. 29, 2005, (b) U.S. patent application Ser. No. 11/329,872 entitled "GAMING TOKEN HAVING A VARIABLE VALUE" filed on Jan. 11, 2006, (c) U.S. patent application Ser. No. 11/331,550 entitled "GAMING TOKEN HAVING A VARIABLE VALUE" filed on Jan. 13, 2006, and (d) U.S. patent application Ser. No. 11/361,152 entitled "GAMING TOKEN HAVING A VARIABLE VALUE" filed on Feb. 24, 2006, each of which is a divisional application that also claims benefit and priority to U.S. patent application Ser. No. 09/597,801 entitled "GAMING TOKEN HAVING A VARIABLE VALUE" filed on Jun. 20, 2000, which issued as U.S. Pat. No. 7,267,614 on Sep. 11, 2007. The entirety of each of these applications is hereby incorporated by reference herein.

BACKGROUND

Tokens, chips, cashless gaming tickets, and other portable wagering media are often utilized to place wagers in various wagering games such as poker, blackjack, roulette, craps, slots, pai gow, etc. Such portable wagering media, however, are generally nothing more than indicators of a face value associated therewith. Typical portable wagering media have not been configured or utilized, for example, to increase player enjoyment or add strategy and/or skill-based gaming elements to wagering games. These and other deficiencies of typical portable wagering media are addressed by the systems and methods disclosed herein.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

Introduction

Figure 1:
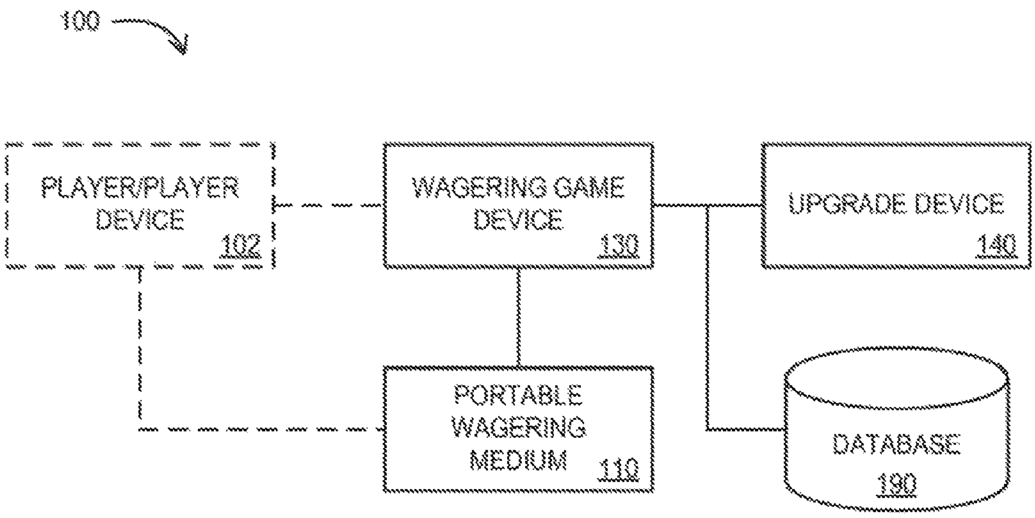
FIG. 1 is a block diagram of a system according to some embodiments.

Applicants have recognized that, in some situations, it may be advantageous to provide a portable wagering medium (e.g., wagering chip for use at a table game) that is capable of altering game play of a wagering game. Applicants have recognized, for example, that it may be advantageous to provide an apparatus (such as a portable wagering medium) that comprises (a) a memory of a portable wagering medium, the memory storing (i) an indication of a wagering denomination and (ii) an indication of an attribute operable to alter play of a wagering game, and (b) a communications device of the portable wagering medium, the communications device operable to provide the indications to a device associated with the wagering game.

Applicants have also recognized that it may be advantageous to provide an apparatus (such as a portable wagering medium) that comprises (a) a memory of a portable wagering medium, the memory storing an indication of an attribute operable to alter play of a primary wagering game, and (b) a communications device of the portable wagering medium, the communications device operable to provide the indication to a device associated with the primary wagering game.

Applicants have further recognized that it may be advantageous to provide a wagering game device such as a slot machine (or video poker machine, video keno machine, etc.) that comprises (a) means for accepting a wager associated with a portable wagering medium, (b) means for determining (i) a wagering denomination associated with the portable wagering medium and (ii) an attribute associated with the portable wagering medium, wherein the attribute is operable to alter a play of the slot machine, and (c) means for altering the play of the slot machine based on the attribute.

Applicants have also recognized that it may be advantageous to provide a wagering game device such as an electronically-facilitated table game that comprises (a) means for determining a wager associated with a portable wagering medium, (b) means for determining (i) a wagering denomination associated with the portable wagering medium and (ii) an attribute associated with the portable wagering medium, wherein the attribute is operable to alter a play of the electronically facilitated table game, and (c) means for altering the play of the electronically facilitated table game based on the attribute.

Applicants have further recognized that it may be advantageous to provide a system that comprises (a) means for associating a portable wagering medium with (i) a wagering denomination and (ii) an attribute operable to alter a play of a wagering game, (b) means for providing the portable wagering medium to a player, and (c) means for conducting the play of the wagering game in a manner that causes the attribute to alter the play of the wagering game.

Applicants have yet further recognized that various processes associated with game play-altering portable wagering media may be beneficial. One such process may comprise, for example, (a) receiving an indication of a request from a player for a portable wagering medium associated with (i) a wagering denomination and (ii) an attribute that is operable to alter play of a wagering game, and (b) providing the player with the portable wagering medium associated with the wagering denomination and the attribute.

A second process may comprise (a) receiving an indication of a request from a player for a portable wagering medium associated with an attribute that is operable to alter play of a primary wagering game, and (b) providing the player with the portable wagering medium associated with the attribute.

A third process may comprise (a) determining a triggering condition associated with providing portable wagering medium upgrades to players, (b) determining, in response to the determining of the triggering condition, a portable wagering medium upgrade offer to present to a player, (c) presenting the portable wagering medium upgrade offer to the player, (d) receiving, after the presenting, an indication of an acceptance of the portable wagering medium upgrade offer by the player, and (e) providing, in response to the receiving of the indication of the acceptance of the portable wagering medium upgrade offer by the player, a portable wagering medium associated with (i) a wagering denomination and (ii) an attribute comprising a portable wagering medium upgrade that is operable to alter play of a wagering game.

A fourth process may comprise (a) determining a triggering condition associated with providing portable wagering medium upgrades to players, (b) determining, in response to the determining of the triggering condition, a portable wagering medium upgrade offer to present to a player, (c) presenting the portable wagering medium upgrade offer to the player, (d) receiving, after the presenting, an indication of an acceptance of the portable wagering medium upgrade offer by the player, and (e) providing, in response to the receiving of the indication of the acceptance of the portable wagering medium upgrade offer by the player, a portable wagering medium associated with an attribute that is operable to alter play of a primary wagering game.

A fifth process may comprise (a) facilitating, by a processing device, a play of a wagering game by a player, (b) determining, by the processing device, a portable wagering medium associated with the play of the wagering game by the player, (c) determining (i) a wagering denomination associated with the portable wagering medium and (ii) an attribute associated with the portable wagering medium, wherein the attribute is operable to alter the play of the wagering game, (d) determining, by the processing device, a manner in which the attribute is operable to alter the play of the wagering game, and (e) determining, by the processing device, whether to alter the play of the wagering game in the manner in which the attribute is operable to alter the play of the wagering game.

A sixth process may comprise (a) facilitating, by a processing device, a play of a primary wagering game by a player, (b) determining, by the processing device, a portable wagering medium associated with the play of the primary wagering game by the player, (c) determining an attribute associated with the portable wagering medium, wherein the attribute is operable to alter the play of the primary wagering game, (d) determining, by the processing device, a manner in which the attribute is operable to alter the play of the primary wagering game, and (e) determining, by the processing device, whether to alter the play of the primary wagering game in the manner in which the attribute is operable to alter the play of the primary wagering game.

A seventh process may comprise (a) determining an attribute operable to alter play of a primary wagering game, (b) determining a portable wagering medium to be associated with the attribute, and (c) causing an indication of the attribute to be stored in association with the portable wagering medium. The process may further comprise (d) determining a wagering denomination, and (e) causing an indication of the wagering denomination to be stored in association with the portable wagering medium.

The attribute of the portable wagering medium that is operable to alter play of a wagering game may be configured to have one or more various effects on the wagering game. The attribute may be configured, for example, such that the portable wagering medium: (i) wins 'pushes' in Blackjack, (ii) is immune to '0' and '00' outcomes in Roulette, (iii) pays better odds on particular types of winning bets, (iv) allows a player to "triple down" in Blackjack, (v) allows a player to change a wagering game table's wager range, and/or (vi) changes an outcome of the wagering game Applicants have recognized that providing wagering game devices and/or portable wagering media associated with game play-altering attributes (and/or otherwise practicing the methods described herein) may be beneficial in many ways. Players of wagering games are provided with a vast new array of gaming options, for example, while substantially maintaining the core principals and characteristics of the underlying games. These new gaming options can potentially cause previously unprofitable or low-profit margin games to become more profitable and/or may provide players with a sense of empowerment by adding elements of skill to the wagering process—while also providing the ability to maintain and/or manage the house edge/hold percentage (e.g., as required by gaming regulations). Interactivity of some portable wagering media may introduce exciting team and/or social play aspects to otherwise solitary and/or limited-interaction games.

Other features, advantages, and benefits should be easily discernable to one of ordinary skill in the art upon having read the disclosure of the embodiments presented herein.

Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments described herein are associated with a "wagering game device". As used herein, the term "wagering game device" may generally refer to any device that is operable to execute, facilitate the execution of, and/or monitor a wagering game and/or wagering game program. Wagering game devices may comprise, for example, one or more slot machines, video poker machines, video keno machines, video roulette machines, video blackjack machines, video lottery machines, pachinko machines, slot or other electronic game hubs and/or controllers, other electronic gaming machines, and/or one or more table or table-top games and/or table or table-top game devices such as may be utilized to conduct, facilitate, and/or monitor one or more poker, roulette, blackjack, pai gow, pai gow poker, baccarat, and/or other wagering games.

In some embodiments, a wagering game device may generally be implemented as a system controller, a dedicated hardware circuit, an appropriately programmed general-purpose computer, or any other equivalent electronic, mechanical or electro-mechanical device. Wagering game devices may comprise, for example, Personal Computer (PC) devices (e.g., that communicate with an online casino Web site), laptop and/or tablet computers, Personal Digital Assistant (PDA) devices, cellular or other wireless telephones (e.g., an Apple® iPhone™; e.g., to communicate with an automated sports book that provides gaming services), and/or handheld or portable wagering game devices.

A wagering game device may comprise any or all of the gaming devices of the aforementioned systems. In some embodiments, a user device such as a PDA or cell phone may be used in place of or in addition to some or all of the wagering game device components. For example, in some embodiments, a wagering game device may comprise a wireless handheld device similar to the WifiCasino™ GS offered by Diamond I Technologies of Baton Rouge, La. Further, a wagering game device may comprise a PC or other device, which may be operable to communicate with an online casino and facilitate game play at the online casino. In one or more embodiments, the wagering game device may comprise a computing device operable to execute software that simulates play of a reeled slot machine game, video poker game, video blackjack game, video keno game, video roulette game, and/or lottery game.

Some embodiments described herein are associated with the terms "game" or "wagering game". As used herein, the terms "game" and "wagering game" may be utilized interchangeably and may generally refer to any wagering activity conducted in accordance with a particular set of rules via which a prize or benefit may be won in exchange for consideration. In some embodiments, a wagering game may comprise and/or be otherwise associated with execution of a game of chance, a game of skill, and/or a hybrid game of chance and skill.

Some embodiments described herein are associated with one or more "types" of games. As used herein, a "type" of game may generally refer to a category and/or group of games that share one or more characteristics (e.g., themes, paytables, rules, and/or probabilities).

Some embodiments described herein are associated with the term "game play". As used herein, the term "game play" may generally refer to a single instance, execution, spin, hand, and/or round of a game. A game play may result in a single outcome (e.g., set of indicia and corresponding payout, if any).

As used herein, the term "outcome" may generally refer to any result of a game play, which may generally be indicated by a payout (i.e., a prize or benefit to be provided as a result of the game play) and/or one or more indicia representative of the result. For example, an outcome may comprise a set of indicia (or payout corresponding thereto) that may be displayed along a payline of a reeled slot machine. In another example, an outcome may comprise a roulette number that is a result of a roulette spin. In some embodiments, an outcome may comprise a determination that one or more players and/or a dealer at a table game have won or lost a particular hand or round of betting. In some embodiments, more than one set of indicia may represent the same result or outcome.

Embodiments described herein are associated with a "portable wagering medium". As used herein, the term "portable wagering medium" may generally refer to any object, device, component, chip, puck, check (or cheque), token, ticket, marker, lammer, plaque, and/or substrate that is operable to be utilized to place a wager in a wagering game (e.g., a wagering game facilitated by a wagering game device as described herein). A portable wagering medium may, for example, comprise the consideration (or a portion of the consideration) supplied by a player in exchange for a chance or opportunity to win a prize or other benefit in a wagering game. Such portable wagering media, are, by virtue of being utilized to place a wager in a wagering game and/or by virtue of being representative of wagering consideration, "gambled". In other words, such portable wagering media are surrendered upon occurrence of a losing outcome.

Other portable wagering media may not generally be surrendered or forfeited upon occurrence of a losing outcome in a wagering game (e.g., the portable wagering medium, while being utilized to facilitate placing of a wager, may not itself be offered as consideration for placing the wager). In the case that a portable wagering medium comprises a PDA, cellular telephone, and/or other similar device, for example, the device itself may not be surrendered, but a parameter of the device may be changed in response to the loss (e.g., an account is deducted). Similarly, in the case that a portable wagering medium comprises a cashless gaming receipt and/or ticket, the ticket itself may actually be forfeited prior to game play, and credits stored in the gaming device as a result of the insertion of the ticket may be surrendered upon loss. In the case that a portable wagering medium comprises a virtual token and/or virtual wagering medium (e.g., for use in conjunction with an electronic wagering game), a representation of the portable wagering medium may be surrendered (e.g., marked, deleted, and/or otherwise removed from view) upon loss.

As used herein, the term "wagering chip" generally refers to a class of portable wagering media that are utilized as consideration in placing wagers in wagering games conducted at gaming tables (including "smart" and/or electronically enhanced gaming tables). Wagering chips are generally coin and/or circularly shaped, but may also or alternatively be otherwise shaped (e.g., square, elliptical, octagonal, triangular, and/or amorphously or irregularly shaped). Such wagering chips are typically placed, by a player and/or dealer, upon one ore more playing surfaces such as the “felt” of a poker table, to place one or more wagers.

Wagering chips also typically indicate a particular value (e.g., a face value) associated with each wagering chip (e.g., a five dollar ($5) wagering chip will typically be imprinted with a “$5” indication and/or may be painted or emblazoned with a particular color and/or texture pattern to indicate the five dollar ($5) value). In some embodiments, markers, lammers, plaques, and/or cashless gaming tickets may be utilized as wagering chips in table-based wagering games (cashless gaming tickets may also, of course, be utilized in electronic wagering game devices as portable wagering media). “Wagering plaques” are similar to wagering chips, for example, yet are typically utilized to represent larger denominations of value and also therefore typically include indicia of serial numbers to uniquely identify and/or track such high-value portable wagering media. Many jurisdictions in the United States of America have different regulations governing colors, sizes, indicia, and uses that are appropriate for wagering chips. It is recommended that embodiments herein be practiced in accordance with all local, state, and federal wagering chip rules, regulations, and/or statutes; which should be easily accomplished by one of ordinary skill in the art.

Some embodiments described herein are associated with an “input device”. As used herein, the term “input device” may generally refer to any device that is used to receive or process input. An input device may communicate with and/or be part of another device (e.g., a wagering game device). Some examples of input devices include, but are not limited to: a button, a key, one or more softkeys and/or variable function input devices, a bar-code scanner, a magnetic stripe reader, a computer keyboard, a pointing device (e.g., a computer mouse, touchpad, and/or trackball), a point-of-sale terminal keypad, a touch-screen, a microphone, an infrared sensor, a sonic ranger, a computer port, a video camera, a motion detector, an accelerometer, a thermometer, a digital camera, a network card, a Universal Serial Bus (USB) port, a Global Positioning System (GPS) receiver, a Radio Frequency IDentification (RFID) receiver, a RF receiver, a pressure sensor, and a weight scale or mass balance.

Some embodiments described herein are associated with an “output device”. As used herein, the term “output device” may generally refer to a device that is used to output information. An output device may communicate with and/or be part of another device (e.g., a wagering game device). Some examples of output devices may include, but are not limited to: a Cathode Ray Tube (CRT) monitor, a Liquid Crystal Display (LCD) screen, a Light Emitting Diode (LED) screen, a printer, an audio speaker (or other sound or noise-producing device), an Infra-red Radiation (IR) transmitter, a RF transmitter, a vibration device, an olfactory emitter, and/or a data port.

Some embodiments herein are associated with “communication”. As used herein, the term “communication” may refer to any information, data, and/or signal that is provided, transmitted, received, and/or otherwise processed by an entity, and/or that is shared or exchanged between two or more people, devices, and/or other entities (e.g., portable wagering media). Communications may be external to one or more devices, internal (e.g., within a device and/or component), wired, wireless, continuous, and/or intermittent. Communications may involve, for example, one or more of transmitting, receiving, relaying, processing, and/or otherwise interfacing with information and/or data. Some, but not all, possible communication networks that may be utilized for such communications include: a Local Area Network (LAN), a Wide Area Network (WAN), the Internet, a telephone line (e.g., a Public Switched Telephone Network (PSTN)), a cable line, a radio channel, an optical communications line, and/or a satellite communications link.

A variety of communications protocols may be utilized to facilitate and/or conduct such communications, including but not limited to: Wi-Fi®, Bluetooth®, Ethernet (or IEEE 802.3), SAP, SAS™, SuperSAS™, ATP, Bluetooth®, and/or TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communications may be encrypted to ensure privacy and prevent fraud in any of a variety of ways that are or become known or practicable.

Devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

As used herein, the terms “information” and “data” may be used interchangeably and may refer to any data, text, voice, video, image, message, bit, packet, pulse, tone, waveform, and/or other type or configuration of signal and/or information. Information may be or include information packets transmitted, for example, in accordance with the Internet Protocol Version 6 (IPv6) standard as defined by “Internet Protocol Version 6 (IPv6) Specification” RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

In addition, some embodiments described herein are associated with an “indication”. As used herein, the term “indication” may be used to refer to any indicia and/or other information indicative of or associated with a subject, item, entity, and/or other object and/or idea. As used herein, the phrases “information indicative of” and “indicia” may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As used herein, the term "coupled" may generally refer to any type or configuration of coupling that is or becomes known or practicable. Coupling may be descriptive, for example, of two or more objects, devices, and/or components that are communicatively coupled, mechanically coupled, electrically coupled, and/or magnetically coupled. The term "communicatively coupled" generally refers to any type or configuration of coupling that places two or more objects, devices, components, or portions, elements, or combinations thereof in communication. Mechanical, electrical, and magnetic communications are examples of such communications. The term "mechanically coupled" generally refers to any physical binding, adherence, attachment, and/or other form of physical contact between two or more objects, devices, components, or portions, elements, or combinations thereof. The term "electrically coupled" indicates that one or more objects, devices, components, or portions, elements, or combinations thereof, are in electrical contact such that an electrical signal, pulse, or current is capable of passing between the one or more objects, enabling the objects to electrically communicate with one another. The term "magnetically coupled" indicates that one or more objects, devices, components, or portions, elements, or combinations thereof, are within one or more associated magnetic fields. Objects may be electrically and/or magnetically coupled without themselves being physically attached or mechanically coupled. For example, objects may communicate electrically through various wireless forms of communication or may be within (at least partially) a magnetic field, without being physically touching or even adjacent.

System Overview

Referring first to FIG. 1, a block diagram of a system 100 according to some embodiments is shown. The various systems described herein are depicted for use in explanation, but not limitation, of described embodiments. Different types, layouts, quantities, and configurations of systems described herein may be utilized without deviating from the scope of some embodiments.

According to some embodiments, the system 100 may comprise and/or be associated with a player 102 (which may comprise a device operated by and/or otherwise associated with the player 102), whom utilizes a portable wagering medium 110 to play a wagering game via a wagering game device 130. In some embodiments, the wagering game device 130 (and/or the portable wagering medium 110) may be in communication with, coupled to, and/or otherwise associated with a controller 140 and/or a database 190. Any or all of the components 102, 110, 130, 140, 190 of the system 100 may communicate via any means that is or becomes known or practicable. The components 102, 110, 130, 140, 190 of the system 100 may, for example, communicate via one or more wired and/or wireless connections. In some embodiments, more than one type of communication connection and/or means may be utilized. Some components 102, 110, 130, 140, 190 of the system 100 may communicate via one or more types of hard-wired connections, for example, while other components 102, 110, 130, 140, 190 of the system 100 may communicate utilizing one or more wireless communication protocols. Fewer or more components 102, 110, 130, 140, 190 may be included in the system 100. While a single player 102 and a single portable wagering medium 110 are depicted in FIG. 1, for example, many more players 102 and/or portable wagering media 110 may be included in the system 100 (e.g., such as in the case that the wagering game device 130 comprises a device associated with a table-based wagering game such as poker, that generally includes participation by a plurality of players 102).

The portable wagering medium 110 may generally comprise any type or configuration of object, device, component, chip, puck, check (or cheque), token, ticket, marker, lammer, plaque, and/or substrate that is operable to be utilized to place a wager in a wagering game. In some embodiments, the portable wagering medium 110 may comprise a wagering chip, a portable wagering device, and/or a virtual wagering token, as described herein. In the case that the wagering game device 130 comprises a wagering game table and/or a "smart" wagering game table, for example, the portable wagering medium 110 may comprise one or more wagering chips positioned (e.g., by the player 102) on the wagering game table to place a bet. According to some embodiments, the portable wagering medium 110 may comprise an object that is representative of an indicated face value (e.g., a wagering chip) and/or an object that is accepted by and/or within a casino as wagering consideration. In some embodiments, for example, the portable wagering medium 110 may not comprise objects that do not indicate a face value and/or objects that are not typically accepted at casino properties as wagering consideration (e.g., the portable wagering medium 110 may not comprise, in some embodiments, a car, keys to a car, a watch, and/or cash or coins).

The wagering game device 130, according to some embodiments, may comprise any type or configuration of gaming device associated with execution of a wagering game. The wagering game device 130 may comprise a wagering game table, for example, such as a High Roller Texas Hold'em Poker Table manufactured by Stine Game Tables of El Cajon, Calif., and/or various components and/or accessories thereof. In some embodiments, the wagering game device 130 may comprise a "smart" table (e.g., an electronically facilitated wagering game table) such as the PokerPro® "smart table" manufactured by PokerTek, Inc. of Mathews, N.C. In some embodiments, a multiplayer electronic ("virtual") gaming table may be utilized. Such a device may allow numerous players to partake in rounds of gambling games, without any/all of a live dealer, physical playing cards, or physical wagering chips. Numerous such devices are currently available. For example, Shuffle Master, Inc. of Las Vegas, Nev. manufactures a multiplayer electronic table, marketed as the Table Master™. In some embodiments, memory of a computing device associated with such a table may be loaded with software for executing steps of the present disclosure (e.g., providing "upgraded," virtual wagering media to and accepting such media from players). In some embodiments, a plurality of electronic betting terminals may communicate with a single outcome generation source, whether a live or simulated Baccarat dealer, live or simulated Blackjack (or pontoon) dealer, physical of virtual Roulette wheel, or the like. Paradise Entertainment Limited of Macau manufactures such a terminal-based baccarat network incorporating a live dealer (LIVE Baccarat). According to some embodiments, the wagering game device 130 may comprise a slot machine or other electronic wagering game device and/or a peripheral device that is coupled to a table game and/or electronic wagering game device (e.g., a game monitoring and/or tracking device).

The controller 140 may generally comprise any type or configuration of processing device, controller, server, upgrade device, and/or other computing device that is operable to interface with one or more of the wagering game device 130 and/or the database 190 (and/or the portable wagering medium 110). The controller 140 may, for example, manage, conduct, and/or facilitate the downloading and/or execution of downloadable games playable on one or more wagering game devices 130 (e.g., the controller 140 may comprise a central controller of a server-based gaming environment). According to some embodiments, the controller 140 may also or alternatively be operable to configure a wagering game device 130 (and/or another device, such as a kiosk, Point-Of-Sale (POS) terminal, etc.) remotely, update software stored on the wagering game device 130 and/or to download software or software components to the wagering game device 130. For example, the controller 140 may be operable to apply a hot fix to software stored on a wagering game device 130, modify a payout and/or probability table stored on a wagering game device 130 and/or transmit a new version of software and/or a software component to a wagering game device 130. The controller 140 may be programmed to perform any or all of the above functions based on, for example, an occurrence of an event (e.g., a scheduled event), receiving an indication from a qualified casino employee and/or other person (e.g., a regulator) and/or receiving a request from a player (e.g., the player 102).

The controller 140 may comprise, in some embodiments, an electronic device (e.g., a computer) that is operable to communicate with one or wagering game devices 130. In some embodiments, the controller 140 may function as a computer server and may control or direct at least some processes of wagering game devices 130. Alternately or additionally, the controller 140 may contain or otherwise be configured to read data from and/or write data to one or more databases, such as the database 190. Such data may comprise, for example, probability data, payout data, player data, data associated with and/or descriptive of the portable wagering medium 110, and so on. In some embodiments, outcomes may be "centrally-determined" by the controller 140 and/or by another device that is distinct from the wagering game device 130. Such centrally-determined outcomes may then be promulgated to one or more wagering game devices 130, such that they may be received by the player 102.

In some embodiments, the controller 140 may also or alternatively be in communication with another electronic device (not shown) that is distinct from a wagering game device 130, which electronic device may be operable to, for example, (i) direct the controller 140 to perform certain functions and/or (ii) read data from and/or write data to the central controller 140. For example, the controller 140 may comprise a slot server or Data Collection Unit (DCU) that controls and/or communicates with a bank of wagering game devices 130, which server or DCU is in turn in communication with a casino server that is in communication with a plurality of controllers. In some embodiments, the controller 140 may be operable to communicate with the one or more wagering game devices 130 via another electronic device (e.g., a DCU), such as a server computer operable to communicate with a plurality of wagering game devices 130. For example, in some embodiments, the controller 140 may be operable to communicate with a plurality of computing devices (not shown), each computing device operable to communicate with a respective plurality of wagering game devices 130. According to some embodiments, the controller 140 may not be incorporated into the system 100. In the case that the wagering game device 130 is in direct communication with the database 190, for example, the wagering game device 130 may not require the controller 140 to perform, facilitate, and/or execute the methods and procedures described herein (and/or the functionality of the controller 140 and/or the controller 140 itself may be incorporated into the wagering game device 130).

The database 190 may, according to some embodiments, comprise any type and/or configuration of data storage device that is or become known or practicable. The database 190 may, for example, include any appropriate combination of magnetic, optical and/or semiconductor memory, including, but not limited to one of, or any combination of: (i) RAM; (ii) Dynamic RAM (DRAM); (iii) embedded DRAM (eDRAM); (iv) Static RAM (SRAM); (v) ferroelectric RAM (FeRAM); (vi) magneto-resistive RAM (MRAM); (vii) phase-change RAM (PRAM); (viii) resistive RAM (RRAM); (ix) Nano-RAM (NRAM); (x) zero-capacitor RAM (Z-RAM); (xi) twin-transistor RAM (TTRAM); (xii) Read-Only Memory (ROM); (xiii) programmable ROM (PROM) or field-programmable ROM (FPROM); (xiv) electrically erasable PROM (EEPROM); (xv) flash memory; and/or (xvi) Semiconductor-Oxide-Nitride-Oxide-Semiconductor (SONOS). In some embodiments, the database 150 may include one or more embedded processors, communication ports, CD devices, and/or hard disks (none of which are explicitly shown in FIG. 1).

In some embodiments, the database 190 may store information associated with the portable wagering medium 110. The database 190 may store (e.g., in one or more database records related to the portable wagering medium 110), for example, an identifier for the portable wagering medium 110 and/or an indication of a status of the portable wagering medium 110. While the database 190 is depicted in FIG. 1 as being separate from the wagering game device 130, the portable wagering medium 110, and the controller 140, in some embodiments the database 190 may be coupled to and/or reside within any or all of the wagering game device 130, the portable wagering medium 110, and the controller 140. The database 190 may comprise, for example, a memory device housed within the portable wagering medium 110, a memory device of the wagering game device 130, and/or a memory device of the controller 140.

Portable Wagering Media

Figure 2:
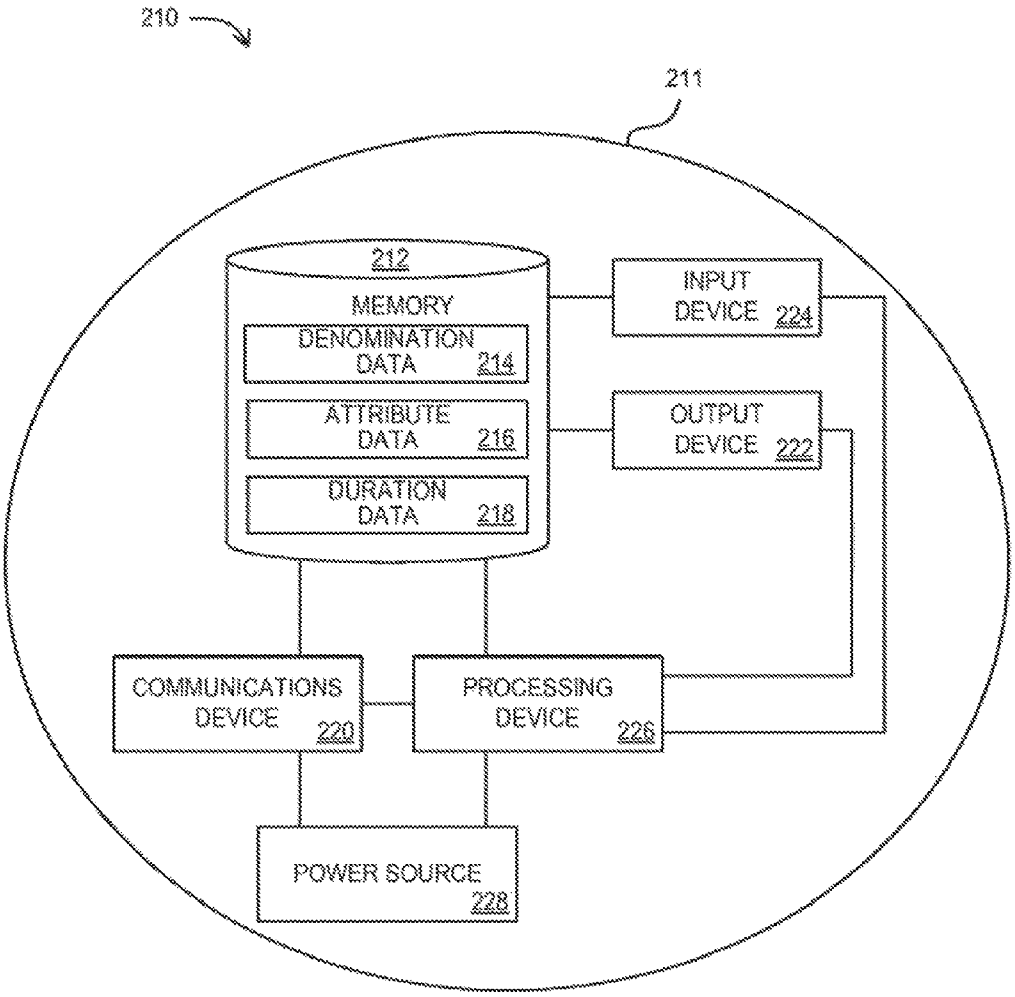
FIG. 2 is a block diagram of a portable wagering medium according to some embodiments.

Turning to FIG. 2, a block diagram of a portable wagering medium 210 according to some embodiments is shown. In some embodiments, the portable wagering medium 210 may be similar in configuration and/or functionality to the portable wagering medium 110 of FIG. 1 herein. The portable wagering medium 210 may comprise, in some embodiments, a casing 211, a memory 212 (storing indications of any or all of denomination data 214, attribute data 216, and duration data 218), a communications device 220, an output device 222, an input device 224, a processing device 226, and/or a power source 228.

In some embodiments (such as shown in FIG. 2), the casing 211 of the portable wagering medium 210 may be substantially circularly shaped and/or may substantially house or enclose any or all of the components 212, 220, 222, 224, 226, 228 of the portable wagering medium 210. The casing 211 may, for example, comprise a casing or housing similar in shape, composition, and/or functionality to that of a typical wagering chip. As described herein, the casing 211 may also or alternatively be otherwise shaped or structured as is or becomes desirable. While circular and/or coin-shaped portable wagering media 210 may be advantageous due to their ease of acceptance into coin operation mechanisms and/or due to player familiarity with or preference for round objects, for example, the casing 211 may, according to some embodiments, be structured as a square or rectangular wagering plaque, a cashless gaming ticket, etc.

The casing 211 may generally be constructed from any number or combination of suitable materials such as clay, plastic (e.g., Acrylonitrile Butadiene Styrene (ABS) plastic), polymer, acrylic, metal, ceramic, and/or composite materials. The casing 211 may generally be constructed in any fashion that is or becomes known or practicable, including compression molding, injection molding, stamping, forging, casting, laminating, and/or die cutting. The casing 211 may be injection molded from a particulate filled thermoset plastic surrounding a metal core ("metal core chips"), for example, or may be injection molded from a synthetic polymer acrylic composite with a laminated center portion (with or without a metal core or inset). The portable wagering medium 210 may, according to some embodiments, typically be constructed to have a mass of between about eight and eleven and one half grams (8-11.5 g) and/or the portable wagering medium 210 (and/or the casing 211 thereof) may typically be constructed to have a standard diameter of approximately one and fifty-four hundredths of an inch (1.54-inches/39-mm). In some embodiments, such as in the case that the portable wagering medium 210 comprises a cashless gaming ticket, the casing 211 may simply comprise a substrate and/or other medium upon which various components and/or features are printed, embedded, and/or otherwise physically coupled.

The memory 212 may store, according to some embodiments, indications of one or more of (i) the denomination data 214, (ii) the attribute data 214, and/or (iii) the duration data 216. The memory 212 may comprise, in some embodiments, any appropriate combination of magnetic, optical and/or semiconductor memory, including, but not limited to one of, or any combination of: (i) RAM; (ii) Dynamic RAM (DRAM); (iii) embedded DRAM (eDRAM); (iv) Static RAM (SRAM); (v) ferroelectric RAM (FeRAM); (vi) magneto-resistive RAM (MRAM); (vii) phase-change RAM (PRAM); (viii) resistive RAM (RRAM); (ix) Nano-RAM (NRAM); (x) zero-capacitor RAM (Z-RAM); (xi) twin-transistor RAM (TTRAM); (xii) Read-Only Memory (ROM); (xiii) programmable ROM (PROM) or field-programmable ROM (FPROM); (xiv) electrically erasable PROM (EEPROM); (xv) flash memory; and/or (xvi) Semiconductor-Oxide-Nitride-Oxide-Semiconductor (SONOS). The memory 212 may, according to some embodiments, comprise and/or comprise a portion of an RFID tag (e.g., that is operable to be read and/or interrogated by an RFID reader). In some embodiments, such as in the case that a plurality of portable wagering media 210 may be desirable to interrogate within a single RF field, the memory 212 may comprise anti-collision features that prevent collisions of data between the various other portable wagering media 210 and the RFID reader. The memory 212 may comprise, for example, an MCRF250 125 kHz microID® Passive RFID Device with Anti-Collision, manufactured by Microchip™ Technology Inc., of Chandler, Ariz.

The denomination data 214 may generally comprise an indication of a dollar (or other currency) value (e.g., a denomination) associated with and/or assigned to the portable wagering medium 210. The denomination data 214 may comprise, for example, an indication of five dollars ($5), which itself indicates that the particular portable wagering medium 210 is worth five dollars ($5) for wagering purposes within a wagering game establishment and/or that the portable wagering medium 210 is exchangeable (e.g., at a casino cashier cage) for five dollars ($5) of currency. In some embodiments, such as in the case that the portable wagering medium 210 comprises a cashless gaming ticket or similar object or substrate, the denomination data 214 may indicate a denomination that is not evenly divisible and/or that is not a whole number. Cashless gaming tickets or receipts, for example, may often be associated with denominations such as six dollars and ten cents ($6.10), thirty-three dollars and forty-two cents ($33.42), etc. According to some embodiments, such as in the case that the denomination of the portable wagering medium 210 may be variable and/or alterable, the denomination data 212 may change over time (e.g., based on any number of triggers and/or events described herein). In the case that the portable wagering medium 210 may be associated with and/or assigned multiple denominations, the denomination data 214 may comprise an indication of each such denomination and/or an indication of rules and/or circumstances regarding which of the multiple denominations are active and/or currently assigned to the portable wagering medium 210.

In some embodiments, the denomination data 214 may also or alternatively be stored and/or indicated in a manner other than simply being stored in the memory 212. The denomination data 214 may, for example, be physically and/or otherwise indicated on or within the portable wagering medium 210 (and/or the casing 211 thereof). The denomination data 214 may, according to some embodiments, be printed, embossed, engraved, etched, and/or otherwise physically, human readably, and/or machine readably indicated by the portable wagering medium 210 and/or the casing 211. Various graphics, patterns, watermarks, etchings, inscriptions, chemical deposits, and/or other features of the portable wagering medium 210 may, for example, indicate a denomination of the portable wagering medium 210, without requiring and/or utilizing the memory 212.

The attribute data 216 may generally comprise one or more indications of one or more attributes associated with and/or assigned to the portable wagering medium 210. The attribute data 216 may comprise, for example, an indication of an attribute of the portable wagering medium 210 that is operable to alter play of a wagering game. As described in detail herein, for example, the attribute may be operable to: (i) give the portable wagering medium 210 "immunity" or "insurance" from certain loss events in a wagering game; (ii) cause a different pay table to be utilized with respect to wins achieved utilizing the portable wagering medium 210; (iii) allow the portable wagering medium 210 to be utilized to place wagers that are not normally allowed in the wagering game; (iv) cause certain normally-occurring outcomes of the wagering game to be altered (e.g., losing outcomes become winning outcomes; outcomes may be "nudged" and/or stolen or mimicked from another player's portable wagering medium 210) with respect to the portable wagering medium 210; (v) cause play of the wagering game to not require commissions to be paid when the portable wagering medium 210 is utilized to place a wager; (vi) cause dealer tips and/or insurance premiums to be automatically paid (e.g. deducted from an account or credit balance) when the portable wagering medium 210 is utilized to place a wager; and/or (vii) provide hints, tips, and/or useful data to a player (e.g., to increase the chances that the player will achieve a winning result in the wagering game).

In some embodiments, the attribute data 216 may comprise an identifier of a specific attribute and/or plurality of attributes assigned to the portable wagering medium 210, an indication of whether an (and/or which) attribute is active, a description of attribute qualities (e.g., "this chip is immune from busts in Blackjack"), and/or a pointer to a secondary data store (not shown in FIG. 2; e.g., that may be external to the portable wagering medium 210). According to some embodiments, the attribute data 216 may also or alternatively be indicated or stored in a manner other than simply storing an indication in the memory 212. As described herein, for example, any indications of data (which may include the data itself of course) may be indicated via the output device 222 and/or via the casing 211. The word "Immunity" may be permanently or removably indicated on the casing 211, for example, and/or may be displayed via a display device (e.g., the output device 222) of the portable wagering medium 210. For example, one embodiment of portable wagering medium 210 comprises a non-electronic wagering chip labeled with a particular attribute (e.g., "Immunity," "Blackjacks pay 2:1"); the player may pay a premium (a fee above and beyond the chip's face value) for such an attribute-labeled chip when acquiring it from a casino booth, kiosk or the like (as described further herein).

The duration data 218 may generally comprise an indication of a time frame and/or window during which the attribute described and/or defined by the attribute data 216 may be active. In the case that multiple attributes are associated with and/or assigned to the portable wagering medium 210, multiple durations may be indicated by the duration data 218 (e.g., one or more durations assigned to each attribute). In some embodiments, such as in the case that an attribute is perpetual (e.g., non-expiring), no duration data 218 may be necessary. Alternatively, the duration data 218 for such an attribute may simply comprise an indication such as "perpetual" or "N/A" to indicate the non-expiring nature of the attribute. According to some embodiments, the duration may be descriptive of one or more events, times, dates, and/or other factors that govern use or activation of an attribute. The attribute data 218 may describe, for example, one or more rules for determining whether an attribute is active or available for use, or one or more rules for determining when and/or who an attribute expires. In some embodiments, the duration data 218 may comprise a portion of the attribute data 216.

In some embodiments, the attribute data 216 may also or alternatively comprise identification data (not explicitly shown) for the portable wagering medium 210. The identification data may generally comprise an indication of an identifier, such as a unique identifier, associated with the portable wagering medium 210. The identification data may comprise, for example, a name, number, alphanumeric designator, serial number, code, a matrix, and/or any other sequence or identifier that is operable to facilitate identification of the portable wagering medium 210. In some embodiments, the identification data may also or alternatively comprise an indication of a specific group or class to which the portable wagering medium 210 belongs. According to some embodiments, an indication of a group or class may comprise the only identification data. It may be desirable for a casino, for example, to change or update the denominations and/or attributes of a certain group or class of portable wagering media 210 (e.g., wagering chips) throughout the casino. All one hundred dollar ($100) chips 210 in the casino may be temporarily upgraded with a five dollar ($5) bonus amount over the face value denomination, for example, such as to promote the purchase of high-value wagering chips 210. Similarly, a group of chips 210 may comprise a full set or subset of wagering chips 210 possessed by a particular player or group of players, for example, and the particular player of group of players may therefore have all of their wagering chips 210 upgraded (e.g., to win 'pushes' for ten (10) minutes) and/or entered into secondary game play, in accordance with some embodiments.

According to some embodiments, the portable wagering medium 210 may comprise the communications device 220, the output device 222, the input device 224, and/or the processing device 226. Any or all of these components 220, 222, 224, 226 may comprise any type or configuration of appropriate devices that are or become known or practicable. Such components 220, 222, 224, 226 may, for example, comprise one or more devices that are similar to the other similarly-named and/or numbered components described herein. In some embodiments, such as in the case that the portable wagering medium 210 comprises a wagering chip, the input device 224 may comprise a button that is coupled to be actuated by a player or dealer to provide input to the processing device 226. The output device 222 may comprise, according to some embodiments, a display device, a sound emitting device (e.g., a speaker), and/or any other type of output device (e.g., a transmitter or an olfactory emitter). The output device 222 may comprise, for example, one or more LED, LCD, incandescent, Electroluminescent Panel (ELP), plasma, and/or Col Cathode Fluorescent Lamp (CCFL) display devices coupled to provide visual indications of denominations and/or attributes (and/or attribute durations) of the portable wagering medium 210, and/or may comprise a speaker operable to emit beeps and/or play tones, tunes, and/or songs (e.g., to indicate various attributes of the portable wagering medium 210 and/or events that have occurred in relation thereto).

In some embodiments, the communications device 220 may comprise any device that is operable to at least provide an indication of the denomination and/or attribute of the portable wagering medium 210 to a device associated with a wagering game. The communications device 220 may comprise, for example, a transmitter and/or antennae loop or circuit operable to provide indications to a separate device such as the wagering game device 130 of FIG. 1 herein. According to some embodiments, the indications of the denomination, attribute, and/or duration may cause the wagering game device to alter play of a wagering game. Such indications and/or signals may generally be provided to the communications device 220 by the processing device 226 and/or may be caused to be generated by the communications device 220 in response to the processing device 226. In some embodiments, the communications device 220 may also or alternatively receive indications and/or signals, such as from a wagering game device, upgrade device, and/or controller. Such signals and/or indications may, in some embodiments, be passed to the processing device 226. The processing device 226 may utilize such information to update the memory 212, for example, and/or to cause the output device 222 to provide certain indications of the denomination, attribute, and/or duration (or to cause the output device 222 to cease outputting, as the case may be).

According to some embodiments, the portable wagering medium 210 may also or alternatively comprise the power source 228. The power source 228 may generally comprise any type or configuration of device that is operable to provide power to one or more of the processing device 226, the input device 224, the output device 222, the communications device 220, and/or the memory 212, which is or becomes known or practicable. The power source 228 may comprise, for example, a battery, an Alternating Current (AC) source and/or component, a Direct Current (DC) source and/or component, an AC/DC adapter, solar cells, an inductive coil, a capacitor, and/or an inertial generator. A Lithium-ion polymer (Li-poly), Lithium-ion (Li-ion), Nickel Cadmium (NiCad), and/or Nickel Metal Hydride (NiMH) battery may, for example, supply the necessary voltage and/or amperage to power any or all of the components 212, 220, 222, 224, 226, 228 of the portable wagering medium 210.

In some embodiments, the portable wagering medium 210 may not comprise the power source 228, the processing device 226, the input device 224, and/or the output device 222. In a simplistic form, for example, the portable wagering medium 210 may comprise the casing 211, housing and/or otherwise coupling to the communications device 220 (e.g., an antennae), which itself would be at least communicatively coupled to the memory 212. The communications device 220 may, in some embodiments, provide information stored in the memory 212 to a wagering gaming device (e.g., to alter play of the wagering game device).

In some embodiments, the portable wagering medium 210 may be implemented by inclusion of various features, structures, and/or configurations that may be advantageous to implementation of some embodiments.

Figure 3:
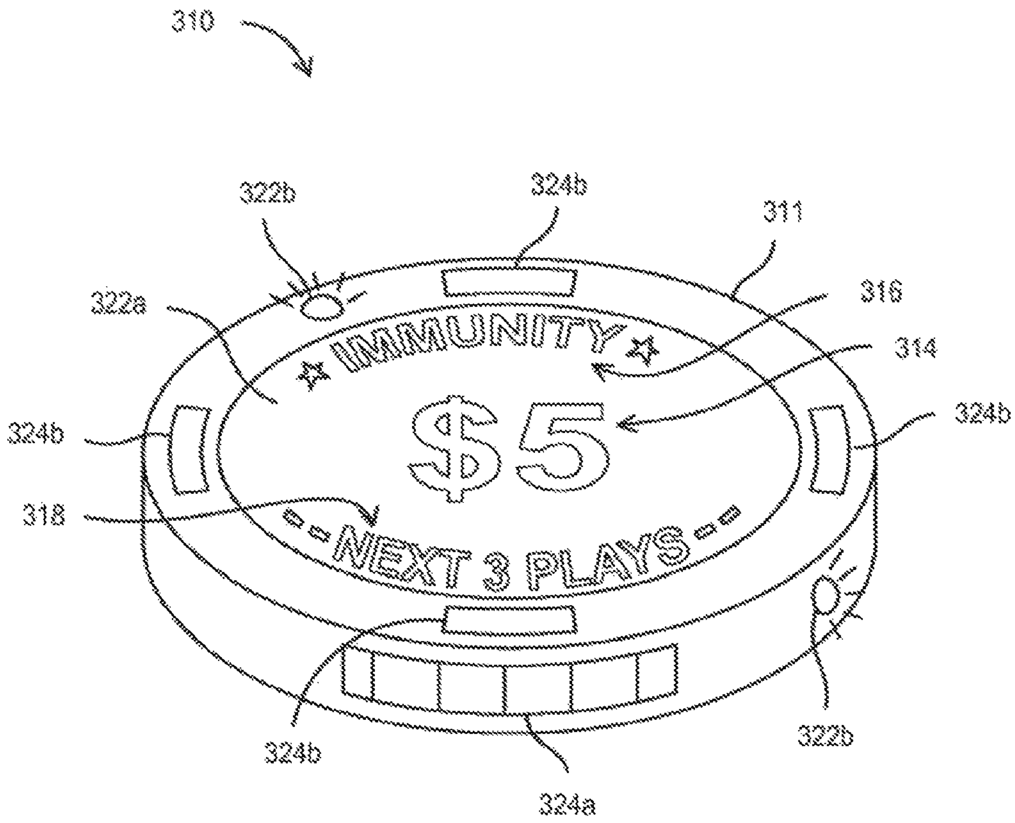
FIG. 3 is a perspective diagram of a portable wagering medium according to some embodiments.

Turning to FIG. 3, for example, a perspective diagram of a portable wagering medium 310 according to some embodiments is shown. In some embodiments, the portable wagering medium 310 may be similar in configuration and/or functionality to any of the portable wagering media 110, 210 of FIG. 1 and/or FIG. 2 herein. The portable wagering medium 310 may comprise, in some embodiments, a casing 311, an indication of a denomination 314, an indication of an attribute 316 that is operable to alter play of a wagering game, an indication of a duration 318 of the attribute 316, a first output device 322*a*, a second output device 322*b*, a first input device 324*a*, and/or a second input device 324*b*. In some embodiments, the output devices 322*a-b* may output the indications of the denomination 314, the attribute 316, and/or the duration 318. According to some embodiments, the components 311, 322*a-b*, 324*a-b* of the portable wagering medium 310 may be similar in configuration and/or functionality to the similarly named and/or numbered components described in reference to any of FIG. 1 and/or FIG. 2 herein. The perspective illustration of the portable wagering medium 310 of FIG. 3 is provided for exemplary purposes only and is not intended to limit the scope of any embodiments described herein.

In FIG. 3, the portable wagering medium 310 is depicted as a wagering chip with a circular casing 311, a first output device 322*a* comprising a display device, a second output device 322*b* comprising a plurality of illumination devices, a first input device 324*a* comprising an input-receiving lens or scanner, and a second input device 324*b* comprising a plurality of electrical contacts. As shown in FIG. 3, in some embodiments substantially an entire face of the portable wagering medium 310 may comprise the first output device 322*a* to define a display surface and/or screen. In other words, the first output device 322*a* may be configured in size, shape, and/or orientation to cover and/or comprise any portion of the face of the first portable wagering medium 310, such as the entire face as shown in FIG. 3. In such a manner, for example, the amount of information (e.g., denomination 314, attribute 316, and/or duration 318 information) that may be presented and/or represented by the first output device 322*a* may be enhanced and/or increased.

As shown in FIG. 3, the first output device 322*a* may be utilized to display indications of any or all of the denomination 314 (e.g., five dollars ($5)), the attribute 316 that is operable to alter play of a wagering game (e.g., "immunity"), and the duration 318 of the attribute 316 (e.g., the "immunity" is good for the next three (3) plays or wagers). According to some embodiments, the second output device 322*b* may also or alternatively be utilized to provide indications of such information. The second output device 322*b* may, for example, comprise one or more LED devices that illuminate and/or blink to indicate a particular attribute and/or to indicate that the attribute is active or has been utilized. Upon utilizing the portable wagering medium 310 to place a losing wager, for example, the second output device 322*b* may blink to indicate that the attribute 316 of "immunity" is activated and/or applicable, such that a dealer may be visually alerted that the portable wagering medium 310, being "immune", should not be collected with any other losing wagering media.

In some embodiments, such as in the case that the portable wagering medium 310 is hard-coded with a certain attribute 316 (e.g., a series of portable wagering media are dedicated "immunity" chips), the first output device 322*a* may simply comprise a face of the portable wagering medium 310 and/or a portion of the casing 311. The denomination 314, attribute 316, and/or duration 318 may, for example, be engraved into or printed on the casing 311, since such information may be static. In some embodiments, the first output device 322*a* may comprise a separate device, substrate, topper, and/or "inset" upon which the indications 314, 316, 318 are set, such that different "insets" may be coupled to the portable wagering medium 310 to indicate different denominations 314, attributes 316, and/or durations 318. Different "insets", for example, may be removably coupled to the casing 311 as desired, via magnetic, adhesive (such as in the case that the "inset" is substantially disposable), and/or hook-and-loop fastening (e.g., such as those manufactured by the Velcro® company of Manchester, N.H.).

In some embodiments, the first output device 322*a* may only display a subset of the indications 314, 316, 318, such as the denomination 314, while the second output device 322*b* may provide any remaining indications 316, 318, such as by illuminating in a specific color (e.g., red) if and when the attribute 316 of "immunity" is active. In some embodiments, the duration 318 may not be necessary to display—such as in the case that the attribute 316 is perpetual and/or otherwise always active or available for use.

According to some embodiments, the first input device 324*a* may comprise an IR receiver or lens and/or a biometric device such as a finger or thumbprint scanner or reader. The first input device 324*a* may, for example, allow a player in possession of the portable wagering medium 310 to indicate an identity of the player, such as by swiping a finger or thumb across the first input device 324*a* and/or by transmitting a signal from a device associated with the player (e.g., from the player's cell phone). In some embodiments, selection, purchase, activation, and/or use of the attribute 316 may be initiated, triggered, verified, and/or authenticated by such player identification information. In the case that the attribute 316 is assigned to the player, for example (e.g., and not to any specific portable wagering medium 310), the player may cause the attribute 316 to be assigned and/or associated with the portable wagering medium 310 by utilizing the first input device 324*a* (e.g., "registering" the portable wagering medium 310;). This may be considered, for example, effectively "wiping" the attribute 316 "off of the player", so to speak, and "onto" the portable wagering medium 310. Such a "wiping-off" process may similarly be employed to transfer the attribute 316 from one portable wagering medium 310 to another (e.g., by rubbing two portable wagering media together and/or swiping input devices 324*a-b* across each other). In such embodiments, the attribute 316 may be transferred or duplicated (e.g., spread from one portable wagering medium 310 and/or player to another portable wagering medium 310 and/or player) or may cause activation and/or use of an attribute.

The second input device 324*b* may comprise, according to some embodiments, one or more electrical contacts, such as shown being disposed along the periphery of a face of the portable wagering medium 310 in FIG. 3. Such contacts 324*b* may interface with various other objects such as wagering game devices, dealer devices, upgrade devices, player devices, and/or other portable wagering media 310. The portable wagering medium 310 may initially be void of denomination 314, attribute 316, and/or duration 318 information, for example, and upon purchase or upgrade may receive data from an upgrade device via the contacts 324*b*. Similarly, the portable wagering medium 310 may otherwise be programmed or re-programmed as desired by electrically coupling the contacts 324*b* to a dealer device operable to transmit data 314, 316, 318 to the portable wagering medium 310. As described herein, the portable wagering medium 310 may comprise any number, combination, and/or configuration of input devices 324*a-b* and/or output devices 322*a-b* that are or become practicable.

Figure 4:
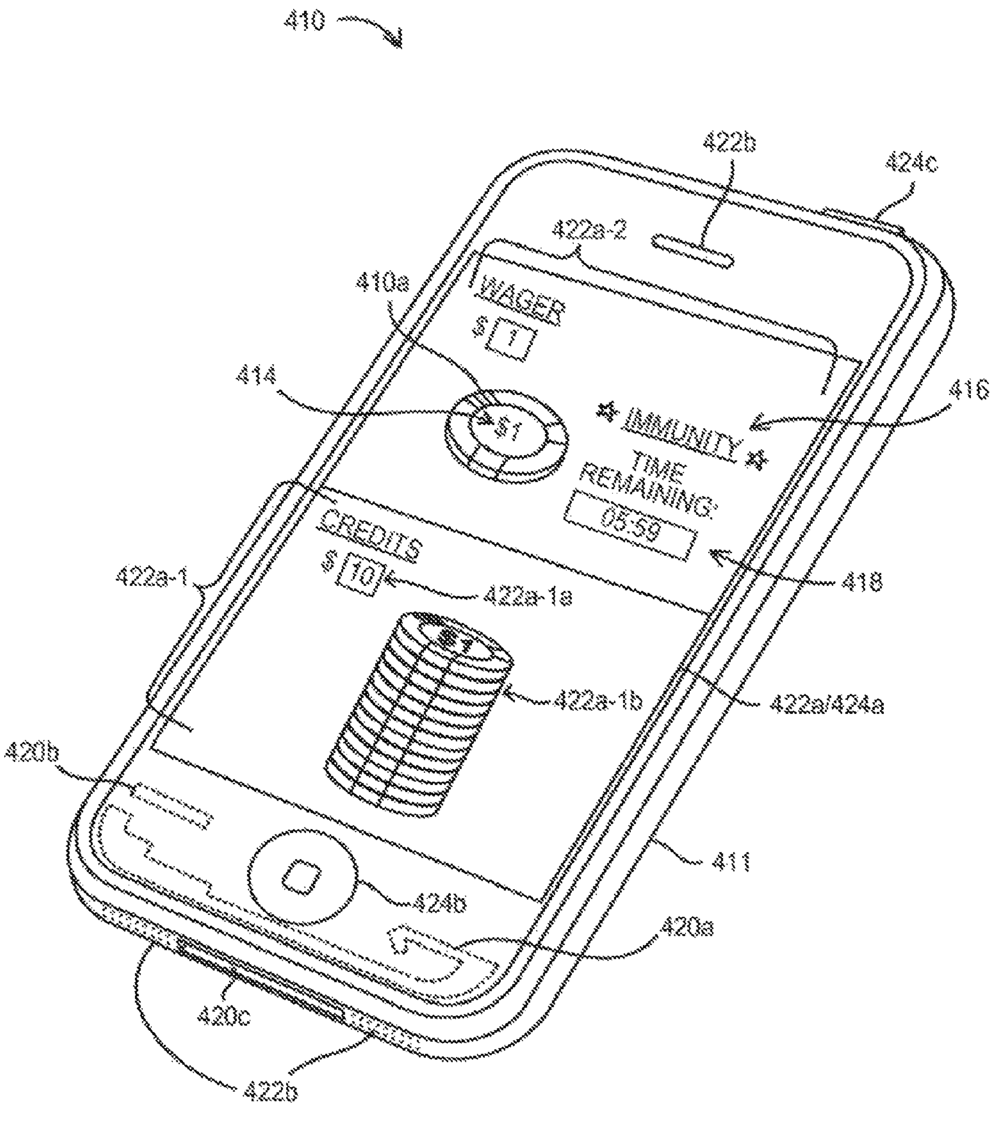
FIG. 4 is a perspective diagram of a portable wagering medium according to some embodiments.

Referring now to FIG. 4, a perspective diagram of a portable wagering medium 410 according to some embodiments is shown. In some embodiments, the portable wagering medium 410 may be similar in configuration and/or functionality to any of the portable wagering media 110, 210, 310 of FIG. 1, FIG. 2, and/or FIG. 3 herein. In some embodiments, the portable wagering medium 410 may be defined as the portable electronic device depicted in FIG. 4. According to some embodiments, the portable electronic device 410 may be considered a player device, while a representation of one or more virtual wagering tokens 410*a* displayed via the portable electronic device 410 may be considered the actual "portable wagering medium".

In the case that the electronic device 410 comprises the "portable wagering medium", the portable wagering medium 410 may generally comprise a casing 411, an indication of a denomination 414, an indication of an attribute 416 that is operable to alter play of a wagering game, an indication of a duration 418 of the attribute 416, a first communications device 420*a*, a second communications device 420*b*, a third communications device 420*c*, a first output device 422*a* (e.g., comprising a first portion 422*a*-1, an indication of a credit balance 422*a*-1*a*, a virtual representation 422*a*-1*b* of the credit balance 422*a*-1*a*, and/or a second portion 422*a*-2), a second output device 422*b*, a first input device 424*a*, a second input device 424*b*, and/or a third input device 424*c*. According to some embodiments, the components 411, 420*a-c*, 422*a-c*, 424*a-c* of the portable wagering medium 410 may be similar in configuration and/or functionality to the similarly named and/or numbered components described in reference to any of FIG. 1, FIG. 2, and/or FIG. 3 herein. The perspective illustration of the portable wagering medium 410 of FIG. 4 is provided for exemplary purposes only and is not intended to limit the scope of any embodiments described herein.

In some embodiments (such as depicted in FIG. 4), the portable wagering medium 410 may comprise a wireless and/or cellular telephone and/or PDA device, depicted in FIG. 4 as being similar to an Apple® iPhone®. In such embodiments, the portable wagering medium 410 may be utilized to conduct and/or facilitate mobile wagering and/or may be utilized as a portable platform operable to interface directly with a separate and/or standard wagering game device (such as the wagering game device 130 of FIG. 1). Payment and/or placing of wagers may be conducted via the portable wagering medium 410, for example. In some embodiments, the portable wagering medium 410 embodied as a wireless communications device may also or alternatively be operable or configured to conduct at least a portion of the wagering game play. For ease of illustration only, the portable wagering medium 410 is depicted as being utilized to place a wager in a wagering game.

As shown in FIG. 4, for example, the first output device 422*a* may comprise a display device that displays the wagering denomination 414, the attribute 416 that is operable to alter play of the wagering game, and/or the duration 418 of the attribute 416. As depicted, the first portion 422*a*-1 of the display 422*a* may be utilized to display a numeric representation of the credit balance 422*a*-1*a* (e.g., associated with a particular player and/or group of players). The first portion 422*a*-1 of the display 422*a* may also or alternatively depict the virtual representation 422*a*-1*b* of the credit balance 422*a*-1*a*. The virtual representation 422*a*-1*b* may comprise, as shown for example, perspective images of a number of virtual wagering tokens that comprise the credit balance 422*a*-1*a*. In some embodiments, the virtual representation 422*a*-1*b* may provide other images, icons, and/or representations depicting the credit balance 422*a*-1*a*, as is or becomes desirable. According to some embodiments, for example, different stacks of different denominations of virtual tokens may be shown and/or various stacks of virtual tokens may be displayed in the background, as thumbnail images or icons, and/or may be presented on various "screens" that may be 'flipped' through by the player.

In the case that the display/first output device 422*a* comprises a touch-sensitive display, for example, the first output device 422*a* may double as the first input device 424*a*. The player may utilize a finger swipe and/or input on the touch screen 424*a*, according to some embodiments, to select one or more portions (e.g., one or more virtual tokens) of the credit balance 422*a*-1*a* to utilize for placing a wager (such as the virtual token 410*a*). The player may select a virtual token from the first portion 422*a*-1 of the display 422*a* by touching, for example, and dragging the token (or tokens) to the second portion 422*a*-2 of the display 422*a*. The second portion 422*a*-2 may, for example, comprise a region of the display 422*a* that defines one or more wagers made by the player. As shown in FIG. 4, the virtual token 410*a* displayed in the second portion 422*a*-2 of the display 422*a* comprises a virtual representation of a one-dollar ($1) token utilized to place a one-dollar ($1) wager (e.g., indicated by the denomination 414). Also as shown, the virtual token 410*a* selected for wagering comprises the attribute 416 which for exemplary purposes is shown as "immunity". As described herein, while an "immunity" attribute 416 may prevent the virtual token 410*a* from being lost in an unsuccessful wager generally, it may alternatively prevent loss for a subset of possible losing wagering game outcomes. In Roulette, for example, the "immunity" attribute 416 may comprise "outside bet immunity", and/or "immunity from red" and/or "immunity from $1^{st}$ 12".

Also as shown in FIG. 4, the duration 418 may be presented via the second portion 422*a*-2 of the display 422*a*. In some embodiments, the duration 418 may comprise an indication of how much time remains for the attribute 416 to be active (such as the countdown meter shown in FIG. 4). According to some embodiments, the duration 418 may also or alternatively indicate a time, date, and/or criteria that will trigger activation of the attribute 416 or that will cause the attribute 416 to expire or degrade. A "full immunity" attribute 416 may degrade to a partial immunity after a single loss or use, for example, and may be eliminated after a subsequent loss or use. Similarly, an attribute 416 that causes a different wagering game pay table to be utilized with respect to wagers placed utilizing the virtual token 410*a* may actually cause a plurality of pay tables of diminishing advantage to be utilized in consecutive order as time passes.

In some embodiments, indications of any or all of the denomination 414, the attribute 416, and/or the duration 418 may be broadcast, transmitted, and/or otherwise provided via any or all of the output devices 422*a-b* and/or the communications devices 420*a-c*. An indication that the attribute 416 is active and/or has been utilized may comprise a sound and/or tune (e.g., a ring tone) output by the second output device 422*b*, for example, such as in the case that the second output device 422*b* comprises a speaker, as shown in FIG. 4. According to some embodiments, an indication of the attribute 416, and/or selection, activation, expiration, and/or utilization of the attribute 416 may be provided to a separate device such as a wagering game device via one or more of the first communications device 420*a* and the second communications device 420*b*. The first communications device 420*a* may comprise a wireless telephone antennae such as a Global System for Mobile communications (GSM) antennae, for example, and/or the second communications device 420*b* may comprise a Wi-Fi® and/or other wireless broadband communications antennae. The communications devices 420*a-c* may also or alternatively receive indications associated with any or all of the denomination 414, the attribute 416, and/or the duration 418 (such as from an upgrade device).

In some embodiments, the third communications device 420*c* may generally comprise a hard-wired connectivity port such as may be utilized to interface with accessory electronic devices, computers, upgrade devices, wagering game devices, and/or power sources (such as the power source 228 of FIG. 2). A cable and/or connector may mate and/or dock with the third communications device 420*c*, for example, to establish hard-wired communications between the electronic device/portable wagering medium 410 an any other desired device (such as a charging device, in the case that the power source 228 of FIG. 2 comprises a rechargeable device housed within the casing 411).

In some embodiments, the second input device 424*b* and/or the third input device 424*c* may comprise one or more buttons, switches, and/or other selection devices. The second input device 424*b* may comprise, for example, a directional selection button that is operable to receive directional inputs. The third input device 424*c* may comprise a simple on/off, sleep, and/or activation/deactivation switch, as shown. According to some embodiments, any or all input functionality may be implemented and/or realized by utilizing one or more other input devices not shown in FIG. 4. One or more internal pressure, inertial, and/or accelerometer devices housed within the casing 411 may, for example, be utilized to impart directional and/or other inputs to the electronic device/portable wagering medium 410. Tilting the electronic device/portable wagering medium 410 at various angles, shaking it, and/or tapping it on a surface may, in some embodiments, impart input that may, for example, cause an attribute 416 to be activated and/or selected.

According to some embodiments, the electronic device/portable wagering medium 410 may also or alternatively comprise an upgrade device such as the upgrade device 140 of FIG. 1. A portion of the touch screen 424*a* may comprise a soft-key and/or button or selectable area, for example, that allows a player to choose to upgrade a virtual token 410*a* (and/or otherwise purchase, select, and/or activate an attribute 416, such as may be assigned to the player and/or the electronic device 410). The virtual token 410*a* may have been selected and dragged from the first portion 422*a*-1 of the display 422*a* into the second portion 422*a*-2 of the display 422*a*, to indicate a desire to utilize the virtual token 410*a* to place a wager for example, and then an upgrade such as he attribute 416 may have been selected and/or purchased for association with the virtual token 410*a*. Similarly, the touch screen 424*a* and/or any other interface may be utilized to purchase and/or add more time to the duration 418 (e.g., to extend the usefulness and/or activation period of the attribute 416).

Programming Process

Figure 5:
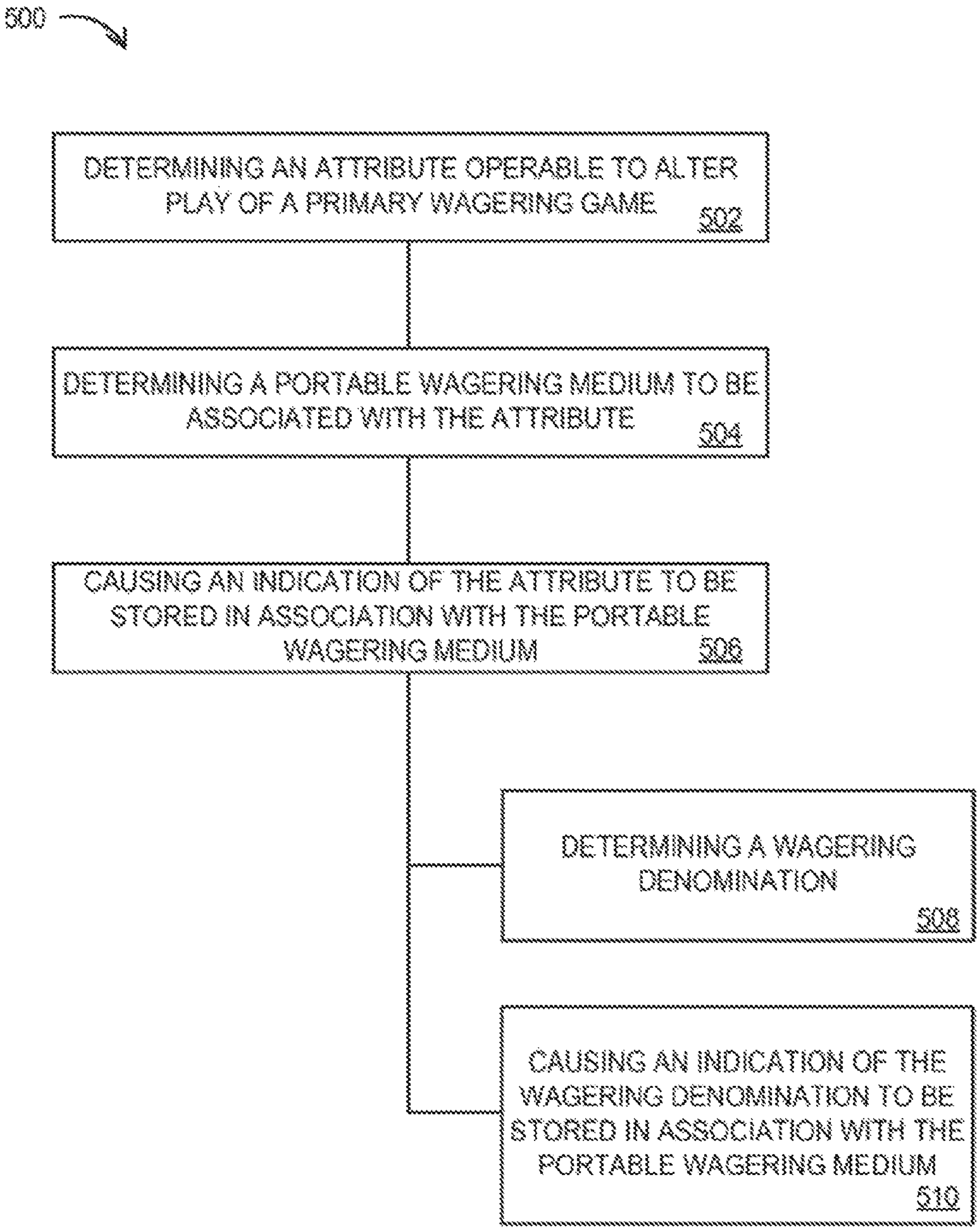
FIG. 5 is a flow diagram of a method according to some embodiments.

Referring now to FIG. 5, a flow diagram of a method 500 according to some embodiments is shown. The method 500 may comprise, for example, a method of programming a portable wagering medium for use in playing altered wagering games, as described herein. In some embodiments, the method 500 (or portions thereof), and all other processes described herein unless expressly specified otherwise, may be performed and/or implemented by and/or otherwise associated with (i) a wagering game device such as the wagering game devices 130 of FIG. 1 and/or (ii) an upgrade device such as the upgrade device 140 of FIG. 1. The methods, procedures, and/or processes described herein may generally be performed by one or more of the systems (e.g., the system 100 of FIG. 1) and/or any of the many components and/or devices described herein. Other configurations of systems and devices may also or alternatively be utilized to perform the methods described herein without deviating from the scope of some embodiments.

Additionally, while some of the steps and/or procedures of a process or method may be performed by a first device, other steps and/or procedures may be performed by another device and/or a combination of devices. Further, the method 500, and all other processes described herein unless expressly specified otherwise, may include steps and/or procedures in addition to those expressly depicted in the figures or described in the specification without departing from the spirit and scope of some embodiments. Similarly, the steps and/or procedures of the method 500 and any other processes described herein, unless expressly specified otherwise (numbering of steps/procedures for reference purposes does not constitute an express ordering of such steps/procedures), may be performed in an order other than depicted in the figures or described in the specification, as is or becomes practicable and/or appropriate. It should also be noted that any of the methods described herein may be performed by hardware, software (including microcode), firmware, or any combination thereof. For example, a storage medium may store thereon instructions that when executed by a machine result in performance according to any of the embodiments described herein.

In some embodiments, the method 500 may comprise determining an attribute operable to alter play of a primary wagering game, at 502. An indication of the attribute may be received, for example, from a player that has selected the attribute (such as from a list of available attributes). In the case that the attribute is determined based on player input and/or preferences, such input and/or preference data may be obtained from and/or provided by a wagering game device, an upgrade device, a player device, and/or a portable wagering medium. The player may select an "upgrade" option presented via an interface of a wagering game device, for example, and/or may utilize a player device such as a PDA and/or cell phone to indicate a desire to upgrade a portable wagering medium by assigning an attribute thereto. In some embodiments, the player may indicate that the player desires to purchase a pre-upgraded portable wagering medium and/ or chip from a chip upgrade kiosk (such as in the case that certain chips are pre-programmed and/or hard-programmed with certain attributes).

In some embodiments, the attribute may be retrieved, looked-up, and/or otherwise determined by querying a database. In the case that portable wagering media are intended to be pre-programmed and/or hard-programmed with specific attributes and/or attribute options, for example, an automated process of an upgrade device may select attributes to assign to portable wagering media en masse, in accordance with pre-determined programming parameters and/or goals. If a casino desires one thousand (1000) gaming chips pre-loaded with an "auto tipping" attribute, for example, an upgrade device may be configured to select the "auto tipping" attribute to associate with and/or assign to one thousand (1000) chips that are processed for programming. Attributes for other groups and/or sets or series of chips may similarly selected. In some embodiments, the attribute may be randomly selected from a set of available attributes. Such random allocation may, in some embodiments, be modified and/or managed to achieve certain allocation percentages of attributes among processed chips (e.g., twenty percent (20%) of chips are to be associated with "immunity" attributes, while eighty percent (80%) of chips are to be associated with "outcome nudging" attributes—which is a simplistic example of a pre-determined chip attribute allocation scheme).

According to some embodiments, the method 500 may comprise determining a portable wagering medium to be associated with the attribute, at 504. In the case that a player already has possession of a portable wagering medium for which an upgrade (e.g., attribute) is desired, the player's portable wagering medium may be identified. An identity of the portable wagering medium may be received from the player, such as by receiving player input into a kiosk or other interface for example, and/or may be determined by scanning and/or interrogating the portable wagering medium (e.g., in the case that the portable wagering medium stores and/or visually and/or machine readably indicates an identifier for the portable wagering medium). In some embodiments, such as in the case that a player desires to purchase a portable wagering medium such as a wagering chip with an upgrade, the chip may be determined and/or selected randomly from a plurality of available chips, or may be selected as a next-available chip. In the case that a store of available chips are available at a casino cashier cage and/or automated upgrade kiosk, for example, chips may be randomly selected by a cashier and/or by the kiosk for programming with the selected attribute, or may be dispensed or provided in series (e.g., one at a time), such that only a subset of available chips are available as "next-available" at any given time.

In some embodiments, the method 500 may comprise causing an indication of the attribute to be stored in association with the portable wagering medium, at 506. In the case that the portable wagering medium comprises a memory (such as the memory 212 of FIG. 2), an indication of the attribute may be loaded into the memory. Wired and/or wireless signals may be provided to the portable wagering medium, for example, that cause an identifier, description, and/or rules associated with the attribute to be stored. The storing may, in some embodiments, comprise a substantially automated process, such as in the case that an upgrade device "pre-programs" portable wagering media in bulk. In such embodiments, a plurality of portable wagering media may be directed through a particular area to receive appropriate signals, singularly, or in groups, sets, and/or series, as desired. In the case that a portable wagering medium is "programmed" specifically in response to a player's request, the portable wagering medium may be coupled by a cashier and/or kiosk or wagering game device to receive the appropriate signal or signals. According to some embodiments, a cashier may 'swipe' a wagering chip across an electronic contact surface, through a magnetic field area, through an IR beam array, and/or may otherwise physically and/or electrically couple the chip to receive the signals. A wagering game device and/or upgrade device or kiosk may similarly position the desired chip to receive the appropriate wired and/or wireless programming signal, such as by passing the chip through a particular chute in which electrical contacts reside and/or in which the signal is specifically transmitted.

In some embodiments, the indication may be stored separate and/or remote from the portable wagering medium. A database of a central controller, upgrade device, and/or wagering game device may store attribute information for each available portable wagering medium identifier, for example. Such an external database may be utilized, for example, in the case that attributes are (at least preliminarily) associated with and/or assigned to players. Then, upon a player acquiring a portable wagering medium, one or more of the player's attributes may be assigned to and/or stored in association with the portable wagering medium.

In some embodiments, the "storing" of the indication of the attribute may comprise printing, marking, engraving, stenciling, embossing, manufacturing and/or otherwise physically causing a representation of the attribute to become associated with the portable wagering medium. The portable wagering medium itself may have the indication printed upon it, for example, and/or an inset or "topper" may be printed and/or chosen to be coupled to the portable wagering medium. A sticker or other low-tech means may also or alternatively be utilized to associate an attribute with a portable wagering medium.

According to some embodiments, the method 500 may comprise determining a wagering denomination, at 508. The wagering denomination may, for example, simply comprise the value of a portable wagering medium for wagering purposes. The denomination may also or alternatively correspond to a cash exchange value of the portable wagering medium. In some embodiments, the denomination may correspond to an amount of currency paid by a player in exchange for the portable wagering medium. According to some embodiments, such as in the case that the portable wagering medium is assigned an attribute that has a value, the denomination may be less that the player paid for the portable wagering medium. In the case that an attribute costs twenty-five cents ($0.25) and a portable wagering medium to which the attribute is assigned has a face value and denomination of five dollars ($5), for example, the player may have paid in excess of the five dollars ($5) to obtain the portable wagering medium and attribute (e.g., the player may have paid five dollars and twenty-five cents ($5.25), or some smaller amount over five dollars ($5) in the case that the attribute was offered at a discount).

According to some embodiments, the denomination may be determined from the portable wagering medium itself (e.g., from an RFID memory device coupled to the portable wagering medium and/or from a barcode printed on the portable wagering medium). In some embodiments, the denomination may be obtained from a database of available denominations, and/or may be obtained utilizing an identifier of the portable wagering medium. In the case that the denomination of the portable wagering medium is variable, the denomination may be determined by determined and/or evaluating one or more rules governing the value of the denomination assigned to the portable wagering medium. In some embodiments, the determination of the denomination may be conducted at intervals, substantially continuously, and/or upon detected change events. In the case that the portable wagering medium is moved from one location to another, for example, a query may be initiated to determine if the denomination of the portable wagering medium has changed as a result of the move. Similarly, various wagering game events, events associated with the player, events associated with the portable wagering medium, and/or external events may be determined to trigger a determination of the denomination.

In some embodiments, the method 500 may comprise causing an indication of the wagering denomination to be stored in association with the portable wagering medium, at 510. The storing of the wagering denomination may generally be conducted in a manner similar to how the indication of the attribute may be stored. The denomination may be stored in a memory of the portable wagering medium, for example, and/or in a remote database. Also or alternatively, an indication of the denomination may be printed and/or otherwise marked on the portable wagering medium itself (e.g., printed on one or more faces of a portable wagering medium chip—such as is descriptive of the term "face value").

According to some embodiments, other information may also or alternatively be determined and/or stored in relation to the portable wagering medium. A duration of the attribute may, for example, be determined and stored in a memory of the portable wagering medium (and/or printed on the portable wagering medium). Any or all of the information stored in association with the portable wagering medium may, in some embodiments, be selected, chosen, and/or defined by a player. A player may verbally interface with a casino employee, for example, and/or may interface with a kiosk and/or wagering game device via which upgraded portable wagering media (and/or upgrades/attributes for previously purchased portable wagering media) may be purchased and/or other wise obtained.

Programming Interface

Figure 6:
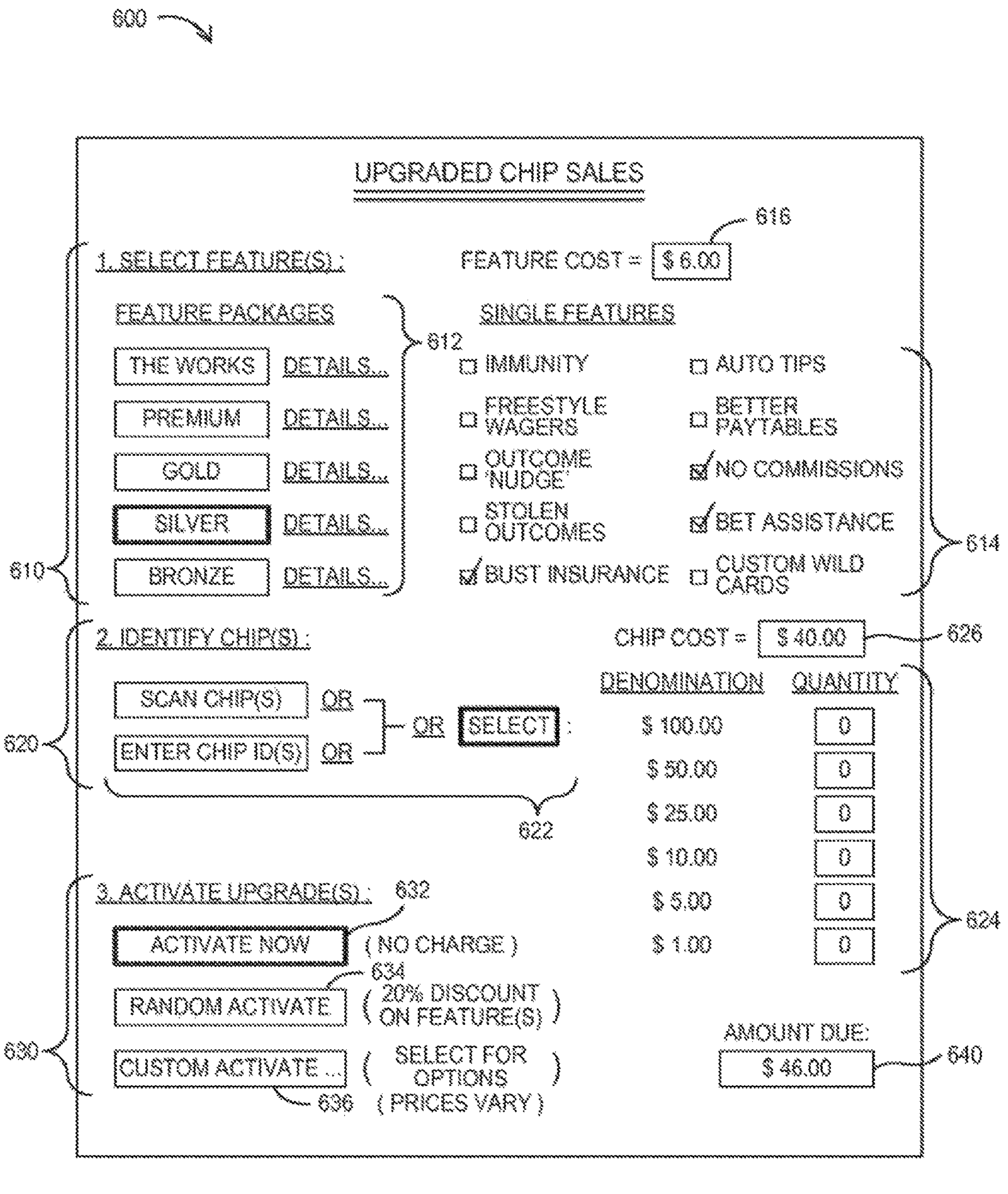
FIG. 6 is a diagram of an exemplary interface according to some embodiments.

Turning to FIG. 6, for example, a diagram of an exemplary interface 600 according to some embodiments is shown. In some embodiments, the interface 600 may be provided to a user (i.e., a player, or casino representative programming wagering media on behalf of players through use of the interface 600) via a player device, a wagering game device (such as the wagering game device 130 of FIG. 1), an upgrade device (such as the upgrade device 140 of FIG. 1), and/or via a portable wagering medium itself. The interface 600 may generally facilitate a player's purchase and/or other acquisition of a portable wagering medium that has an attribute that is operable to alter play of a wagering game. As described herein, the capability of being "operable to alter play of a wagering game" means that the attribute is capable of causing things to happen in a wagering game that would not otherwise happen and/or be capable of happening. It does not mean, for example, that a face value of the portable wagering medium affects a payout, which is a standard occurrence in wagering games. Nor does it necessarily mean that use of the portable wagering medium to place a bet (i) causes a wagering game to commence, (ii) alters the odds of winning (for the player placing the bet or for other players or the 'house'), or (iii) causes one or more players or the 'house' to alter betting strategies—these are all common effects that a wager and/or wagering token may have in a wagering game. Instead, as described herein, the alteration of the wagering game may, for example, cause an entirely different pay table to be utilized for the player or for the entire game, cause an unfavorable outcome to become more favorable, cause an outcome of the wagering game with respect to the player to be the same as another player's outcome, and/or cause the portable wagering medium to be "immune" to one or more negative outcomes—none of which are standard manners in which a portable wagering medium may affect play of a wagering game.

The interface 600 may, according to some embodiments, comprise a plurality of sections relating to a corresponding number of steps (required or optional) that a player may conduct to "upgrade" a portable wagering medium. As shown in FIG. 6, for example, the interface 600 may comprise a feature selection section 610 where a player may select one or more attributes, features, or upgrades to assign to a portable wagering medium. In some embodiments, a feature package section 612 may comprise indications of one or more pre-defined packages of attributes that may be selected for assignment to the portable wagering medium. As shown, for example, the feature packages section 612 may comprise 'buttons' that may be selected (e.g., utilizing a pointing device and/or touch screen device) corresponding to "The Works" (e.g., that may include all available attributes), and/or "Premium", "Gold", "Silver", and/or "Bronze" (e.g., that may comprise groupings of fewer and/or less desirable or costly attributes respectively). As shown in FIG. 6, the "Silver" package of the feature packages section 612 has been selected. In some embodiments, details regarding which attributes are included in the "Silver" package may be obtained by selecting the "Details . . . " option adjacent to the "Silver" package 'button'.

According to some embodiments, the feature selection section 610 may also or alternatively comprise an individual feature selection section 614. As shown, for example, the individual feature selection section 614 may comprise separate indications for any or all available attributes such as "immunity", "stolen outcomes", etc. A player may utilize the individual feature selection section 614 to pick and choose one or more attributes to assign to one or more portable wagering media "a la carte", for example, or attributes that are associated with a selected attribute package from the feature packages section 612 (e.g., the "Silver" package, as shown) may be automatically selected. In some embodiments, such as in the case that attributes associated with a selected package are automatically selected, other attributes that are not part of the selected package may be 'grayed-out' and/or otherwise prevented from being selected. In some embodiments, individual attributes may be added to a selected package (e.g., in addition to any default attributes) and/or custom packages may be defined and/or selected. As shown in FIG. 6, the selection of the "Silver" attribute package includes "bust insurance", "no commissions", and "bet assistance" attributes.

According to some embodiments, the feature selection section 610 may also or alternatively comprise an indication of a feature cost 616. The feature cost 616 may, for example, indicate the cost of any selected attribute and/or combination of attributes (e.g., including feature packages). In some embodiments, costs of various packages and/or attributes may be shown for ease of selection and/or the feature cost 616 may display a cost (individual and/or total) of any package or attribute highlighted, moused-over, clicked-on, and/or otherwise indicated by a player. As show in FIG. 6, the exemplary price of the selected "Silver" package is six dollars ($6.00).

In some embodiments, the interface 600 may also or alternatively comprise a chip identification section 620. The chip identification section 620 may, for example, comprise a chip selection method section 622 and/or a chip denomination section 624. The chip selection method section 622 may, as shown for example, provide several 'buttons' and/or other interface options that allow a user to choose whether to (i) scan an existing (e.g., already in the possession of the player) portable wagering medium, (ii) manually enter and identifier of an existing portable wagering medium, and/or (iii) select (e.g., utilizing the chip denomination section 624) one or more portable wagering media to purchase or obtain. The option to scan an identifier may, upon selection for example, prompt a user to place a portable wagering medium in a slot and/or pre-defined location such that an interrogator and/or scanner may read and/or otherwise obtain an indication of the identifier of the player's portable wagering medium. The manual entry option may, in some embodiments, provide the player with an interface such as a keypad that allows the player to manually type in an identifier, such as an identifier printed on the portable wagering medium that the player is able to read.

According to some embodiments, such as shown in FIG. 6, where the "select" chips option has been selected for example, a number of portable wagering media (e.g., wagering chips) of various desired denominations may be selected for purchase by the player. As shown, the example player has selected four (4) ten dollar ($10) chips. In some embodiments, all chips selected by the player may be assigned the upgrade attributes selected in the feature selection section 610. According to some embodiments, different attributes and/or sets or packages of attributes may be selected for assignment to different portable wagering media. An interface portion not shown in FIG. 6 may, for example, allow a player to pick which attributes to assign to which portable wagering media.

In some embodiments, the chip identification section 620 may also or alternatively comprise an indication of a chip cost 626. The chip cost 626 may, for example, be descriptive of the purchase price of portable wagering media selected for purchase by the player (e.g., within the chip denomination section 624). As shown in FIG. 6, the chip cost 626 may be descriptive of the sum of face values and/or denominations of all selected chips (e.g., four (4) ten dollar ($10) chips is equal to the chip cost 626 of forty dollars ($40)). According to some embodiments, such as in the case that the player already possesses the portable wagering medium(s) desired for upgrade, the chip cost 626 may not be included in the interface 600 or may simply read zero dollars ($0).

The interface 600 may also or alternatively comprise an activation section 630. As shown in FIG. 6, for example, the activation section 630 may comprise indications of a number of activation options that are available to the player. A first activation option 632 may comprise an "Activate Now" capability, for example, that, upon selection, activates any selected and/or purchased attributes. "Activation" may generally comprise associating a selected attribute with and/or assigning the selected attribute to a particular portable wagering medium and/or player. In some embodiments, "activating" may comprise setting a flag and/or trigger that enables the attribute to be utilized to alter play of a wagering game. A portable wagering medium assigned an attribute that has not been activated may, in some embodiments for example, not be capable of utilizing the attribute to alter play of the wagering game. In the case that the "Activate Now" option 632 is selected, the attribute may be operable substantially immediately.

In the case that another option, such as a second activation option 634 that comprises a "Random Activate" capability, is selected, activation may not occur immediately. Indeed, as is shown in FIG. 6, a discount on the cost of the selected attributes (e.g., the feature cost 616) may be obtained by agreeing to allow activation of selected attributes (or a subset thereof) to occur randomly. In such an embodiment, the player may utilize the portable wagering medium to play one or more wagering games and the attribute may become activated at some point during (or between) play (e.g., at a random time and/or upon trigger by a random event). According to some embodiments, the attribute will be automatically utilized upon random activation. In some embodiments, the player may choose, once random activation has occurred, whether and/or when to utilize the now active attribute.

In some embodiments, the player may be presented with a third activation option 636 that comprises a "Custom Activate . . . " capability. Various time and/or event-based activation triggers, thresholds, and/or parameters may be selected by the player, for example, and pricing for such "custom" activation may (as indicated in FIG. 6) vary depending upon the selections made by the player. Activation triggers that are based on events taking place may, in some embodiments, have costs based on a probability of the events taking place. A player may purchase an attribute that is very unlikely to every be activated (e.g., activation occurs upon utilizing the portable wagering medium to place a wager for a game play that results in a 'Royal Flush' outcome) for a very small amount (e.g., ten cents ($0.10)), for example, while more certain activation (e.g., the attribute is activated upon achieving a winning outcome in a wagering game) may cause the cost of the attribute to be higher (e.g., thirty cents ($0.30)).

According to some embodiments, the interface 600 may comprise an indication of an amount due 640. The amount due 640 may, for example, comprise the sum of the feature cost 616 and the chip cost 626 (e.g., six dollars ($6.00) plus forty dollars ($40.00) equals the forty six dollars ($46.00) shown). In some embodiments, such as in the case that only upgrade attributes are being purchased (e.g., because the chips to upgrade have already been acquired), the amount due 640 may simply equal the feature cost 616. According to some embodiments, such as in the case that the interface 600 is provided by a wagering game device and/or upgrade device such as an upgrade kiosk, the interface 600 may comprise a button and/or other interface feature (not explicitly shown) that allows and/or causes the desired chips and/or upgrades to be dispensed and/or otherwise provided.

Upgrade Device

Figure 7:
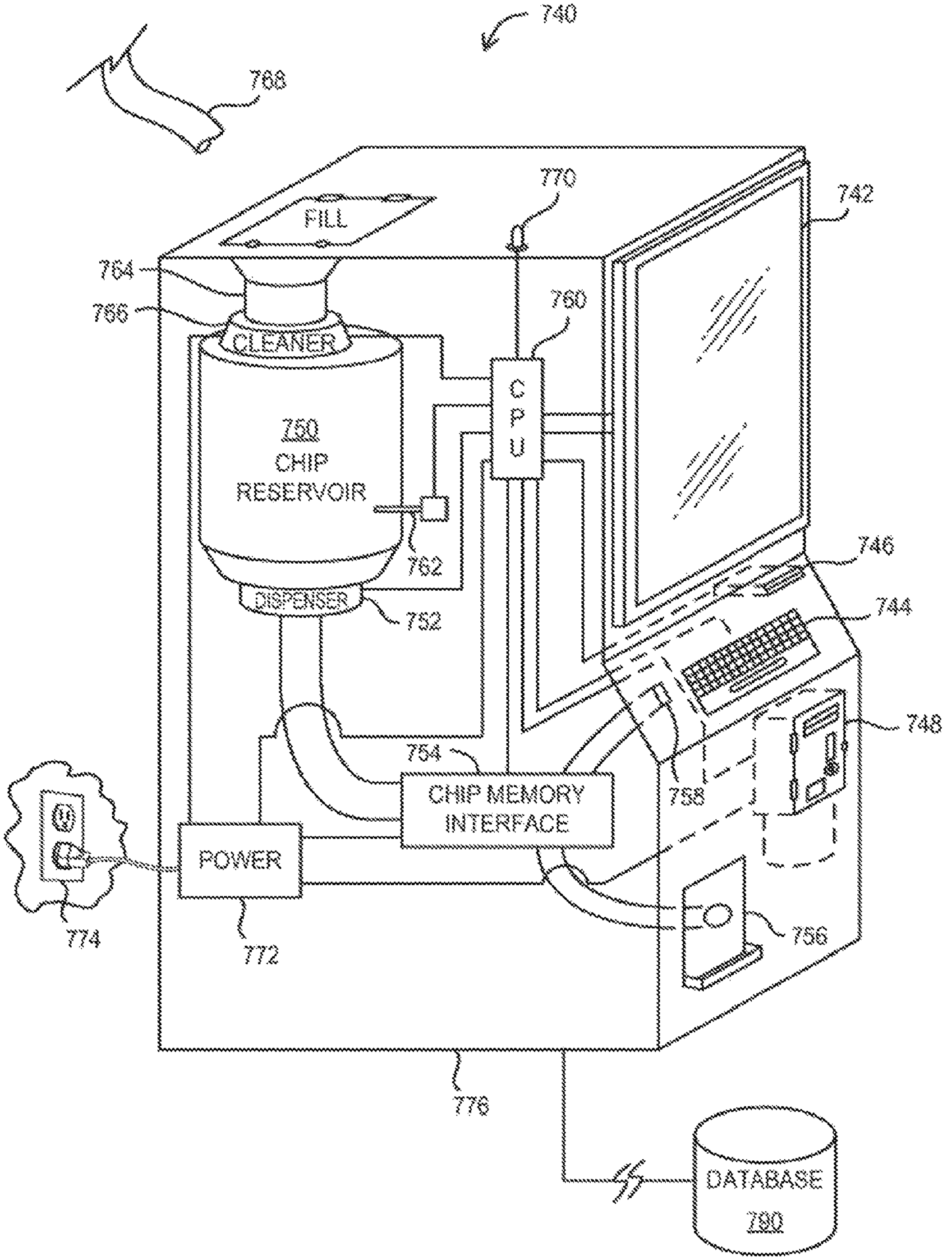
FIG. 7 is a perspective diagram of a portable wagering medium upgrade device according to some embodiments.

Turning to FIG. 7, for example, a perspective diagram of a portable wagering medium upgrade device 740 according to some embodiments is shown. In some embodiments, the upgrade device 740 may be similar in configuration and/or functionality to any of the other upgrade devices described herein (e.g., the upgrade device 140 of FIG. 1). The upgrade device 740 may comprise, for example, a display device 742, a keyboard 744, a player tracking card reader 746, a currency device 748, a chip reservoir 750, a chip dispenser 752, a chip memory interface 754, a chip hopper 756, a chip slot 758, a processor 760, a low inventory sensor 762, a chip fill port 764, a chip 'cleaner' 766, a chip source 768, a wireless communications device 770, a power supply 772, a power source 774, and/or a cabinet 776. In some embodiments, the upgrade device 740 may be coupled to and/or in communication with a database 790. According to some embodiments, the components 742, 744, 746, 748, 750, 752,

754, 756, 758, 760, 762, 764, 766, 768, 770, 772, 774, 776, 790 of the upgrade device 740 may be similar in configuration and/or functionality to the similarly named and/or numbered components described in reference to any of FIG. 1, FIG. 2, FIG. 3, FIG. 4, FIG. 5, and/or FIG. 6 herein. Some of the components may be omitted and/or combined.

In some embodiments, the display device 742 may provide an interface via which a user may request and/or obtain upgraded portable wagering media. The display device 742 may output, for example, an interface similar to the interface 600 of FIG. 6. According to some embodiments, the display device 742 may comprise a touch screen device that is operable to both provide visual output to the user and receive indications of selections via the display device 742. In some embodiments, input may also or alternatively be received via the keyboard 744. The keyboard 744 may be utilized, for example, to enter portable wagering medium identification numbers and/or option/menu selections. The keyboard 744 is shown for exemplary purposes and it should be understood that any quantity and/or configuration of input devices may be utilized to allow a player to interface with the upgrade device 740. One or more keypads, trackballs, pointing devices, buttons, switches, and/or other actuators or interface features may be utilized without deviating from the scope of some embodiments.

The player tracking card reader 746 may generally comprise any type or configuration of player tracking and/or player loyalty or club device that is or becomes known or practicable. The player tracking card reader 746 may comprise, for example, a CardCom® Card Reader for Casino Data Systems Tracking Unit that is operable to read information from a player tracking or club card inserted into the card reader 746. In some embodiments, information read from a player card may be utilized to identify the player utilizing the upgrade device. The identity of the player may be utilized, for example, to assign an attribute to the player (e.g., as opposed to assigning the attribute to a portable wagering medium). In some embodiments, the identity of the player may also or alternatively be utilized to determine which attributes the player is qualified and/or authorized to purchase and/or to determine pricing, duration, and/or activation configurations of selected attributes. A "Gold" level player (e.g., a high roller) may, for example, purchase attributes for portable wagering media just like other players, but instead of the attributes being usable for five (5) plays or ten (10) minutes, the attributes may stay active for twenty (20) plays or forty (40) minutes. The identity of the player may also be utilized to identify preferred attributes, suggest or promote "lucky" attributes based on play history, and the like.

The currency device 748 may generally comprise any type or configuration of bill acceptor, coin acceptor, credit card reader, smart card reader, and/or Ticket-In/Ticket-Out (TITO) device that is or becomes known or practicable. The player tracking card reader 746 may comprise, for example, an ICT® Stackerless Bill Validator BL-700-USD4, an Imonex® Twenty-five Cent ($0.25) USA Coin Mech, and/or an EZ Pay® Ticket System bill acceptor with a bar code scanner and thermal ticket printer. In some embodiments, the currency device 748 may receive currency and/or other forms of payment such that the player may purchase one or more portable wagering media and/or one or more upgrade attributes from the upgrade device 740. According to some embodiments, the currency device 748 may also or alternatively output currency and/or cashless gaming tickets or portable wagering media to the player (e.g., as change due and/or in response to purchases or selections made by the player).

As shown in FIG. 7, the upgrade device 740 may be equipped with the chip reservoir 750. The chip reservoir 750 may, for example, comprise a storage device in which a plurality of portable wagering media (such as casino chips) is stored. In some embodiments, such as in the case that multiple types and/or classes of portable wagering media are desired, the chip reservoir 750 may comprise a plurality of storage bins, compartments, and/or sections. According to some embodiments, such as in the case that the plurality of portable wagering media comprise cashless gaming tickets and/or other non-chip type media, the reservoir 750 may store card or paper stock and/or other materials for producing the portable wagering media. In some embodiments, the chip reservoir 750 may provide a portable wagering medium to the player utilizing the upgrade device 740.

The player may utilize the upgrade device 740 to purchase a wagering chip with an upgrade attribute, for example, and the desired and/or selected chip may be provided from the chip reservoir 750. In some embodiments, the dispenser 752 may provide the chip. The dispenser 752 may, for example, comprise a device that permits only a single chip to be dispensed at a time and/or that selectively pulls or selects chips for distribution. In the case that the chip reservoir 750 is a gravity-feed type storage container, for example, the dispenser 752 may receive chips from the chip reservoir 750 and mechanically prevent more than a desired amount of chips (e.g., one or two) from passing from the reservoir 750 during a dispensing action. In the case that the chip reservoir 750 comprises multiple stores of multiple types of chips (e.g., one storage device for each of several types of chip pre-loaded or programmed with certain attributes), the dispenser 752 may, upon receiving a signal from the upgrade device 740 for example, select an appropriate storage section to remove a chip from and provide a desired number of the appropriate types of chips to the player (e.g., via the dispensing chute shown in FIG. 7).

In some embodiments, such as in the case that the chip reservoir stores 'blank' chips (i.e., chips that are not assigned an upgrade attribute), the chip memory interface 754 may program dispensed chips en route to the chip hopper 756. If the player purchases a ten dollar ($10) wagering chip with a "freestyle wager" attribute, for example, a next-available chip from the chip reservoir 750 may be selected and/or dispensed by the dispenser 752, into the chute and to the chip memory interface 754. The chip memory interface 754 may send one or more signals to the dispensed chip (and/or to the database 790) to cause the chip to be assigned the appropriate denomination (e.g., ten dollars ($10)) and the appropriate attribute (e.g., "freestyle wager"). The chip may then continue down the chute to the chip hopper 756, where it may be retrieved by the player.

The chip memory interface 754 may generally comprise any device or combination of devices that are operable to cause a portable wagering medium to be associated with and/or assigned an attribute, denomination, and/or attribute duration. In the case that an indication of the attribute and/or denomination is printed and/or otherwise visually indicated on a face of the chip, for example, the chip memory interface 754 may comprise a printer and/or other appropriate device that causes the visual indication to be provided on the chip. In the case that a memory (e.g., the database 790) stores an indication of the association between the chip and the attribute and/or denomination, the chip memory interface 754 may comprise a transmitter that sends signals to the memory device to cause the appropriate information to be stored. In some embodiments, such as in the case that portable wagering media are pre-programmed and the dispenser 752 causes a portable wagering medium of the appropriate type to be dispensed into the chute, the chip memory interface 754 may not be necessary or included in the upgrade device 740 (e.g., no in situ programming may be necessary).

According to some embodiments, such as in the case that the player already possesses a portable wagering medium for which an upgrade is desired, the player may place the portable wagering medium in the chip slot 758 such that the portable wagering medium enters the chute shown in FIG. 7 and progresses to and/or through the chip memory interface 754 to become associated with the selected upgrade attribute (and/or denomination and/or attribute duration). In such a manner, for example, a player may add an attribute (e.g., 'upgrade') a portable wagering medium, alter a denomination of the portable wagering medium (e.g., increase or decrease the current denomination), and/or alter a duration of an attribute of the portable wagering medium (e.g., change an activation parameter, change a duration type, and/or add minutes or a number of plays to a current duration for an attribute).

According to some embodiments, the processor 760 may direct and/or control any or all of the various components 742, 744, 746, 748, 750, 752, 754, 756, 758, 762, 764, 766, 768, 770, 772, 774, 790 of the upgrade device 740. The processor 760 may, for example, receive information from the display/touch screen 742, the keyboard 744, the player tracking card reader 746, and/or the currency acceptance device 748 indicating selections made by the player and may, in response, cause the dispenser 752 to dispense a portable wagering medium to the player (e.g., via the chip hopper 756 and/or via the currency device 748 in the case that the portable wagering medium comprises a cashless gaming ticket). In some embodiments, the processor 760 may also or alternatively direct the chip memory interface 754 to store indications of the denomination, attribute, and/or duration desired to be assigned to the portable wagering medium. The processor 760 may also generally host, provide, and/or manage any interface with the player, such as by providing the interface 600 of FIG. 6 via the display device 742 and executing program code operable to provide interaction with the player, as desired.

The processor 760 may perform and/or facilitate or cause various other functionality of the upgrade device 740. The processor 760 may, for example, receive a signal from the low inventory sensor 762 coupled to the chip reservoir 750 and in response cause transmission of one or more signals indicating low chip inventory. The processor 760 may, in some embodiments, cause a light (not shown) to be illuminated to indicate to a service technician that more portable wagering medium inventory is needed. The service technician may then, for example, add more portable wagering medium inventory via the fill port 764 (e.g., by accessing the "Fill" cover shown for exemplary purposes as being on the top of the upgrade device 740).

In some embodiments, such as in the case that the added inventory comprises portable wagering media that are already associated with attributes and/or denominations (e.g., not 'clean' or blank), the cleaner 766 may erase and/or reset the information associated with the added inventory. The cleaner 766 may simply comprise a magnetic device, according to some embodiments, that erases and/or resets the internal memory of any portable wagering media as they travel into the chip reservoir 750. In some embodiments, the cleaner 766 may receive instructions from the processor 760 and/or may send signals to incoming chips to set chip parameters as desired (singularly or en mass). According to some embodiments, such as in the case that added inventory comprises 'clean' and/or already erased or reset chips, the cleaner 766 may not be necessary in the upgrade device 740.

In some embodiments, a service technician may not be necessary to provide new inventory to the chip reservoir 750. The chip source 768 may automatically provide portable wagering medium inventory as needed or directed, for example, such as by providing a chute or tube (e.g., vacuum tube) via which chips and/or other portable wagering media may be provided from a central and/or remote location (e.g., a central or main reservoir or repository). In some embodiments, the processor 760 may send an inventory request signal via the wireless communications device 770, such that remote delivery of inventory via the chip source 768 is triggered.

According to some embodiments, the power supply 772 may provide energy to one or more of the components 742, 744, 746, 748, 750, 752, 754, 756, 758, 760, 762, 764, 766, 768, 770, 772, 774, 790 of the upgrade device 740. The power supply 772 may, in some embodiments, comprise a power adapter, inverter, converter, and/or transformer that receives electrical energy from the power source 774 (e.g., an Alternating Current (AC) power supply) and provides electrical energy as required (e.g., regulated, transformed, and/or stepped-down; e.g., Direct Current (DC) power) to the upgrade device 740. The upgrade device 740 may generally be housed within and/or comprise the cabinet 776. As shown, for example, the upgrade device 740 may generally be configured as a kiosk. In some embodiments, the upgrade device 740 may be configured as a wagering game device. In such embodiments, the cabinet 776 may comprise a cabinet of a slot machine, video poker machine, and/or other wagering game device such as a Game King® Video Poker machine manufactured by IGT.

The database 790 may, as described herein, reside within and/or be coupled to the upgrade device 740. The database 790 may also or alternatively be remote from the upgrade device 740 and/or may be housed within a portable wagering medium. In some embodiments, the database 790 may store an indication of an association between a portable wagering medium and (i) a denomination, (ii) an attribute, and/or (iii) a duration of the attribute (and/or a duration of the denomination). In the case that the portable wagering media do not comprise internal memories and/or only store or indicate an identifier, for example, the database 790 may store a cross-reference associating a portable wagering medium with one or more denominations, attributes, durations, rules, triggers, and/or other information (e.g., which player(s) owns and/or possesses the portable wagering medium).

Processes

Figure 8:
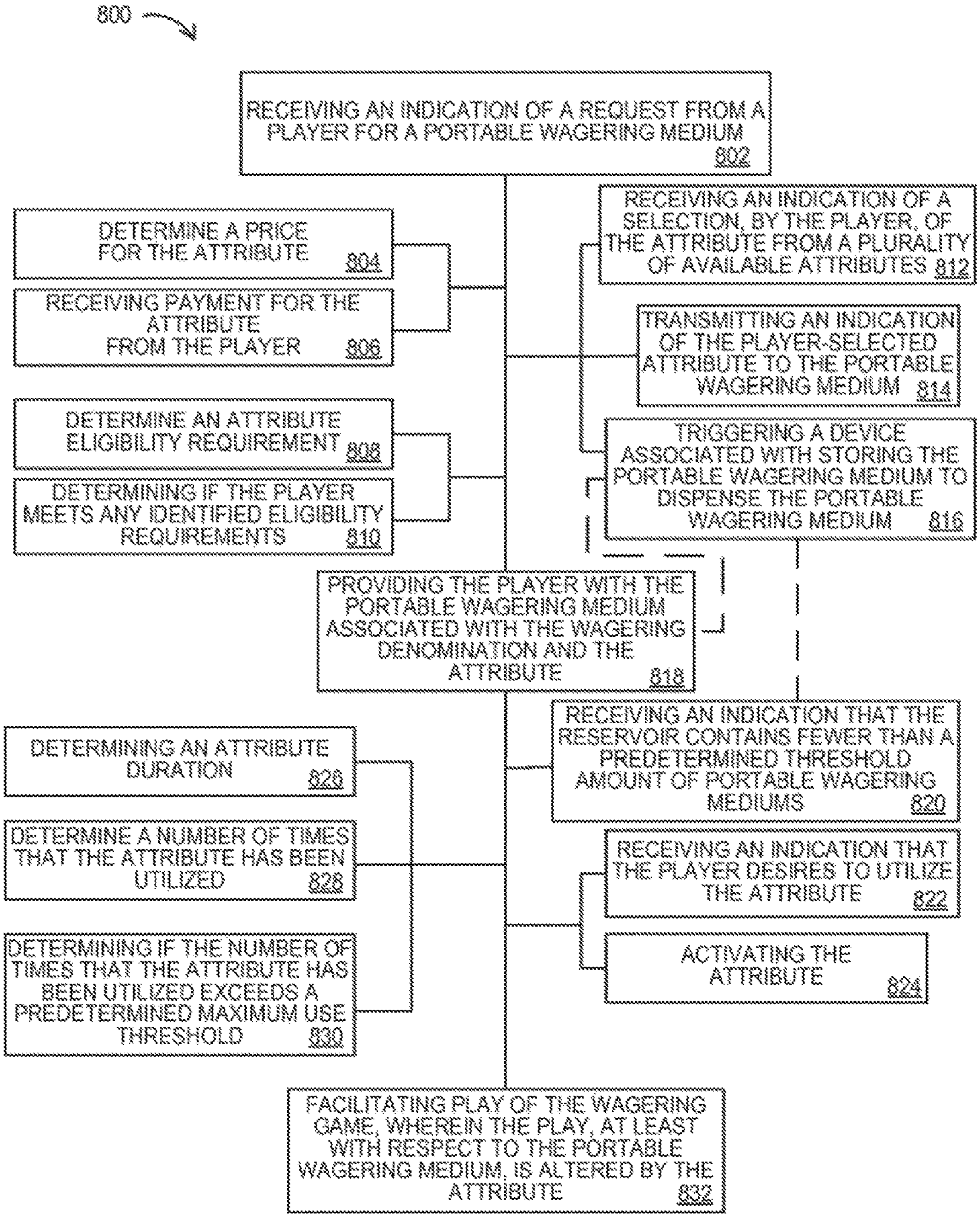
FIG. 8 is a flow diagram of a method according to some embodiments.

Referring now to FIG. 8, a flow diagram of a method 800 according to some embodiments is shown. In some embodiments, the method 800 may be performed, conducted, and/or facilitated by and/or otherwise be associated with one or more of an upgrade device, a wagering game device, a player device, and/or a portable wagering medium (e.g., all as described herein). According to some embodiments, the method 800 may be conducted and/or facilitated by a plurality of devices. Some procedures may be conducted by an upgrade device, for example, while other procedures may be conducted by a wagering game device. While the procedures of the method 800 are depicted in FIG. 8 as being connected and/or interrelated, these relationships are shown for exemplary and illustrative purposes only and it should be understood that other relationships in addition to and/or instead of those shown may be incorporated without deviating from the scope of some embodiments. Fewer or more procedures may also or alternatively be included in the method 800, as is or becomes practicable.

According to some embodiments, the method 800 may comprise receiving an indication of a request from a player for a portable wagering medium, at 802. The portable wagering medium requested may generally be assigned and/or associated with (i) a wagering denomination and (ii) an attribute that is operable to alter play of a wagering game. An upgrade device or kiosk (such as the upgrade device 740 of FIG. 7) and/or a wagering game device (e.g., the wagering game device 130 of FIG. 1) may receive, directly or indirectly for example, input from a player desiring to upgrade a portable wagering medium (and/or acquire an upgraded portable wagering medium). The player may provide such input via a touch screen and/or other input device, for example, to indicate the desire to purchase the upgraded portable wagering medium. In some embodiments, the input may be received from and/or relayed or provided by another device such as a player device or other interface. As described herein, the input may indicate various information related to the portable wagering medium such as the desired denomination, desired attribute(s), desired attribute durations, player identifier, etc.

According to some embodiments, the method 800 may comprise determining a price for the attribute, at 804. A price corresponding to the selected attribute may be looked-up in a database of applicable prices, for example, and/or may be calculated based on various metrics such as player identifier, player wagering history, time of day, type of portable wagering medium, and/or probabilities associated with potential usage of the attribute (e.g., an expected value of the attribute). In some embodiments, the price for the attribute may comprise a summation of prices of multiple selected attributes and/or may comprise taking into account any discounts or credits that may be utilized by the player. In some embodiments, the method 800 may comprise receiving payment for the attribute from the player, at 806. The player may be informed of the attribute cost, for example, and the player may provide payment in response thereto.

In some embodiments, the step of populating a database with attribute prices may be preceded by the step of determining, through computer simulation, prices at which to sell the attributes, while maintaining a desired profit. For example, through simulating use of an "dealer blackjack immunity" attribute associated with a five dollar ($5) betting chip over a duration of ten (10) blackjack hands, it may be determined that the house loses forty cents ($0.40) on average when providing the feature to players. Accordingly, if a profit is desired, the house may price the attribute at fifty cents ($0.50), building in an average profit of tens cents ($0.10) per attribute sale. "Monte Carlo" computer simulations of large numbers of game plays (e.g., millions of Blackjack hands) may be used to determine the "expected value" of such attributes (expected benefit to player or cost to the house), and thereby help determine pricing. Various attribute properties described herein may affect pricing, including but not limited to (i) a probability that an attribute will be successfully used (e.g., using the attribute will result in an altered game outcome (a loss becomes a win, a loss becomes a tie, a win becomes a larger win, etc.)); (ii) a benefit that a player may stand to earn should the attribute be successfully used, which may depend on the denomination of an associated portable wagering medium; (iii) a duration for which the attribute is in effect; (iv) a probability of achieving a condition upon which an attribute is activated. Of course, attributes may be provided "at cost" or free for promotional purposes.

In some embodiments, the method 800 may comprise determining an attribute eligibility requirement, at 808. Once the attribute is selected, for example, a database may be queried to determine if any eligibility requirements correspond to and/or are associated with the selected attribute. In order to purchase or obtain "bust insurance" attribute for Blackjack, for example, a player may need to have reached a certain wagering threshold, such as one thousand dollars ($1,000) bet and/or coin-in. According to some embodiments, one or more other attributes must be purchased and/or obtained in order to purchase or obtain the selected attribute. In such embodiments, the player may be notified that one or more other attributes need to be selected in concert with the originally selected attribute, the player may be prompted to select any other required attributes, and/or the other attributes may be automatically selected or added on behalf of the player.

In some embodiments, the method 800 may comprise determining if the player meets any identified eligibility requirements, at 810. Based on an identifier associated with the player, for example, statistics and/or other metrics associated with the player may be queried and/or otherwise determined. In the case that a player needs to belong to a certain player club tier and/or hospitality club level (e.g., a "Gold" member), for example, the player's identifier may be utilized to search a database to determine if the player is properly qualified to purchase and/or obtain the desired attribute.

According to some embodiments, the player may select the attribute from a list of available attributes. The method 800 may comprise, for example, receiving an indication of a selection, by the player, of the attribute from a plurality of available attributes, at 812. An interface such as the interface 600 from FIG. 6 may, for example, provide the list of available attributes to the player so that the player may choose any attributes that the player desired to obtain and/or purchase. In some embodiments, a particular attribute desired by the player may be selected by interfacing directly with the portable wagering medium. A display device of the portable wagering medium may cycle through various outputs corresponding to different attributes in response to activation of an input device such as a button on the portable wagering medium. According to some embodiments, the player may simply enter a code corresponding to a particular desired attribute or package or group of attributes (e.g., the player enters a code displayed on an advertisement or receipt).

In some embodiments, the method 800 may comprise transmitting an indication of the player-selected attribute to the portable wagering medium, at 814. In the case that the portable wagering medium comprises a memory device, for example, the transmission may cause the portable wagering medium to store an indication that the portable wagering medium is assigned the chosen attribute. In such a manner, for example, the portable wagering medium may then provide indications of the attribute to wagering game devices so that those devices may appropriately recognize the attribute and/or application thereof.

According to some embodiments, the method 800 may comprise triggering a device associated with storing the portable wagering medium to dispense the portable wagering medium, at 816. More generically, in some embodiments, the method 800 may comprise providing the player with the portable wagering medium associated with the wagering denomination and the attribute, at 818. In some embodiments, such as in the case that portable wagering media are pre-programmed with various denominations and/or attributes, the request received at 802 may be answered by providing a portable wagering medium that matches the requested criteria (e.g., is assigned the appropriate denomination and attribute). In the case that attributes may be freely assigned and/or activated on portable wagering media, a portable wagering medium of the appropriate denomination may simply be provided (e.g., by triggering a dispensing device, such as at 816). In the case that certain classes of portable wagering media may be activated with certain groups or subsets of available attributes, a portable wagering medium from an appropriate class corresponding to the chosen attribute(s) may be selected and provided. The providing may generally be conducted by a casino employee such as a cashier or by an automated device such as an upgrade device and/or wagering game device (e.g., with dispensing capabilities).

According to some embodiments, the portable wagering medium may be provided by programming a portable wagering medium with one or more of the appropriate denomination or attribute. A portable wagering medium already in the possession of the player may be assigned the appropriate attribute (e.g., upgraded), for example, or a blank or 'clean' portable wagering medium may be programmed (e.g., by storing an indication of the attribute in a memory device) with the appropriate attribute and then provided to the player. In some embodiments, such as in the case that the player does not (or cannot) specify the denomination and/or attribute, such parameters may be automatically selected on behalf of the player. In the case that a player purchases a "mystery" five dollar ($5) wagering chip, for example, a five dollar ($5) chip may be randomly selected from a group of five dollar ($5) chips having pre-loaded attributes, or an attribute may be randomly, serially, or proportionally chosen to assign to a provided five dollar ($5) chip. In some embodiments, such as in the case that the portable wagering medium comprises a handheld and/or player device such as a cellular telephone, the "providing" may comprise registering the portable wagering medium for use as a portable wagering medium and/or authenticating the portable wagering medium (e.g., establishing and/or verifying cryptographic protocols and/or hashes). Software may be downloaded and/or installed on a handheld or portable device, for example, and/or one or more activation and/or testing keys or sequences may be transmitted to and/or from the device.

In some embodiments, such as in the case that the portable wagering medium is provided from a reservoir and/or other store such as the chip reservoir 750 of FIG. 7, the method 800 may comprise receiving an indication that the reservoir contains fewer than a predetermined threshold amount of portable wagering media, at 820. A low inventory sensor such as the low inventory sensor 762 from FIG. 7 may, for example, provide an indication that inventories are low. Low inventory may comprise, according to some embodiments, a low level of available wagering chips, a low level of available card or printing stock, low ink and/or toner levels, and/or a low level of available remaining attributes (e.g., in the case that a limited number of active attributes are allowed on a casino floor at any given time).

In some embodiments, the method 800 may comprise receiving an indication that the player desires to utilize the attribute, at 822. While in some embodiments an indication that the player desires to utilize the attribute may be evidenced by the player's purchase and/or obtaining of the attribute, in other embodiments a separate indication may be received. In the case that the attribute is provided to the player without being activated, for example, the player may indicate a desire to activate the attribute, such as while playing a wagering game. In some embodiments, the indication may comprise the player interfacing with an input device of the portable wagering medium (e.g., pressing an "activate attribute" button, imparting certain motions to an accelerometer of the portable wagering medium, and/or swiping a finger over a fingerprint scanner of the portable wagering medium), the player interfacing with a wagering game device (e.g., by selecting a "use special feature" button), and/or by requesting that a casino employee such as a dealer allow the attribute to be utilized (e.g., in the current or next hand or round of play).

In some embodiments, the method 800 may comprise activating the attribute, at 824. The activation may, in some embodiments, be conducted in response to the indication received at 822. The player may indicate a desire to active the attribute, for example, and the attribute may accordingly be activated for use in altering play of a wagering game. According to some embodiments, such as in the case that attribute activation is not triggered by player input (e.g., the player chose to have attributes automatically and/or randomly activated), the activation may be in response to another event and/or parameter. Random activation may occur based on results obtained from a random number generator, for example, while event-based triggers may cause activation upon occurrence of pertinent events (e.g., the player wins three (3) hands in a row and/or the player loses ten (10) times in a row). In some embodiments, activation may comprise storing an indication such as "active" in a database record corresponding to the portable wagering medium and/or the particular attribute. In some embodiments activation may comprise transmitting a signal to a wagering game device at which the portable wagering medium is currently being utilized to place a wager. The signal may, for example, inform the wagering game device that play of the wagering game is to be altered in accordance with the attribute. The signal may also or alternatively comprise an indication of a time or duration (e.g., just for this next hand, for the next five (5) hands, and/or for the next three (3) minutes) and/or one or more rules associated with the attribute (e.g., display expected value of cards in hand). In some embodiments, the activation may comprise entering a code into an input device of the portable wagering medium itself. A casino employee may, for example, enter a code to authorize and/or activate one or more attributes. Similarly, a player may enter a code (e.g., received via a vending machine, promotional coupon and/or flyer, and/or from a website) to activate an attribute (e.g., that was otherwise dormant and/or undiscoverable until the code is entered into the portable wagering medium).

According to some embodiments, the method 800 may comprise determining an attribute duration, at 826. A portable wagering medium assigned an attribute that is operable to alter play of a wagering game may, for example, only be capable of altering play for a certain duration and/or during a particular time frame. Accordingly, this duration and/or time frame may be determined based on the attribute selected, the player, purchase price (e.g., pay more for longer lasting attributes), and/or other factors such as casino floor traffic, random variables, and/or external metrics (e.g., the weather, news).

In some embodiments, the method 800 may comprise determining a number of times that the attribute has been utilized, at 828. A counter may keep track, for example, of how many times (and/or how successfully) the attribute has been utilized by a player to alter play of a wagering game. In some embodiments, only successful uses qualify for counting, while in other embodiments any attempted utilization of the attribute may qualify as a "use". According to some embodiments, determining the number of times that the attribute has been utilized may be useful to determine if the attribute is being used in accordance with one or more rules and/or policies.

The method 800 may comprise, for example, determining if the number of times that the attribute has been utilized exceeds a predetermined maximum use threshold, at 830. In some embodiments, the determination may simply comprise comparing the number of times utilized to the maximum allowed usage. An attribute that is only good and/or active for three (3) hands, for example, may be determined to have been already utilized three (3) times. In some embodiments, the attribute may accordingly be prevented from being utilized in excess of the three (3) times. Similarly, in the case that the attribute may only be utilized during off-peak gambling hours, an attempt to utilize the attribute at any other time outside of the predetermined 'off-peak' window may be denied.

According to some embodiments, the method 800 may comprise facilitating play of the wagering game, wherein the play, at least with respect to the portable wagering medium, is altered by the attribute, at 832. In the case that it is determined at 830, for example, that the attribute has not been utilized in excess of the maximum allowed usage, the attribute may be applied for utilization in a current game play for the player. In some embodiments, altering the game play may comprise providing information descriptive of the attribute to the wagering game device at which the player is playing. The portable wagering medium may directly provide such information to the wagering game device, which may be stored within and/or on the portable wagering medium for example, or a separate server and/or upgrade device (or player device) may provide the information. According to some embodiments, the information may comprise an indication of the attribute, an indication of one or more rules associated with and/or defining the attribute, and/or one or more codes and/or instructions. In the case that the attribute comprises an "altered pay table" attribute, for example, and the wagering game device is operable to apply multiple pay tables to plays of the wagering game, a code indicating which pay table is to be utilized when the portable wagering medium is utilized to place a bet may be transmitted to the wagering game device. This code may, for example, cause the wagering gamed device to utilize the appropriate "altered" pay table to the player's wager utilizing the portable wagering medium and the active "altered pay table" attribute.

In some embodiments, alteration of the game play may occur within the wagering game device. The wagering game device may read an indication of the attribute from the portable wagering medium and/or from a remote data store corresponding to the portable wagering medium (and/or the player), for example, and may execute the wagering game in accordance with one or more altered rules based on the attribute. While a "Jacks or Better" video poker machine may typically award payouts for outcomes with a pair of Jacks or better, for example, a "custom wildcard" attribute may cause a particular card such as any three (3) card to be "wild". In which case, an outcome of three (3) and Jack would pay out, as would an outcome of two (2) threes (3's). In some embodiments, rules and/or functionality to alter play based on attributes may be stored and/or accessible to the wagering game device. According to some embodiments, a peripheral and/or remote device may alter outcomes from the wagering game device that are processed by the wagering game device in a standard manner.

In some embodiments, the alteration of game play may be conducted and/or facilitated by a smart game table and/or a dealer thereof. At a Blackjack table, for example, a player may place a wager utilizing a portable wagering medium that comprises an attribute that "steals" an outcome from any adjacent player. If the player busts and/or otherwise loses a hand, but a neighbor of the player hits "Blackjack" (e.g., twenty-one (21)), then the table may indicate that the player's chips are not to be collected (e.g., because the player "steals" the winning outcome in accordance with the attribute). In some embodiments, the table may also indicate that the originally winging player losses and/or inherits the bust or loss from the player utilizing the attribute (e.g., the other player's outcome may be truly stolen or transferred). In some embodiments, the portable wagering medium itself may indicate that play should be altered. The portable wagering medium may blink and/or emit a sound (or even shake or move), for example, to indicate that it should not be collected due to utilization of the attribute. According to some embodiments, such as in the case that the attribute is indicated by an inset and/or "topper" placed with the chip on a gaming surface, the dealer may manually alter game play by identifying the attribute and conducting the game in accordance with any rules defined therewith.

Figure 9:
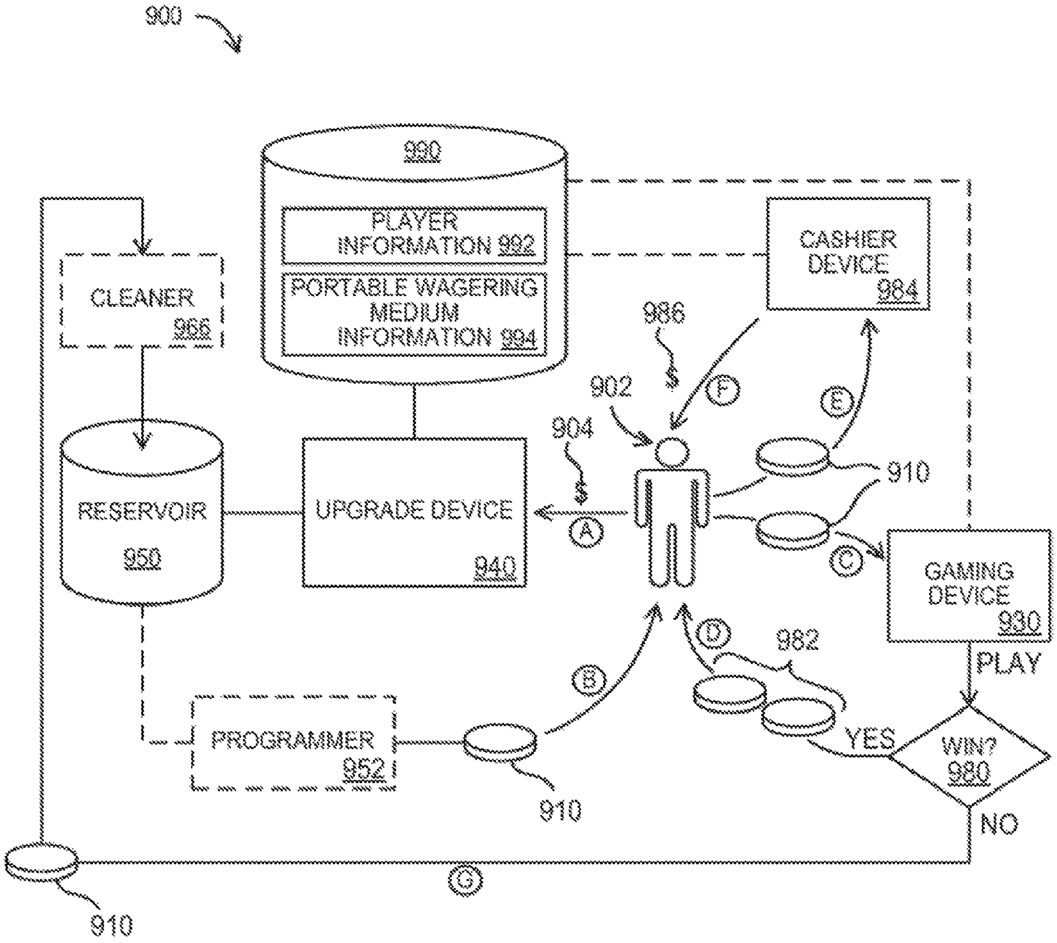
FIG. 9 is a life-cycle diagram of a system for utilizing portable wagering media according to some embodiments.

Turning now to FIG. 9, a life-cycle diagram of a system 900 for utilizing portable wagering media according to some embodiments is shown. In some embodiments, the system 900 may exemplify various procedures and/or processes associated with the method 800 of FIG. 8. According to some embodiments, the system 900 may be similar in configuration and/or functionality to the system 100 from FIG. 1. According to some embodiments, the components 902, 910, 930, 940, 950, 952, 966, 980, 990, 992, 994 of the system 900 may be similar in configuration and/or functionality to the similarly named and/or numbered components described in reference to any of FIG. 1, FIG. 2, FIG. 3, FIG. 4, FIG. 6, and/or FIG. 7 herein.

In some embodiments, the system 900 may comprise a player 902, which may generally comprise a patron of a casino and/or resort establishment. The player 902 may, according to some embodiments, offer money 904 in exchange for a portable wagering medium 910 and/or for an upgrade to the portable wagering medium 910. The money 904 may comprise any type or quantity of monetary consideration that is or becomes known or practicable (e.g., cash, credit, and/or debit). The money 904 may be equivalent, generally, to the denomination of the portable wagering medium 910 and/or any cost of the attribute(s). In some embodiments, the money 904 may not be required in the system 900. The portable wagering medium 900 and/or the attribute assigned thereto may, for example, be provided to the player 902 as a reward, incentive, promotion, and/or gift. According to some embodiments, the player 902 may utilize the portable wagering medium 910 to play a wagering game at a wagering game device 930. The attribute of the portable wagering medium 910 may generally be utilized to alter play of a wagering game.

In some embodiments, the player 902 may provide the money 904 to an upgrade device 940 (e.g., via path "A" shown in FIG. 9) in order to obtain the portable wagering medium 910 and/or the attribute that is operable to alter the play of the wagering game device 930. The upgrade device 940 may receive from the player 902 an indication of a desired denomination, attribute, and/or attribute duration, for example, and may cause an appropriate portable wagering medium 910 to be dispensed from a reservoir 950. In the case that the portable wagering medium 910 dispensed from the reservoir 950 comprises a generic, un-programmed, and/or 'clean' portable wagering medium 910, a programmer 952 may cause an indication of the desired denomination, attribute, and/or attribute duration to be stored (e.g., in a memory of the portable wagering medium 910). The portable wagering medium 910 may generally be dispensed to the player 902 via the path "B" shown in FIG. 9. In embodiments where the player 902 already possesses the portable wagering medium 910, the path "B" may instead represent the providing of the attribute to the player 902 and/or an assigning or association of the attribute to the portable wagering medium 910.

According to some embodiments, the player 902 may then utilize the portable wagering medium 910 and/or attribute to play the wagering game via the wagering game device 930 (e.g., by providing the portable wagering medium 910 to place a wager via the path "C"). The wagering game device 930 (and/or a separate device not explicitly shown) may, in some embodiments, determine an outcome of the wagering game at 980. It may be determined, for example, if the outcome of the wagering game comprises a winning outcome or not. In the case that the outcome is a winning outcome, a payout 982 may be provided to the player 902 (e.g., via the path "D"). In some embodiments, the payout 982 may comprise the original portable wagering medium 910 plus one or more additional portable wagering media 910 (e.g., the "winnings"). According to some embodiments, any portable wagering media 910 provided as the payout 982 may not comprise the original portable wagering medium 910. In the case that the portable wagering medium 910 comprises a cashless gaming ticket and/or wagering chip, for example, and the wagering game device 930 comprises a slot machine or other electronic device into which the portable wagering medium 910 is inserted, it may not be practical to dispense the original portable wagering medium 910 in the payout 982. An inserted cashless gaming ticket may be invalidated and/or destroyed, for example, one or more new cashless gaming tickets may need to be printed to "cash out" the player 902 to provide the payout 982. In embodiments where a new portable wagering medium 910 is provided, the attribute may be transferred to the new portable wagering medium 910. According to some embodiments, such as in the case that the attribute is "used up" and/or otherwise expires or becomes invalid after altering the play of the wagering game, the new portable wagering medium 910 may not require the attribute.

In some embodiments, the player 902 may "cash in" or exchange the portable wagering medium 910 (e.g., via the path "E"). The player 902 may provide the portable wagering medium 910 to a cashier and/or cashier device 984, for example, and receive currency 986 in exchange (e.g., via the path "F"). In some embodiments, such as in the case that the attribute assigned to the portable wagering medium has not been utilized or entirely utilized, the currency 986 may be equivalent tin value to the sum of the denomination or face value of the portable wagering medium and the value of the attribute. The value of the attribute may comprise the initial purchase price of the attribute, for example, or may be prorated or reduced as desired and/or practicable.

According to some embodiments, in the case that the outcome of the wagering game is determined to be a loss at 980, the portable wagering medium 910 may be confiscated and/or otherwise taken from the player 902. The portable wagering medium 910 may then, for example, be sent back to the reservoir 950 for redistribution (e.g., via the path "G"). In some embodiments, the portable wagering medium 910 may be de-programmed, erased, and/or 'cleaned' by a cleaner 966, such that the reservoir 950 may store 'blank' portable wagering media 910 for sale and/or distribution. According to some embodiments, the reservoir 950 may comprise a chip tray and/or other area controlled by a dealer at a wagering game device 930 that comprises a wagering table (e.g., a poker table). The cleaner 966 may accordingly 'clean' portable wagering media 910 collected by the dealer, such that payouts 982 provided to players 902 may comprise portable wagering media 910 that are not pre-associated with upgrade attributes. In some embodiments, 'cleaning' of the portable wagering media 910 may not be desired and/or required. An added element of surprise may be realized, for example, when a player 902 examines the payout 982 to determine that a portable wagering medium 910 that has just been won comprises an upgrade attribute (e.g., and is therefore worth more, at least potentially, to the player 902, than a 'blank' or standard portable wagering medium 910 would be).

According to some embodiments, the upgrade device 940, the wagering game device 930, and/or the cashier device 984 may be coupled to and/or in communication with a database 990. The database 990 may store, in some embodiments, player information 992 and/or portable wagering medium information 994. According to some embodiments, when the upgrade device 940 and/or the programmer 952 cause the attribute to become associated with the portable wagering medium 910, they may do so by causing information to be stored and/or updated in the database 990. In the case that the attribute is associated with the player 902, for example, the player information 992 may be updated to reflect the purchase of the attribute by the player 902. Similarly, in the case that the player 902 acquires the portable wagering medium 910, the player information 992 may be updated to record an identifier of the portable wagering medium 910 in a database record assigned to the player in the player information 992. In the case that the attribute is assigned to the portable wagering medium 910, the portable wagering medium information 994 may be updated to reflect the appropriate association. The portable wagering medium information 994 may also or alternatively be updated to reflect which player 902 has possession of and/or owns the portable wagering medium 910.

In some embodiments, the cashier device 984 may transmit signals to the database 990 to update the player information 992 and/or the portable wagering medium information 994 to reflect a "cashing in" of the portable wagering medium 910 (e.g., the attribute and/or the player 902 may be disassociated from the portable wagering medium 910). The wagering game device 930 may similarly update the database 990. The wagering game device 930 may, in some embodiments, function as an upgrade device 940. Utilizing an interface of the wagering game device 930, for example, the player 902 may upgrade a portable wagering medium 910 already in possession by the player 902 (e.g., a portable wagering medium 910 that the player 02 has just inserted into the wagering game device 930). The wagering game device 930 may send signals descriptive of the upgrade to the database 990. Other wagering game device 930 with which the player 902 interfaces may have access to the database 990 and may accordingly properly apply any attributes associated with the player 902 and/or a particular portable wagering medium 910.

Figure 10:
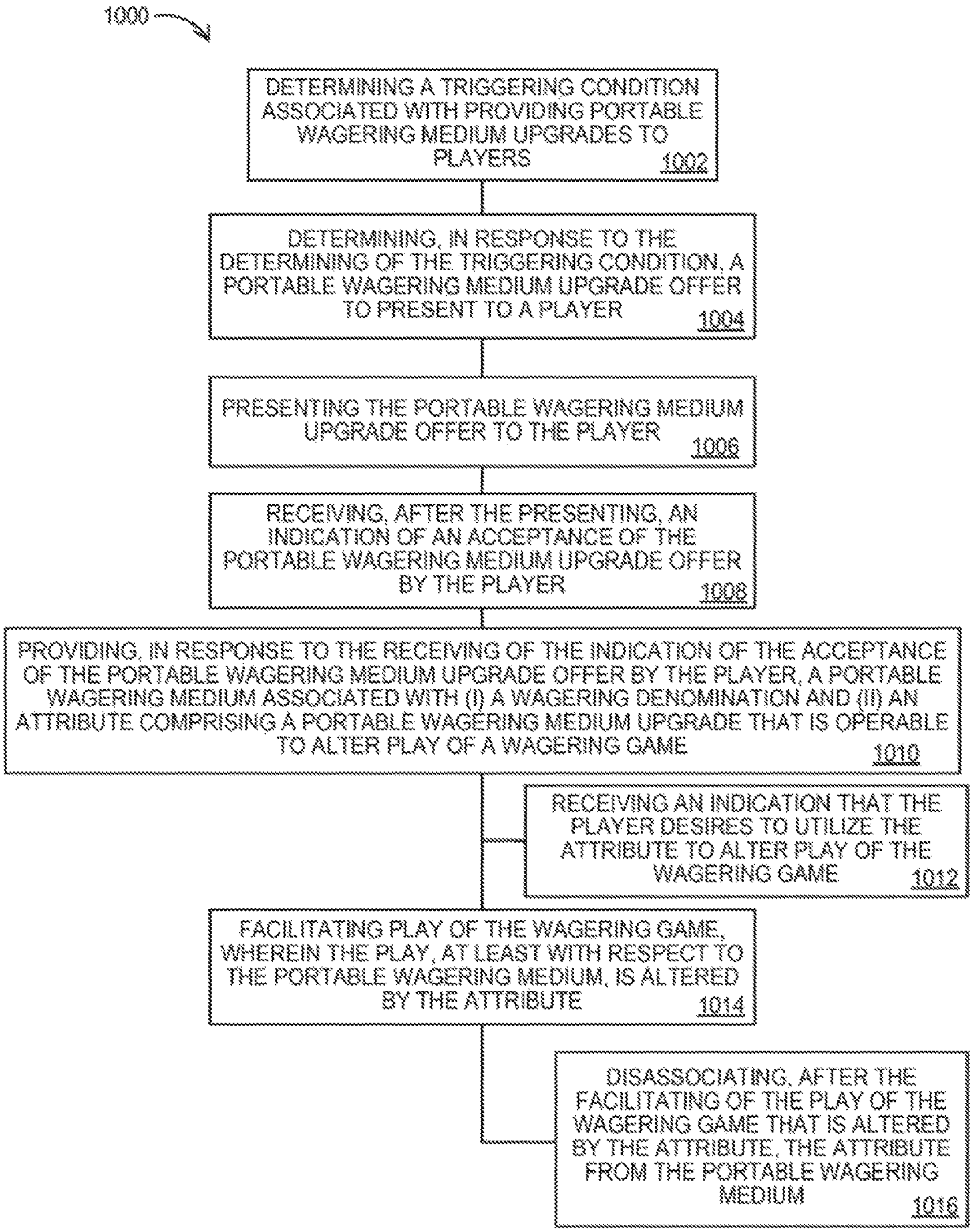
FIG. 10 is a flow diagram of a method according to some embodiments.

Referring now to FIG. 10, a flow diagram of a method 1000 according to some embodiments is shown. The method 1000 may, in some embodiments, be facilitated and/or conducted by one or more of an upgrade device, a wagering game device, a player device, and/or a portable wagering medium (e.g., all as described herein). The method 1000, for example, may be performed by a combination of devices owned and/or operated by a casino and/or wagering establishment. In some embodiments, the method 1000 and/or portions thereof may be similar to the method 800 (and/or portions thereof) of FIG. 8 and/or may be similar to the life-cycle described with reference to the system 900 of FIG. 9 herein.

In some embodiments, the method 1000 may comprise determining a triggering condition associated with providing portable wagering medium upgrades to players, at 1002. Upgrade attributes may be purchased according to some embodiments described herein, and/or may be earned and/or otherwise provided on a more limited basis. As upgrade attributes may be very desirable to acquire, for example, some types of upgrades and/or all upgrades may only be made available under certain circumstances and/or in the case that certain predetermined conditions are met. Accordingly, offers to upgrade portable wagering media may, in some embodiments, need to be triggered. In some embodiments, triggering conditions may be based on (i) a buy-in amount associated with a player, (ii) a cash-out amount associated with the player, (iii) a credit meter balance associated with the player, (iv) a rate of play associated with the player, (v) a win associated with the player, (vi) a loss associated with the player, and/or (vii) a push/tie associated with the player. A player may need to achieve a certain buy-in or credit meter balance threshold to qualify for upgrade offers, for example, and/or may need to achieve a certain number of wins, losses, pushes/ties, and/or combinations and/or sequences of wins, losses, and/or pushes/ties. Upgrade offers may also or alternatively be triggered by time metrics (e.g., time of day, week, month, and/or year), traffic and/or usage metrics (e.g., slot floor utilization percentage, current coin-in metrics, and/or number of occupied seats), revenue and/or profit management metrics, and/or externality metrics (e.g., weather, news, and/or sporting events).

According to some embodiments, the method 1000 may comprise determining, in response to the determining of the triggering condition, a portable wagering medium upgrade offer to present to a player, at 1004. Once it is determined that an upgrade offer should be presented, a particular upgrade offer and/or group or package of upgrade offers may be selected and/or chosen. A database of available upgrade attributes may be queried, for example, to determine which attributes should be offered to the player. In some embodiments, the player's wagering history may be utilized to determine one or more upgrade offers to present. A player that tends to play mostly Blackjack, for example, may be presented with an opportunity to purchase or acquire one or more attributes specific to Blackjack and/or that may be beneficial for use in playing Blackjack (e.g., "bust insurance" and/or "mimicked outcomes"). Similarly, a standing, status, and/or rating of the player may be utilized to determine which upgrade attributes to offer to the player. Standard players may only be offered attributes with lower expected values, for example, while more experienced and/or higher-wagering players may be offered attributes with higher expected values (or vice versa).

Some metrics and/or parameters that may be utilized to determine an upgrade offer to present may include, but are not limited to: (i) a buy-in amount associated with the player; (ii) a cash-out amount associated with the player; (iii) a credit meter balance associated with the player; (iv) a rate of play associated with the player; (v) a win associated with the player; (vi) a loss associated with the player; (vii) a tie or push associated with the player; and/or (viii) an expected value of a game play associated with the player. In some embodiments, different packages of attributes may chosen to offer and/or the price for certain attributes and/or packages may also be determined (e.g., looked-up in a database and/or calculated based on various metrics such as player identifier, time of day, and/or expected value).

In some embodiments, the method 1000 may comprise presenting the portable wagering medium upgrade offer to the player, at 1006. The upgrade offer may be presented to the player in any manner that is or becomes known or practicable. An upgrade device may provide the offer via an interface such as the interface 600 of FIG. 6, for example, or a wagering game device near the player may present the offer to the player. The offer may also or alternatively be presented to the player via a portable wagering medium. A wagering chip with a display may output the offer (e.g., as text, graphics, blinking lights, and/or via a glow), for example, and/or a cellular telephone operated by the player may ring and/or otherwise output the offer. In some embodiments, a dealer may present the offer to the player. A device operated by the dealer may prompt the dealer to present the offer to one or more players at a table operated by the dealer, for example.

According to some embodiments, the method 1000 may comprise receiving, after the presenting, an indication of an acceptance of the portable wagering medium upgrade offer by the player, at 1008. The player may generally interface with any device, object, and/or person that presented the offer to indicate acceptance of the offer, for example. In some embodiments, the player may interact with a different device than that which presented the offer. While an advertising display in a casino may present the offer to all patrons during a dinner hour, for example (e.g., to increase gaming during an otherwise slow period), the player may accept the offer by initiating play on a wagering game device and selecting an "upgrade" option. Similarly, while a dealer at a Roulette table may present the offer to a particular player that has just lost three (3) times in a row, the player may accept the offer by pressing a button on a wagering chip utilized by the player and/or by pressing an "accept upgrade" button on the table itself. In some embodiments, the player may indicate acceptance by imparting a specific motion to the portable wagering medium (e.g., shaking it, flipping it, and/or striking it against another object) and/or by coupling the portable wagering medium to another device or object (e.g., rubbing two portable wagering media together, touching an activation key or dongle to the portable wagering medium, and/or placing the portable wagering medium on a specific surface and/or area).

In some embodiments, the method 1000 may comprise providing, in response to the receiving of the indication of the acceptance of the portable wagering medium upgrade offer by the player, a portable wagering medium associated with (i) a wagering denomination and (ii) an attribute comprising a portable wagering medium upgrade that is operable to alter play of a wagering game, at 1010. As described herein, the portable wagering medium may be dispensed and/or handed to the player. In the case that the player already possesses the portable wagering medium, the providing may comprise assigning the attribute (and/or denomination or duration) to the portable wagering medium. A signal indicating the attribute may be sent to the portable wagering medium, for example, causing the portable wagering medium to become associated with the attribute. A signal may also or alternatively be sent to a central and/or remote database such that any device with access thereto may be made aware that the attribute is assigned to the portable wagering medium.

According to some embodiments, the method 1000 may comprise receiving an indication that the player desires to utilize the attribute to alter play of the wagering game, at 1012. While acceptance of the offer may constitute a general indication that the player desires to utilize the attribute, in some embodiments, a different and/or more specific indication may be received. The player may utilize the portable wagering medium to place wagers in a standard fashion, for example, and may then choose at some point to active the upgrade attribute (e.g., choose to alter the game play). The player may experience a winning streak yet may feel that luck is about to run out, for example, and may choose to activate an "insurance" attribute in case the winning streak does indeed end in the next round of wagering. Activation may be indicated in any manner that is or becomes known or practicable. The player may verbally indicate to a dealer that the player wishes to utilize the attribute, for example, and/or the player may push a button of a wagering game device and/or of the portable wagering medium. In some embodiments, the player may provide the indication by imparting particular motions and/or actions to the portable wagering medium and/or by selectively positioning the portable wagering medium. Shaking the portable wagering medium, rubbing the portable wagering medium, rubbing or hitting two portable wagering media together, squeezing the portable wagering medium, placing the portable wagering medium in a specially designated area, and/or placing the portable wagering medium with a particular side facing up, for example, may comprise examples of indications imparted by the player. In some embodiments, such as in the case that the attribute will be automatically utilized anytime that the portable wagering medium is utilized to place a wager (e.g., the player cannot choose to selectively activate the portable wagering medium), the act of placing a wager utilizing the portable wagering medium may comprise an indication that the player desires to utilize the attribute.

In some embodiments, the method 1000 may comprise facilitating play of the wagering game, wherein the play, at least with respect to the portable wagering medium, is altered by the attribute, at 1014. The wagering game device conducting and/or facilitating the wagering game may, for example, utilize one or more rules associated with and/or defined by the attribute to conduct the wagering game and/or to determine an altered outcome of the wagering game conducted in a standard manner. In some embodiments, a device other than the wagering game device such as a peripheral device and/or a player device may facilitate altered play of the wagering game. While a slot machine may produce a wagering game result in a standard manner, for example, a player's attribute-enabled cell phone or iPod® may cause the outcome to change and/or may change how the player's credits are treated in response to the outcome. A losing outcome may typically cause the player to lose five (5) credits, for example, but because the player/portable wagering medium has utilized a "get out of loss free" attribute, the player's phone may transmit a signal to the slot machine preventing the loss of the credits or automatically adding an amount to the credit meter to cancel out the loss (e.g., without further expenditure by the player).

According to some embodiments, the method 1000 may comprise disassociating, after the facilitating of the play of the wagering game that is altered by the attribute, the attribute from the portable wagering medium, at 1016. In the case that the portable wagering medium is re-programmable (e.g., as opposed to being hard-coded and/or substantially permanently assigned a particular attribute and/or denomination), the portable wagering medium may be erased and/or 'cleansed' after the attribute is utilized to alter the play of the wagering game. In some embodiments, the cleansing may occur once a duration of the attribute has expired. In the case that the attribute is configured for use to alter ten (10) hands of poker, for example, the attribute may be disassociated from the portable wagering medium after the tenth use. According to some embodiments, such as in the case that memory storing an indication of the assignment of the attribute to the portable wagering medium is separate and/or remote from the portable wagering medium, a database record in the memory may simply be deleted and/or modified to deactivate and/or dissociate the attribute. In embodiments where portable wagering media are hard-coded and/or semi-permanently or permanently assigned a particular attribute, once the attribute is used up, the portable wagering medium, instead of becoming disassociated with the attribute, may be disassociated with the player (e.g., a different portable wagering medium may be exchanged for the one assigned to the attribute). In some embodiments, such as in the case that an inset or topper coupled to the portable wagering medium is utilized to denote the attribute, the inset and/or topper may be removed and/or marked to indicate usage and/or deactivation of the attribute. A dealer and/or electronic gaming device component may remove an inset, sticker, and/or topper after use of the attribute, for example, and/or the topper/marker may be torn, punched, stamped, etc.

Figure 11:
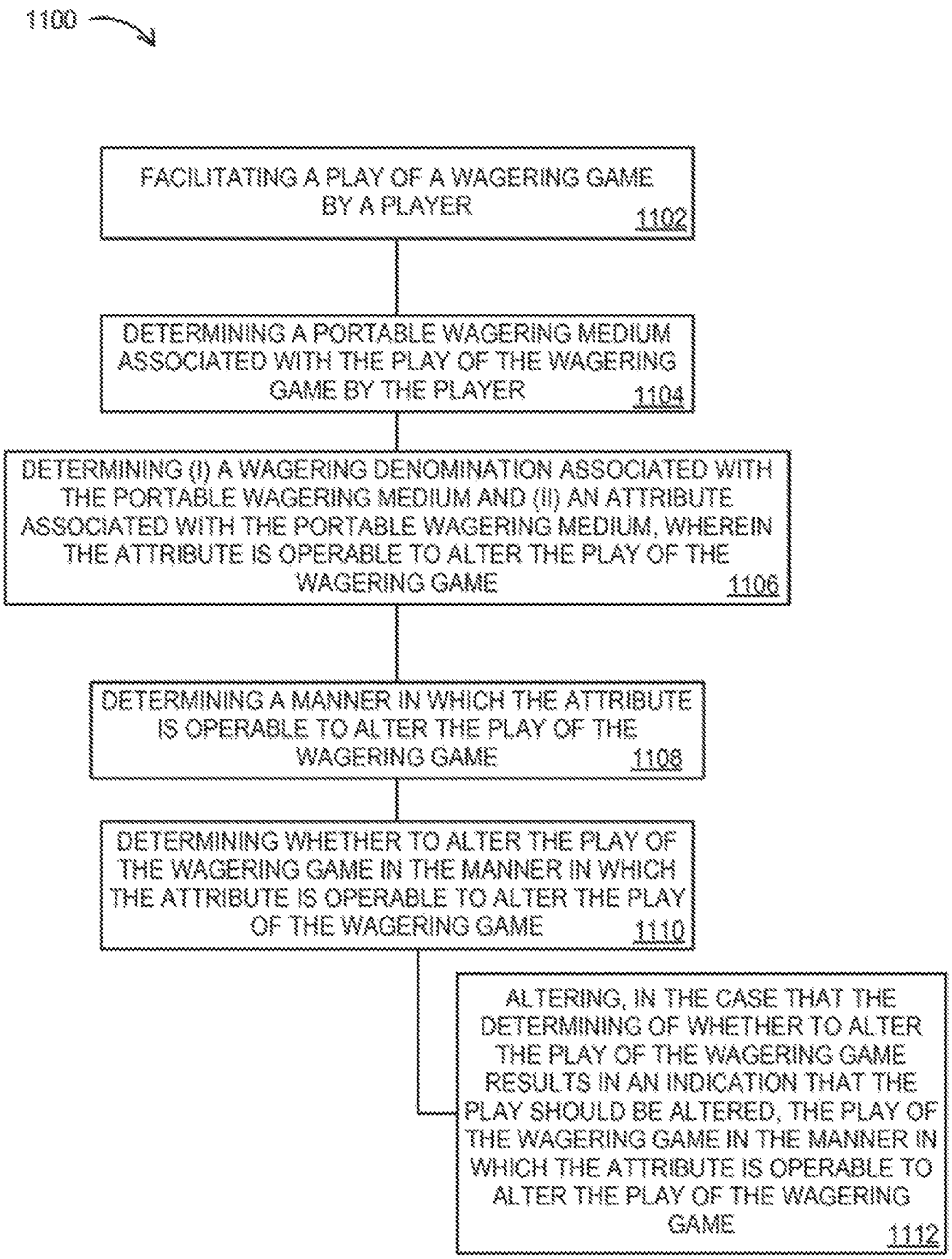
FIG. 11 is a flow diagram of a method according to some embodiments.

Referring now to FIG. 11, a flow diagram of a method 1100 according to some embodiments is shown. The method 1100 may, in some embodiments, be facilitated and/or conducted by one or more of an upgrade device, a wagering game device, a player device, and/or a portable wagering medium (e.g., all as described herein). The method 1100, for example, may be performed by a combination of devices owned and/or operated by a casino and/or wagering establishment. According to some embodiments, the method 1100 may be performed by a wagering game device such as the wagering game devices 130, 930 of FIG. 1 and/or FIG. 9 herein. In some embodiments, the method 1100 and/or portions thereof may be similar to the methods 800, 1000 (and/or portions thereof) of FIG. 8 and/or FIG. 10 and/or may be similar to the life-cycle described with reference to the system 900 of FIG. 9 herein.

In some embodiments, the method 1100 may comprise facilitating (e.g., by a processing device) a play of a wagering game by a player, at 1102. A processing device of a wagering game device and/or player device (or even of the portable wagering medium itself) may, for example provide an interface (e.g., by controlling and/or managing one or more input and/or output devices) via which a player may participate in a wagering game. The facilitating may comprise, in some embodiments, allowing the player to place a wager, determining one or more random numbers, determining an outcome associated with the one or more random numbers, providing output indicative of the outcome to the player, determining a payout corresponding to the outcome, and/or providing output indicative of the payout to the player. According to some embodiments, the facilitating may be accomplished by a handheld device operated by the player, wherein the handheld device interfaces and/or communicated with the wagering game device. The handheld device may, for example, provide wagering information to the wagering game device and/or may output wagering game information to the player (e.g., received from the wagering game device and/or derived locally from specialized software loaded onto the handheld device).

According to some embodiments, the method 1100 may comprise determining (e.g., by the processing device) a portable wagering medium associated with the play of the wagering game by the player, at 1104. The wagering game device and/or player device may, for example, determine a particular portable wagering medium selected by the player for placing a wager. While wagering tokens are typically generic, there is no need to identify particular tokens for betting, other than selecting appropriate denominations as desired. It does not matter, in conventional systems for example, which one dollar ($1) token a player uses to place a wager or which portion of a twelve dollar ($12) cashless gaming ticket the player chooses to wager. Indeed, in electronic wagering games that have been converted to cashless gaming, a player cannot choose which wagering media to utilize to place a wager. In the case of many current embodiments, however, where portable wagering media and/or particular portions of credit balances may be specifically associated with particular game play-altering attributes, selection of which portable wagering media and/or portions to bet becomes a strategy element that may be managed by the player. Accordingly, it may be desirable to determine which portable wagering medium and/or portion of a credit balance the player desires to utilize to place a particular wager.

Such a determination may be made, for example, by receiving an indication that a player has selected a particular portable wagering medium, such as a particular token or virtual token for wagering. The player may provide input to the portable wagering medium itself, by pressing a button of the portable wagering medium for example, and/or may selectively choose the portable wagering medium utilizing an input device of the wagering game device and/or the player device. In some embodiments, such as in table games, the wagering game device may identify which portable wagering media the player has placed in one or more betting circles.

In some embodiments, the method 1100 may comprise determining (i) a wagering denomination associated with the portable wagering medium and (ii) an attribute associated with the portable wagering medium, wherein the attribute is operable to alter the play of the wagering game, at 1106. Once the portable wagering medium has been identified for betting, in some embodiments, information regarding the portable wagering medium may be queried or gathered to facilitate play of the wagering game. In the case that portable wagering medium denominations may be variable, for example, it may be desirable to inquire as to which denomination is assigned to the portable wagering medium utilized to place a current bet. Such information may be utilized, for example, to determine if betting limits are satisfied and/or for calculating payouts. Similarly, the game play-altering attributes described herein may be desirable to identify to determine which rules may need to be utilized to execute the wagering game (and/or to determine an appropriate payout for the wagering game).

The determining of the denomination and/or attribute may generally be accomplished by receiving information from the portable wagering medium itself and/or by receiving information from a remote database storing information regarding the portable wagering medium. The wagering game device may determine an identifier of the portable wagering medium by reading an RFID device coupled to the portable wagering medium and/or by scanning a barcode on the portable wagering medium, for example, and may utilize the identifier to query a remote database (e.g., a server-based gaming database) to determine which (if any) attributes and/or denominations are assigned to the portable wagering medium. In some embodiments, a dealer may visually note a tag or inset coupled to a wagering token that is of a certain color (e.g., red=five dollars ($5)) and/or is printed with "No Commissions", and may accordingly determine that the token has a face value of five dollars ($5) and that the attribute "No Commissions" is assigned to the token.

According to some embodiments, the method 1100 may comprise determining (e.g., by the processing device) a manner in which the attribute is operable to alter the play of the wagering game, at 1108. In the case that the attribute is determined to be the "No Commissions" attribute, for example, a rule may be determined that defines a requirement that any wagers made with the attribute do not require commissions to be paid. Rules defining and/or defined by attributes may generally be looked-up in a database and/or may cause a wagering game device to determine which of a plurality of available code sequences and/or programs to choose to execute. Attribute information such as rules and/or code may be stored within the wagering game device, by the portable wagering medium itself, and/or remote from the wagering game device such as in a central server and/or database and/or in a player device such as a cellular telephone or PDA.

In some embodiments, the method 1100 may comprise determining (e.g., by the processing device) whether to alter the play of the wagering game in the manner in which the attribute is operable to alter the play of the wagering game, at 1110. In some embodiments, mere association of an attribute with a portable wagering medium utilized to place a wager may not suffice to cause the wagering game to be altered by the attribute. The attribute may not be active or activated, for example, or the attribute may have already been used up, depleted, and/or otherwise be invalid. According to some embodiments, the attribute may only be authorized and/or capable of being utilized to alter certain wagering games, alter wagering games during certain times or under certain circumstances, and/or may only be valid after one or more perquisites and/or qualifying conditions are met. In some embodiments, such as in the case that the attribute is assigned to a specific player and/or only authorized for use by a certain player, an identity of the player may be checked and/or validated to verify that the attribute is authorized for use. In some embodiments, no restrictions may be applicable to an attribute (or to any attribute) and the determining of whether to alter the wagering game play may not be necessary in the method 1100.

According to some embodiments, the method 1100 may comprise altering, in the case that the determining of whether to alter the play of the wagering game results in an indication that the play should be altered, the play of the wagering game in the manner in which the attribute is operable to alter the play of the wagering game, at 1112. One or more rules determined at 1108 may be implemented during execution of the wagering game play, for example, and/or attribute-specific code, sequences, and/or programs may be selectively executed as part of the wagering game play. The attribute may trigger, for example, a specific subroutine and/or module to be executed that implements the rules defined by the attribute and accordingly alters the play of the wagering game. It should be understood that altered game play may, in some embodiments, appear substantially if not entirely identical to standard game play. In the case that an attribute causes a rule to be implemented (e.g., by an electronic device and/or by a dealer) that provides "bust immunity" for a player in Blackjack, and the player utilizes the attribute but does not 'bust', for example, while the game play may be considered to be altered (e.g., since the rule defined by the attribute was implemented—which it would not have been under normal game play) there may be no outward sign that the game play was altered (e.g., because the "outcome" altering nature of the attribute was not realized in the current game play). In some embodiments, game play may not be considered to be altered unless some outcome or event in the wagering game is recognizably altered (such as an outcome; e.g., the player does 'bust', but the attribute sets the value of the player's hand to twenty-one (21)).

Wagering Game Devices

Figure 12:
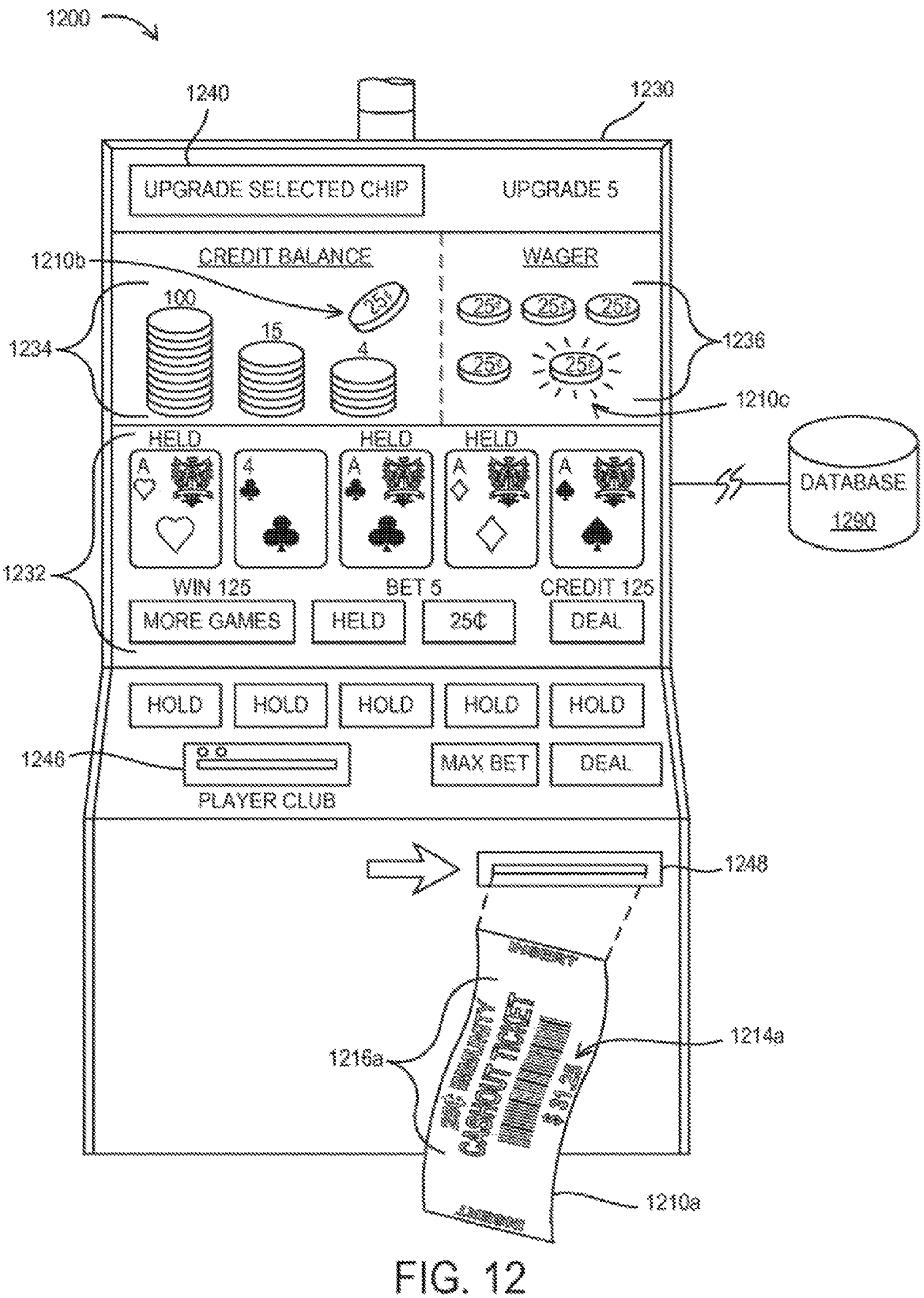
FIG. 12 is diagram of a system according to some embodiments.

Referring now to FIG. 12, a diagram of a system 1200 according to some embodiments is shown. In some embodiments, the system 1200 may be similar in configuration and/or functionality to the systems 100, 900 from FIG. 1 and/or FIG. 9 herein. According to some embodiments, the components 1210, 1214, 1216, 1230, 1232, 1234, 1236, 1240, 1246, 1248, 1290 of the system 1200 may be similar in configuration and/or functionality to the similarly named and/or numbered components described in reference to any of FIG. 1, FIG. 2, FIG. 3, FIG. 4, FIG. 6, FIG. 6, FIG. 7, FIG. 8, FIG. 9, FIG. 10, and/or FIG. 11 herein. Fewer or more components that those shown or described with respect to FIG. 12 may be included in the system 1200 without deviating from the scope of some embodiments.

According to some embodiments, the system 1200 may comprise one or more portable wagering media 120*a-c*. A first portable wagering medium 1210*a* may comprise a cashless gaming ticket, for example, and may have printed thereon an indication of a denomination/value 1214*a* and/or an indication of an attribute 1216*a* that is operable to alter play of a wagering game. The system 1200 may also or alternatively comprise a second portable wagering medium 1210*b* and/or a third portable wagering medium 1210*c*, that each may comprise one or more virtual tokens, as shown. In some embodiments, the cashless gaming ticket 1210*a* may be inserted into a wagering game device 1230, such as the exemplary video poker machine shown in FIG. 12, and the attribute 1216*a* may cause play of the video poker game to be altered. Play of the video poker wagering game may generally be facilitated by a game play interface 1232 of the wagering game device 1230, which may comprise a number of dealt playing cards and various controls typical to video poker game play, as shown.

According to some embodiments, upon insertion of the cashless gaming ticket 1210*a* into the wagering game device 1230, the cashless gaming ticket 1210*a* may be converted into one or more virtual tokens such as the second portable wagering medium 1210*b* and/or the third portable wagering medium 1210*c*. The value 1214*a* of the cashless gaming ticket 1210*a* of thirty-one dollars and twenty-five cents ($31.25) may, for example, be converted to and/or displayed as a credit balance 1234, which may be displayed as a set of virtual tokens, as shown. In some embodiments, the player may select a portion of the credit balance 1234 such as the second portable wagering medium 1210*b* as shown. The player may select any such portion and may move the selected portion to a wagering area 1236 to designate the selected portion for use in placing a wager in the video poker wagering game. As shown in FIG. 12, for example, the player has placed five (5) twenty-five cent ($0.25) virtual tokens, including the third portable wagering medium 1210*c*, in the wagering area 1236 (e.g., defining a five (5) credit and/or one dollar and twenty-five cent ($1.25) wager).

In some embodiments, the player may choose which virtual portable wagering media 1210*b-c* to assign the attribute to. As shown by the depiction of illumination and/or blinking of the third portable wagering medium 1210*c*, for example, the player may have selected the third portable wagering medium 1210*c* to apply the "immunity" attribute to. The attribute may then, for example, be utilized to alter play of the poker wagering game. Upon play and upon realizing a losing outcome, for example, four (4) of the five (5) wagered virtual tokens may be removed from the wagering area 1236, forfeited by the player, deleted, and/or otherwise lost. The third portable wagering medium 1210*c*, however, may remain in the wagering area 1236 and/or may be moved back into the credit balance 1234, and/or otherwise may not be lost or forfeited. The "immunity" attribute may, for example, have "saved" the third portable wagering medium 1210*c* from what would have typically resulted in forfeiture.

In some embodiments, the attribute may be associated with a duration, time frame, and/or magnitude, as described herein. The cashless gaming ticket 1210*a* shows, for example, the indication of the attribute 1216*a* as describing the "immunity" attribute as being valid for twenty-five cents ($0.25) worth of wagering play. In the example of FIG. 12 where the virtual tokens are shown as comprising twenty-five cent ($0.25) virtual tokens, the attribute is valid for use for a single token, such as for the third portable wagering medium 1210*c*. Accordingly, in the case that the attribute was utilized to "save" the third portable wagering medium 1210*c* during a wagering game play, the attribute may become inactive, become disassociated with the player and/or with the third portable wagering medium (and/or with the first portable wagering medium 1210*a* or any replacement or re-printing thereof), and/or may otherwise be forfeited, used up, or lost.

According to some embodiments, the system 1200 and/or the wagering game device 1230 may comprise an upgrade device 1240, exemplified by an "upgrade selected chip" button on the wagering game device 1230 in FIG. 12. In some embodiments, the upgrade device/button 1240 may comprise a peripheral device coupled to the wagering game device 1230. The player may select a virtual token such as the second portable wagering medium 1210*b* shown as being highlighted in FIG. 12, for example, and may select the upgrade button 1240. The player may then, according to some embodiments, add attributes to and/or purchase attributes for the second portable wagering medium 1210*b*. A separate interface and/or menu not shown in FIG. 12 (such as the interface 600 from FIG. 6) may be provided, for example, that facilitates the upgrade process. The player may upgrade the second portable wagering medium 1210*b* to include a "4's are Wild" attribute, for example (presumably prior to receiving the poker hand shown in the game play interface 1232), such that when the second portable wagering medium 1210*b* is utilized to place a wager resulting in the poker hand shown in FIG. 12, the standard outcome of 'four of a kind' is transformed into 'five of a kind' due to the attribute of the second portable wagering medium 1210*b* causing the "4" to be a wild card (e.g., altering standard play of the wagering game). It should be understood that some wagering games utilize wild cards in standard game play, such as in "Deuces Wild" or "Anything's Wild" game versions. These wild cards are not, however, triggered by any attribute of a portable wagering medium, nor is game play altered by any portable wagering medium utilized.

In some embodiments, such as in the case that the attribute such as the purchased "4's are Wild" attribute is intended for assignment to the player, a player tracking card may be inserted into a player tracking card reader 1246 of the wagering game device 1230 so that information indicative of the attribute may be stored in associated with an identifier assigned to the player. In some embodiments, such as in the case that a purchased and/or acquired attribute remains available and/or has not been entirely utilized upon completion of game play, a cashless ticket printer (and/or acceptor) 1248 may be utilized to print cashless gaming tickets comprising an indication of the attribute, and remaining credit/value/, and/or a duration or magnitude of the attribute. The first portable wagering medium 1210*a*, for example, may be printed from the ticket printer 1248 to indicate the remaining credit balance (the indication of the value 1214*a*), the attribute (the indication of the attribute 1216*a*), and/or the magnitude or remaining use of the attribute (e.g., the twenty-five cents ($0.25) printed as part of the indication of the attribute 1216*a*).

In some embodiments, the system 1200 may comprise a database 1290. The database 1290 may store, for example, indications correlating one or more portable wagering media 1210*a-c* to one or more attribute and/or players, and/or correlating one or more players to one or more attributes and/or portable wagering media 1210*a-c*. The database 1290 may be accessed by the wagering game device 1230 and/or the upgrade device 1240, for example, to store and/or retrieve denomination and/or attribute information such as to: (i) determine and/or verify or validate a denomination of a portable wagering medium 1210*a-c*; (ii) determine if any attributes are associated with a particular portable wagering medium 1210*a-c*; (iii) store an indication that an attribute has been utilized; (iv) store an indication that a player has purchased an attribute; and/or (v) store an indication that an attribute should be assigned to a portable wagering medium 1210*a-c*. As described herein, the database 1290 may reside within the wagering game device 1230, the upgrade device 1240, a portable wagering medium 1210*a-c*, a player device, and/or a remote device such as a central server.

Figure 13:
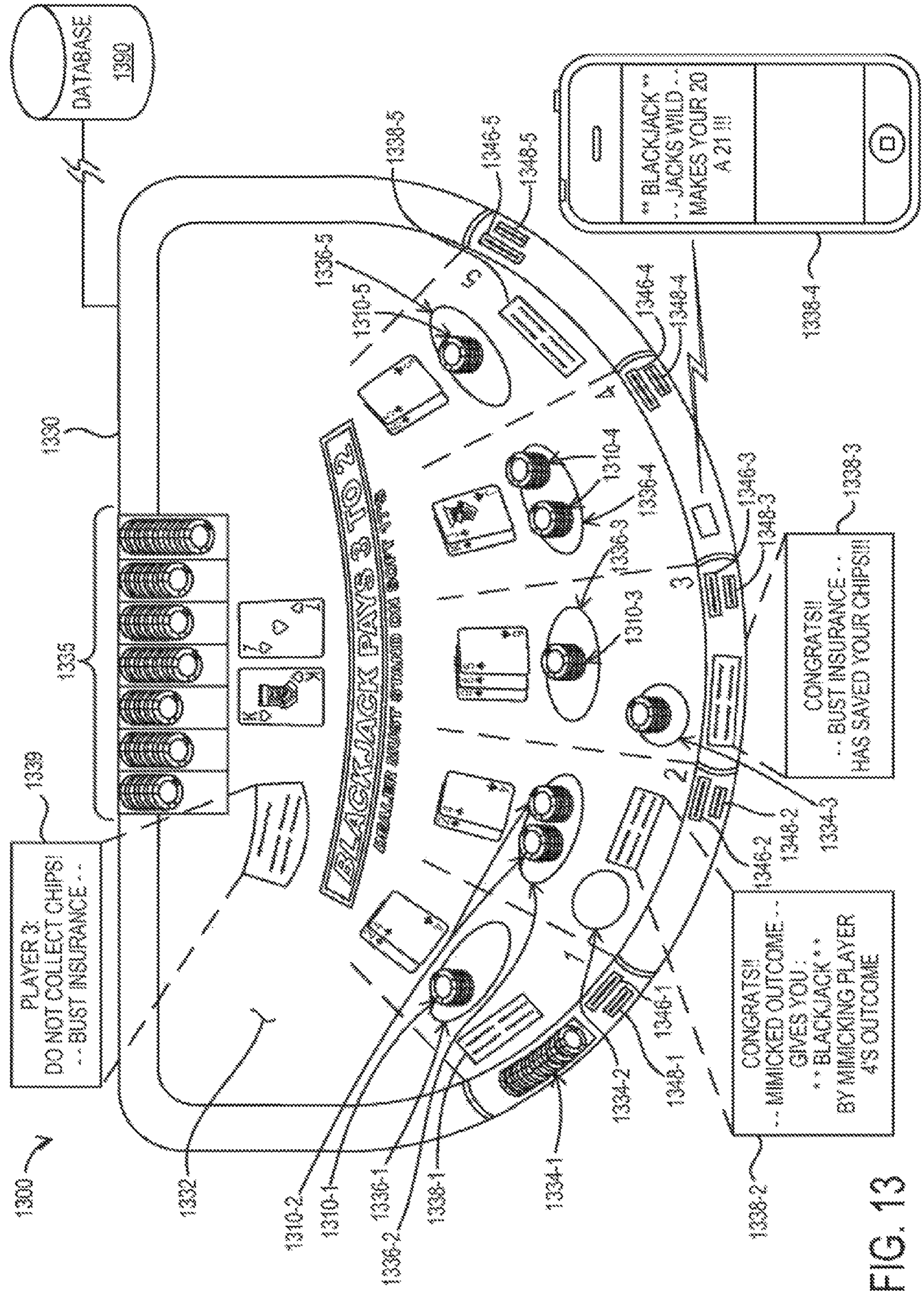
FIG. 13 is a perspective diagram of a system according to some embodiments.

Referring now to FIG. 13, a perspective diagram of a system 1300 according to some embodiments is shown. In some embodiments, the system 1300 may be similar in configuration and/or functionality to the systems 100, 900, 1200 from FIG. 1, FIG. 9, and/or FIG. 12 herein. According to some embodiments, the components 1310, 1330, 1332, 1334, 1335, 1336, 1338, 1339, 1346, 1348, 1390 of the system 1300 may be similar in configuration and/or functionality to the similarly named and/or numbered components described in reference to any of FIG. 1, FIG. 2, FIG. 3, FIG. 4, FIG. 6, FIG. 6, FIG. 7, FIG. 8, FIG. 9, FIG. 10, FIG. 11, and/or FIG. 11 herein. Fewer or more components that those shown or described with respect to FIG. 13 may be included in the system 1300 without deviating from the scope of some embodiments.

In some embodiments, the system 1300 may comprise a plurality of portable wagering media 1310, which are shown for exemplary purposes as wagering chips in FIG. 13. For illustration of one example of some embodiments, the portable wagering media 1310 of FIG. 13 are identified separately as one or more first wagering chips 1310-1, second wagering chips 1310-2, third wagering chips 1310-3, fourth wagering chips 1310-4, and fifth wagering chips 1310-5, corresponding to first, second, third, fourth, and fifth players (not explicitly shown) of a Blackjack wagering game, respectively. The players and their respective wagering chips 1310 may be arranged as shown in five (5) numbered and distinct and/or delineated areas or sections of a wagering game device 1330.

According to some embodiments, the wagering game device 1330 may comprise an electronically-enhanced Blackjack table game, such as shown in FIG. 13. The Blackjack table 1330 may generally comprise a game play area 1332, which may comprise the "felt" of the table and/or one or more delineated and/or designated areas thereof. According to some embodiments, the game play area 1332 may comprise the five (5) numbered areas corresponding to each player. Fewer or more player positions may be utilized in some embodiments. Each player may also or alternatively be associated with and/or provided a credit balance area and/or chip tray 1334 (numbered 1334-1, 1334-2, 1334-3, 1334-4, and 1334-5 for players one (1) through five (5) respectively). For exemplary purposes, some player positions are shown without credit balance and/or chip storage areas (e.g., positions four (4) and five (5)), one player position is shown with a chip tray 1334-1 coupled to an edge of the Blackjack table 1330 (e.g., position one (1)), and some player positions are shown with credit balance areas 1334-2, 1334-3 depicted as designated areas of the game play area 1332 (e.g., positions two (2) and three (3)). According to some embodiments, the Blackjack table 1330 may comprise a chip tray 1335 for use by a dealer operating the table and/or managing or facilitating the play of the Blackjack wagering game. The dealer's chip tray 1335 may be considered the "bank", for example, where collected chips are deposited and where payouts are provided from.

In some embodiments, the game play area 1332 may comprise one or more betting areas 1336 (e.g., one for each player, numbered 1336-1, 1336-2, 1336-3, 1336-4, and 1336-5, respectively). While a single betting area 1336 is shown for each player position, it should be understood that fewer or more betting areas 1336 may be provided as is or becomes desirable. Portable wagering media 1310 may generally be placed in betting areas 1336 to define a wager placed by the player. In some embodiments, the Blackjack table 1330 may comprise one or more output devices such as display screens 1338 via which information may be provided to players. As shown, each player may have an associated display screen 1338 (e.g., numbered 1338-1, 1338-2, 1338-3, 1338-4, and 1338-5 for each player respectively). For purposes of illustration of various embodiments, some display screens 1338-1, 1338-2, 1338-5 are depicted as being mounted in and/or on the game play area 1332 (e.g., in and/or on an upper surface of the Blackjack table 1330; player positions one (1), two (2), and five (5)), one display screen 1338-3 is depicted as being mounted on an edge or side of the Blackjack table 1330 (e.g., player position three (3)), and one display screen 1338-4 is depicted as being implemented as a player device in communication with the Blackjack table 1330 (e.g., player position four (4)). In some embodiments, the display screens 1338 may also or alternatively comprise input devices configured to receive indications from the players. The display screens 1338 may comprise, for example, touch screens capable of both providing and receiving data. According to some embodiments, a display screen 1339 may also or alternatively be provided for the dealer, as shown.

In some embodiments, the Blackjack table 1330 may comprise a player tracking card reader 1346 for each player position (e.g., numbered 1346-1, 1346-2, 1346-3, 1346-4, 1346-4, and 1346-5, respectively) and/or a cashless gaming device 1348 (e.g., numbered 1348-1, 1348-2, 1348-3, 1348-4, 1348-4, and 1348-5, respectively). The player tracking card readers 1346 may be utilized, as described herein, to determine identities of and/or parameters or metrics associated with players interfacing with the wagering game device 1330. The cashless gaming devices 1348 may be utilized to receive cashless gaming tickets (e.g., which may be considered portable wagering media in some embodiments) from players (e.g., to establish a credit balance at the wagering game device 1330). The cashless gaming devices 1348 may also or alternatively be utilized to provide cashless gaming tickets to players (e.g., as opposed to providing a handful of chips upon cash-out). In some embodiments, such as in the case that a standard and/or non-electrically facilitated table game is utilized as the wagering game device 1330, either or both of the player tracking card reader 1346 and/or the cashless gaming device 1348 may be excluded from the system 1300 without deviating from the scope of some embodiments.

As an example of some embodiments, one or more of the third portable wagering media 1310-3 (and/or the third player) may comprise an attribute such as a "bust insurance" attribute. The "bust insurance" may generally prevent and/or reduce loss in the event of a "bust" obtained as a Blackjack wagering game outcome. As shown in FIG. 13, for example, the third player has received three (3) playing cards comprising a total card value of twenty-two (22; e.g., nine (9) plus eight (8) plus five (5) equals twenty two (22)—which constitutes a "bust" in Blackjack). The standard outcome of the wagering game would accordingly be that the third player losses all of the third portable wagering media 1310-3 placed in the third wagering area 1336-3 to define a wager for the hand played. In response to and/or because of the attribute, however, the third portable wagering media 1310-3 and/or a portion thereof may not be collected by the dealer. As shown in FIG. 13, for example, the dealer may be provided with instructions via the dealer display screen 1339, such as "Player 3: Do not collect chips!—Bust Insurance—". In such a manner, the dealer may be altered as to how the wagering game play should be altered due to the attribute. A simple LED associated with each player's bet may even accomplish such a purpose ("red" means collect; "green" means pay, "yellow" means push). In some embodiments, one or more indications of the utilization of the attribute may be provided by one or more of the third portable wagering media 1310-3 (e.g., they may blink, light up, and/or emit sounds or instructions) and/or by another component of the wagering game device 1330 (e.g., the third betting area 1336-3 may illuminate in a certain color to indicate that the third portable wagering media 1310-3 should not be collected). According to some embodiments, the third display screen 1338-3 may also or alternatively provide an indication of the attribute and/or the altered game play to the player. As shown, for example, the third display screen 1338-3 may read "Congrats!!—Bust Insurance—Has saved your chips!!!"

In some embodiments, one or more of the fourth portable wagering media 1310-4 (and/or the fourth player) may comprise an attribute such as a "Jacks Wild" attribute, that causes Jacks to become wild cards (e.g., in a wagering game where Jacks are not otherwise wild and/or where wildcards are generally not permitted). As shown in FIG. 13, for example, the "Jacks Wild" attribute utilized on behalf of the fourth player causes the player's hand of one King and one Jack, which would typically equate to a card value of twenty (20; e.g., each 'face card' is worth ten (10) points), to become the more favorable hand of King and Ace, which is worth twenty-one (21) points, or "Blackjack". A message indicative of the alteration of the wagering game may be provided, in some embodiments, to the fourth player via the fourth display screen 1338-4, which may comprise, as shown for example, a personal and/or handheld device operated by the fourth player. The exemplary message depicted reads "BlackJack—Jacks Wild—Makes your 20 a 21!!!" While not explicitly depicted in FIG. 13, the dealer and/or any logic component of the wagering game device 1330 may also or alternatively be alerted as to how the application of the attribute has altered the play of the wagering game (e.g., resolution of winning outcomes now requires that the fourth player's hand be valued at twenty-one (21) instead of twenty (20)).

According to some embodiments, one or of the second portable wagering media 1310-2 (and/or the second player) may comprise an attribute such as a "Mimicked Outcome" attribute, that causes, for example, the second player's outcome to mimic the best outcome received by any player at the wagering table 1330. As shown in FIG. 13, for example, the "Mimicked Outcome" attribute utilized on behalf of the second player causes the second player's hand of a two (2) and a nine (9) to automatically be converted to twenty-one (21)/"Blackjack". The player may be made aware of this game play alteration via a message provided by the second display screen 1338-2, which may read for example "Congrats!!—Mimicked Outcome—Gives you: Blackjack By mimicking Player 4's outcome". The dealer and/or wagering game device 1330 may also or alternatively be made aware of the alteration and/or the ultimate outcome as is or becomes practicable. In some embodiments, the wagering game device 1330 may comprise a processor and/or other logic device that automatically implements rules and/or code in accordance with any applicable attributes. The electronically-facilitated Blackjack table 1330 of FIG. 13, for example, may determine values for each of the player's hands as well as the dealer and/or house's hand, and may determine one or more outcomes of the Blackjack wagering game based thereon. The values may comprise standard values "as dealt", for example, or may be pre-calculated taking into account any applicable attributes and their affects on the wagering game. In embodiments where the standard value of the hands is determined, the attributes may then be applied and/or considered or taken into account to determine the ultimate and/or final or modified outcome of the game.

In some embodiments, the system 1300 may comprise a database 1390. The database 1390 may store, for example, indications correlating one or more portable wagering media 1310 to one or more attribute and/or players, and/or correlating one or more players to one or more attributes and/or portable wagering media 1310. The database 1390 may be accessed by the wagering game device 1330, for example, to store and/or retrieve denomination and/or attribute information such as to: (i) determine and/or verify or validate a denomination of a portable wagering medium 1310; (ii) determine if any attributes are associated with a particular portable wagering medium 1310; (iii) store an indication that an attribute has been utilized; (iv) store an indication that a player has purchased an attribute; and/or (v) store an indication that an attribute should be assigned to a portable wagering medium 1310. As described herein, the database 1390 may reside within and/or coupled to the wagering game device 1330, within or coupled to one or more portable wagering media 1310, a player device, and/or a remote device such as a central server.

Attribute Examples

While examples of many types of attributes that may alter play of wagering games are described herein, it should be understood that any type or configuration of attribute that is operable to alter play of a wagering game may be associated with a portable wagering medium according to some embodiments. The following specific examples are provided for illustrative purposes only and are accordingly not intended to limit the scope of the embodiments described herein.

"Immunity", "Insurance", and/or "Protection"

In some embodiments, attributes may help protect against loss and/or losing outcomes. An "immunity" attribute may, for example, cause a portable wagering medium not to be collected upon loss (e.g., as it normally would be) and/or may cause an insurance payout to be due to the player in response to the loss. Some examples of such attributes may include, but are not limited to: (i) immunity from '0' and/or '00' outcomes in Roulette, (ii) general Blackjack immunity, (iii) immunity from dealer Blackjacks, (iv) immunity to an occurrence of a seven (7) in Craps, (v) allows a player to surrender any hand in Blackjack at any time for ninety-five percent (95%) of the wagered value, (vi) causes an insurance payment of fifty percent (50%) of wagered value to be paid to player in the event that each of ten (10) wagering chips is lost without the player realizing a win, (vii) "bust insurance" provides immunity to an occurrence of a 'bust' in Blackjack, (viii) immunity from loss or 'bust' when another player has "taken" the player's card (a common perception upon certain types of card game losses), and/or (ix) causes an insurance payout to be made to the player in the event that a stack of purchased chips are utilized to place wagers that result in a net win under a predetermined threshold.

"Freestyle Betting"

In some embodiments, attributes may allow a player to place wagers of amounts and/or types that would otherwise not be allowed. Some examples of such attributes may include, but are not limited to: (i) allowing a player to "triple down" in Blackjack, (ii) allowing a wager to be placed that spreads across both a five (5) and six (6) in Craps, (iii) allowing a player to "switch sides" (e.g., bet on the dealer's hand), (iv) allowing side bets to be placed with a chip, (v) allowing customized side bets, (vi) allowing a wager to extend to adjacent numbers when making bets in Roulette (where "adjacent" may comprise any combination or pattern of available bets, and the adjacent numbers pay at non-standard odds), (vii) allowing a split bet where split bets are not usually allowed, (viii) allowing a player to wager at a time during which a wager was otherwise disallowed (e.g., a player makes a wager midway through a blackjack or baccarat hand, and is paid at adjusted odds based on the cards in play) and/or (ix) allowing wagers that are above or below a game table's wagering range.

"Altered Outcomes"

In some embodiments, attributes may cause an outcome of the wagering game to be altered (e.g., from what the outcome would have been using normal game rules). Some examples of such attributes may include, but are not limited to: (i) allowing the player to win 'pushes' in Blackjack, (ii) giving the player an extra point toward a Blackjack hand, (iii) allowing the player to subtract a point from a Blackjack hand, (iii) chip usage give the player a separate wild card that the player may swap for another card in a Blackjack, Poker, and/or Pai Gow Poker hand, (iv) certain cards are made wild cards (e.g., black aces in Blackjack are made wild), (v) allowing cards of a certain rank or suit to be discarded and/or replaced, (vi) entitling the player to "pass" on a drawn card, (vii) allowing an outcome in Roulette to vary by plus or minus one space, (viii) allowing a "do over" or replay, (ix) allowing a separate random number (e.g., from a random number generator coupled to the portable wagering medium) to alter standard game outcomes such as by adding a value to a standard game outcome, (x) allowing outcomes not normally available in a wagering game, and/or (xi) allowing a fifty percent (50%) chance that the player may avoid "7-out" in Craps (such as by flipping a wagering chip to determine if the negative outcome is avoided).

"Altered Payouts"

In some embodiments, attributes may cause payouts of the wagering game to be altered (e.g., from what the payouts would have been using normal game rules). Some examples of such attributes may include, but are not limited to: (i) pays better odds for certain types of winning bets, (ii) chip pays forty to one (40:1) on Roulette number bets, (iii) payouts are increased depending upon magnitude of points be which player beats dealer's hand, (iv) "veteran chips" increase payouts depending upon how many times the chip has been utilized to place a winning wager, (v) payouts of certain types are multiplied (e.g., Craps filed bets pay ten percent (10%) more), and/or (vi) portable wagering medium provides benefits in excess of and/or in lieu of standard payout (e.g., merchandise, food vouchers, a round of golf, and/or a spa treatment).

"Community Chips"

In some embodiments, attributes may cause interaction between players and/or outcomes or payouts of different players or wagers. Some examples of such attributes may include, but are not limited to: (i) "competitive chips" used by two different players may cause the winning competitive chip (or highest winning competitive chip) of a particular round or series to receive higher payouts (e.g., at the expense of the less winning and/or losing competitive chip), (ii) "interactive chips" may each be assigned a particular symbol and/or function and may interact in predetermined manners with other interactive chips (e.g., a chip displaying a lasso symbol may interact with a chip displaying a cattle symbol to produce a certain result, such as affecting outcomes, payouts, or secondary or bonus game events), (iii) allows player to benefit from wagers placed by other players (e.g., "mimic" or "piggyback" chips copy an outcome received from another player—such as the player in the game receiving the best outcome/payout or a pre-designated team or buddy player; and/or "thief" or "bandit" chips may steal and/or swap outcomes/payouts with other chips/players), and/or (iv) "team chips" may provide enhanced benefits based on outcomes realized by other chips from the same team.

Other Example Attributes

In some embodiments, attributes may cause marketing offers to be provided to players (e.g., via a display device of a portable wagering medium and/or via an output device of a wagering game device at which the portable wagering medium is being utilized to place a wager). Some attributes may eliminate the need for paying dealer commissions (e.g., for a player that wins a Pai Gow wagering game), may cause dealer tips and/or commissions to be automatically paid (e.g., from a separate account and/or deducted from the face value of the portable wagering medium), and/or may provide wagering game strategy and/or odds or expected value information and/or hints (e.g., the portable wagering medium indicates "Stand" as an instruction telling the player that the option with the highest expected value is to stand).

Additional Notes

Some embodiments herein may be specifically directed to providing portable wagering token attributes that alter "primary" wagering games. Some embodiments, for example, may not be directed to alteration of secondary and/or bonus games associated with primary wagering games. Some embodiments, however, may be directed toward providing, conducting, and/or facilitating secondary wagering games and/or bonus games. Wagering chips that have attributes that cause interaction of wagering chips, for example, may be associated with conducting a secondary wagering game. Placing wagers utilizing a portable wagering medium indicating a diamond symbol, for example, may award secondary prizes, benefits, and/or win multipliers when placed next to another winning portable wagering medium that also indicates a diamond symbol. Similarly, secondary benefits may be awarded for collecting portable wagering media that each indicate one of five (5) available symbols (e.g., a scavenger hunt).

According to some embodiments, attributes may provide benefits and/or alter wagering game play upon the occurrence of certain predetermined outcomes. In some embodiments, the player may choose one or more of these triggering outcomes to "customize" application of the attribute. According to some embodiments, the cost of an attribute (if any) may be paid for by deducting the attribute price from the face value/denomination of the portable wagering medium. A five dollar ($5) wagering chip that is upgraded to be assigned to an attribute costing fifty cents ($0.50), for example, may cause an indication that the face value/denomination is now four dollars and fifty cents ($4.50) to be provided (e.g., displayed and/or signaled to a wagering game device). In some embodiments, the cost of an attribute and/or a portion thereof may be subsidized by a sponsor. An auto manufacturer such as the Ford Motor Company may pay for the cost of an attribute given to a player, for example, in exchange for allowing advertisements and/or graphics to be provided to the player. A Ford wagering chip provided in Ford-blue and emblazoned with the Ford-oval logo, for example, may provide players with rental car discounts when wagering wins are accomplished utilizing the Ford wagering chip.

In some embodiments, such as in the case that an attribute is capable of being utilized a number of times (and/or for a certain period of time), the number of times remaining (and/or the remainder of time) may be output by the portable wagering medium (e.g., via a display device that counts down the remaining usage of the attribute). According to some embodiments, attributes may be cumulative. A player may utilize three (3) "add one (1) point to Blackjack hand"-enabled portable wagering media, for example, to achieve the capability of adding three (3) points to the player's Blackjack hand. Similarly, two (2) "double payout (2×)" chips may be utilized to place a winning wager where the standard payout is multiplied by four (4×).

In one embodiment, rather than associating an attribute with a portable wagering medium and/or player, an attribute may be associated with an "attribute medium". For example, a player may be provided with one or more of the following physical objects upon obtaining an attribute: a token, a marker, a lammer, a card, a ticket, a counter, a die, a placard, a symbol, an icon, etc. The physical object may be labeled with a description of the attribute as described. Virtual representations of such objects are also contemplated.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

A player "wagers" at least a single "unit of wager" to pay for a game start. In many gaming devices, a unit of wager may be referred to as a credit. Many gaming devices allow multiple credits to be wagered concurrently in exchange for an improved paytable or more paylines. A unit of wager may be equivalent to a full dollar amount ($1, $5), a fractional dollar amount, a coin (e.g., $0.05 (nickel) or $0.25 (quarter)), or specified amount of another currency (e.g., a specified number of comp points). Some paytables may be expressed as a number of coins won relative to a number of coins wagered. In such instances, the term coin is the same as a unit of wager. Because gaming devices are embodied in different denominations, it is relevant to note that a coin, credit, or unit of wager on a first device may not be identically valued as a coin, credit, or unit of wager on a second device. For example, a credit on a quarter slot machine (on which the credit is equivalent to $0.25) is not the same as a credit on a five dollar slot machine (on which the credit is equivalent to $5.00). Accordingly, it should be understood that in embodiments in which a player may cash out credits from a first gaming device that operates based on a first denomination (e.g., a quarter-play slot machine) and establish, using only the cashed out credits, a credit balance on a second gaming device that operates based on a second denomination (e.g., a nickel-play slot machine), the player may receive a different number of credits on the second gaming device than the number of credits cashed out at the first gaming device. An interesting discussion of this concept can be found in U.S. Pat. No. 5,277,424, which is hereby incorporated by reference in its entirety.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, TDMA, CDMA, GSM, EDGE, GPRS, WCDMA, AMPS, D-AMPS, IEEE 802.11 (WI-FI), IEEE 802.3, SAP, SAS™ by IGT, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The invention is claimed as follows:

1. A gaming table comprising:

a game play area configured to facilitate a play of a game utilizing a plurality of physical game components;

a plurality of betting areas each configured to be associated with a wager amount placed in association with the play of the game; and a controller programmed to:

enable an application of a game play upgrade in association with the play of the game, said game play upgrade being associated with data stored in association with a cellular phone, responsive to the application of the game play upgrade being received, alter at least one attribute of the play of the game, wherein at least one of a game outcome for the play of the game and an award associated with the game outcome for the play of the game is based, at least in part, on the at least one altered attribute, and if no application of the game play upgrade is received, not alter any attribute of the play of the game.

2. The gaming table of claim 1, wherein the game play upgrade is associated with the wager amount placed on the play of the game.

3. The gaming table of claim 1, wherein the game play upgrade is associated with a modification of an attribute of at least one of the physical game components.

4. The gaming table of claim 1, wherein responsive to the application of the game play upgrade being received, the controller is programmed to alter the at least one attribute for a duration selected from the group consisting of: a quantity of plays of the game, a length of time, and a designated time period.

5. The gaming table of claim 1, wherein responsive to the application of the game play upgrade being received, the controller is programmed to utilize a different paytable than a paytable utilized if the application of the game play upgrade is not received.

6. The gaming table of claim 1, wherein responsive to the application of the game play upgrade being received, the controller is programmed to enable a different wager amount to be placed than the placed wager amount.

7. The gaming table of claim 1, wherein a plurality of game play upgrades are each associated with data stored in association with the cellular phone and the controller is programmed to enable an application of at least one of the plurality of stored game play upgrades.

8. The gaming table of claim 1, wherein the controller is programmed to enable a purchase of the game play upgrade.

9. The gaming table of claim 1, which includes at least one input device configured to operate with the controller and at least one display device configured to operate with the controller.

10. The gaming table of claim 1, wherein at least one of the game outcome and any award associated with the game outcome includes at least one of: an amount of monetary credits and an amount of non-monetary credits.

11. A method of operating a gaming table, said method comprising:

enabling an application of a game play upgrade in association with a play of a game, said game play upgrade being associated with data stored in association with a cellular phone, wherein said play of the game is facilitated by a game play area of the gaming table which utilizes a plurality of physical game components, and the play of the game is associated with a wager amount placed at at least one of a plurality of betting areas of the gaming table, responsive to the application of the game play upgrade being received, causing a controller to alter at least one attribute of the play of the game, wherein at least one of a game outcome for the play of the game and an award associated with the game outcome for the play of the game is based, at least in part, on the at least one altered attribute, and if no application of the game play upgrade is received, not altering any attribute of the play of the game.

12. The method of claim 11, wherein the game play upgrade is associated with the wager amount placed on the play of the game.

13. The method of claim 11, wherein the game play upgrade is associated with a modification of an attribute of at least one of the physical game components.

14. The method of claim 11, which includes, responsive to the application of the game play upgrade being received, causing the controller to alter the at least one attribute for a duration selected from the group consisting of: a quantity of plays of the game, a length of time, and a designated time period.

15. The method of claim 11, which includes, responsive to the application of the game play upgrade being received, causing the controller to utilize a different paytable than a paytable utilized if the application of the game play upgrade is not received.

16. The method of claim 11, which includes, responsive to the application of the game play upgrade being received, enabling a different wager amount to be placed than the placed wager amount.

17. The method of claim 11, wherein a plurality of game play upgrades are each associated with data stored in association with the cellular phone and which includes enabling an application of at least one of the plurality of stored game play upgrades.

18. The method of claim 11, which includes enabling a purchase of the game play upgrade.

19. The method of claim 11, wherein at least one of the game outcome and any award associated with the game outcome includes at least one of: an amount of monetary credits and an amount of non-monetary credits.

20. A gaming server comprising:

a controller; and a memory device which stores a plurality of instructions which, when executed by the controller, cause the controller to:

enable an application of a game play upgrade in association with a play of a game, said game play upgrade being associated with data stored in association with a cellular phone, wherein said play of the game is facilitated by a game play area of a gaming table which utilizes a plurality of physical game components, and the play of the game is associated with a wager amount placed at at least one of a plurality of betting areas of the gaming table, responsive to the application of the game play upgrade being received, alter at least one attribute of the play of the game, wherein at least one of a game outcome for the play of the game and an award associated with the game outcome for the play of the game is based, at least in part, on the at least one altered attribute, and if no application of the game play upgrade is received, not alter any attribute of the play of the game.

21. The gaming server of claim 20, wherein the game play upgrade is associated with the wager amount placed on the play of the game.

22. The gaming server of claim 20, wherein the game play upgrade is associated with a modification of an attribute of at least one of the physical game components.

23. The gaming server of claim 20, wherein when executed by the controller in response to the application of the game play upgrade being received, the plurality of instructions cause the controller to alter the at least one attribute for a duration selected from the group consisting of: a quantity of plays of the game, a length of time, and a designated time period.

24. The gaming server of claim 20, wherein when executed by the controller in response to the application of the game play upgrade being received, the plurality of instructions cause the controller to utilize a different paytable than a paytable utilized if the application of the game play upgrade is not received.

25. The gaming server of claim 20, wherein when executed by the controller in response to the application of the game play upgrade being received, the plurality of instructions cause the controller to enable a different wager amount to be placed than the placed wager amount.

26. The gaming server of claim 20, wherein a plurality of game play upgrades are each associated with data stored in association with the cellular phone and when executed by the controller, the plurality of instructions cause the controller to enable an application of at least one of the plurality of stored game play upgrades.

27. The gaming server of claim 20, wherein when executed by the controller, the plurality of instructions cause the controller to enable a purchase of the game play upgrade.

28. The gaming server of claim 20, wherein at least one of the game outcome and any award associated with the game outcome includes at least one of: an amount of monetary credits and an amount of non-monetary credits.

* * * * *